US006369858B1

United States Patent
Lee

(10) Patent No.: US 6,369,858 B1
(45) Date of Patent: Apr. 9, 2002

(54) ON-SCREEN DISPLAY SYSTEM

(75) Inventor: Jae-Hun Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/251,539

(22) Filed: Feb. 17, 1999

(30) Foreign Application Priority Data

| Feb. 18, 1998 | (KR) | 98-5019 |
| Apr. 13, 1998 | (KR) | 98-13126 |
| Jul. 28, 1998 | (KR) | 98-30385 |
| Jan. 14, 1999 | (KR) | 99-856 |

(51) Int. Cl.$^7$ ............................................. H04N 9/76
(52) U.S. Cl. .................. 348/569; 348/589; 348/600
(58) Field of Search ................................. 348/600, 589, 348/569, 563, 564, 570, 586, 597; 358/22, 183; H04N 9/76, 5/262, 5/272, 5/275

(56) References Cited

U.S. PATENT DOCUMENTS 5,461,398 A * 10/1995 Tang et al. .................. 348/589

FOREIGN PATENT DOCUMENTS

| JP | 6253230 | 9/1994 | .......... H04N/5/445 |
| KR | 95-5259 | 7/1995 | |

OTHER PUBLICATIONS

Lunn et al. "Amultisystems on screen display for TV MCU" IEEE Transactions on Consumer Electronics, vol. 35, No. 4, pp. 803–809, Nov. 1989.*

* cited by examiner

Primary Examiner—David E. Harvey
(74) Attorney, Agent, or Firm—Mills & Onello LLP

(57) ABSTRACT

An on-screen display system is adapted for displaying OSD information on an OSD background portion which is selectively filled with either an half tone video image or a background raster of a specific color selected by a user, or which is filled by superimposing the half tone video image and the half tone background raster selected by the user. Mixing and amplifying circuits are provided for each of three red/green/blue (R/G/B) channels. Each of the three mixing and amplifying circuits receives a video signal and an OSD signal of a respective channel, mixes the video signal and the OSD signal according to a video selection signal and an OSD selection signal, amplifies a mixed signal, and outputs an amplified image signal to a display. A selection signal generating circuit receives OSD signals for R/G/B channels, a video/OSD switching signal, a half tone signal, and OSD control signals generates and outputs the OSD selection signal and the video selection signal. When the video/OSD switching signal instructs an OSD output operation and the half tone signal instructs a half tone output operation, the selection signal generating circuit outputs the video selection signal and the OSD selection signal such that a half tone OSD background raster is displayed with a half tone video image in a predetermined OSD window.

23 Claims, 33 Drawing Sheets

| OSD CONTROL SIGNAL | | HALF TONE DISPLAY INTERVAL | | | OSD BACKGROUND RASTER |
|---|---|---|---|---|---|
| HS0 | HS1 | R_OSD | G_OSD | B_OSD | |
| 0 | 0 | 0 | 0 | 0 | BLACK |
| 0 | 1 | 0 | 0 | 1 | BLUE |
| 1 | 0 | 0 | 1 | 0 | GREEN |
| 1 | 1 | 0 | 1 | 1 | CYANE |

| OSD CONTROL SIGNAL | | | HALF TONE DISPLAY INTERVAL | | | OSD BACKGROUND RASTER |
|---|---|---|---|---|---|---|
| HS1 | HS2 | HS3 | R_OSD | G_OSD | B_OSD | |
| 0 | 0 | 0 | 0 | 0 | 0 | BLACK |
| 0 | 0 | 1 | 0 | 0 | 1 | BLUE |
| 0 | 1 | 0 | 0 | 1 | 0 | GREEN |
| 0 | 1 | 1 | 0 | 1 | 1 | CYANE |
| 1 | 0 | 0 | 1 | 0 | 0 | RED |
| 1 | 0 | 1 | 1 | 0 | 1 | MAGENTA |
| 1 | 1 | 0 | 1 | 1 | 0 | YELLOW |
| 1 | 1 | 1 | 1 | 1 | 1 | WHITE |

FIG. 30
(a) 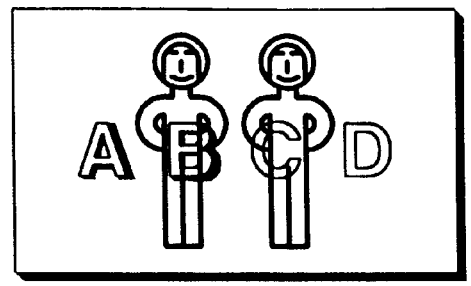
(b) 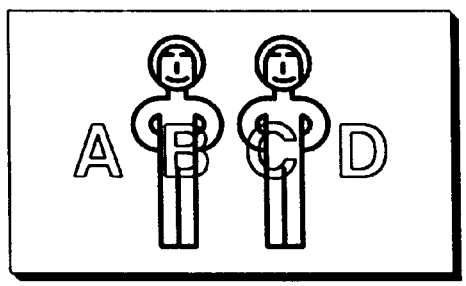
(c) 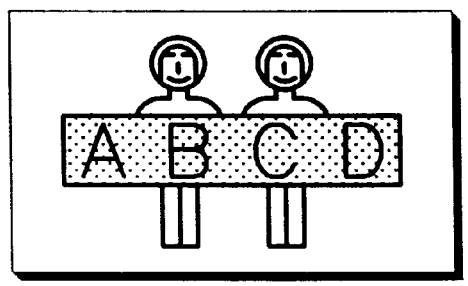
(d) 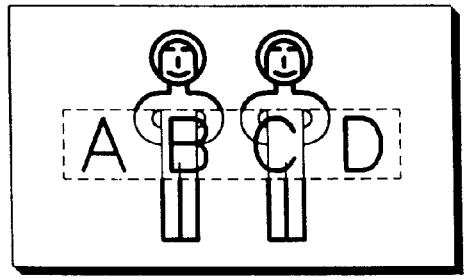

ON-SCREEN DISPLAY SYSTEM

RELATED APPLICATIONS

This application is based on Korean Patent Application No's. 98-5019, 98-13126, 98-30385, and 99-856 the contents of which are incorporated herein by reference.

BACKGROUND OF THE INVENTION

1. Field of the Invention

The present invention relates to a display apparatus, and more particularly, to a video preamplifier circuit for composing an on-screen display signal with a video signal, and for amplifying the result on the display apparatus.

2. Description of Related Arts

In a cathode ray tube (CRT) monitor or a liquid crystal display (LCD) used for a computer, for example, it is often necessary to display information such as characters on a video picture via an on-screen display (OSD). Examples of such OSD information include a user-controlled contrast or convergence level bar and the title of the item currently being adjusted. The mixing of such OSD information with the underlying video signal is performed in a video preamplifier integrated circuit (IC).

When the OSD characters are to be displayed, it is important to emphasize the characters so that they can be easily distinguished from the video picture. Shadowing techniques for shadowing certain edges of the characters as shown in FIG. 30A, or bordering techniques for emphasizing the outline of the characters as shown in FIG. 30B, may be employed for this purpose.

In another character emphasis method, an OSD window may be formed on the screen with only the characters being displayed in the window, while intercepting, or overwriting, the video signal in the window area. FIG. 25 and FIG. 30C are exemplary video images on which the OSD characters are displayed on the OSD window. In such an OSD window area, a background window 501 is formed in one color and the OSD characters 503 are displayed on the background screen. Typically, the OSD raster for forming the background portion is fixed in black or cyane.

Meanwhile, if the video signal is completely intercepted in the window area when the OSD window is formed on the screen, the quality of an image is considerably deteriorated because the original video image is completely overwritten by the OSD background window. Accordingly, in recent display systems, a half tone video image is displayed on the OSD background window by reducing the gain of the video signal by half as shown in FIG. 30D, instead of complete replacement of the video signal in the window area. In such a case, the OSD characters are displayed on the half-tone image.

However, a standard video preamplifier integrated circuit (IC) capable of displaying the half tone image in the OSD window generally does not support an operation mode of selectively filling the OSD background window by either the half tone image or an OSD background raster other than white. Thus, in a conventional OSD window generating system, in the video preamplifier IC, the OSD background window may be filled by an OSD background raster of a specific color or a half tone video image with a white background raster. Furthermore, in an IC which fills the OSD background portion with an OSD raster of a specific color, the color of the OSD background raster is generally fixed and cannot be changed.

Therefore, consumers of the video preamplifier IC, such as a monitor manufacturer, are limited to a single operation mode, and are forced to purchase another IC when the method of displaying the OSD window is to be changed according to the use of the monitor.

SUMMARY OF THE INVENTION

In order to solve the above problems, one object of the present invention is to provide an on-screen display system for displaying OSD information on an OSD background which is selectively filled with either a half tone video image or a background raster of a user-selectable color, or which is filled by superimposing the half tone video image and the half tone background raster selected by the user.

Another object of the present invention is to provide an on-screen display system for displaying a plurality of OSD windows and filling each of the plurality of OSD windows separately by filling with either a half tone video image or a background raster of a user-selectable color, or by superimposing the half tone video image and the half tone background raster selected by the user.

In the on-screen display system according to the present invention, to achieve one of the above objects, three mixing and amplifying circuits are provided respectively for each of red, green, and blue (R/G/B) channels. Each of the three mixing and amplifying circuits receives a video signal and an OSD signal of a respective channel, mixes the video signal and the OSD signal according to a video selection signal and an OSD selection signal, amplifies a mixed signal, and outputs an amplified image signal to a display. A selection signal generating circuit receives OSD signals for R/G/B channels, a video/OSD switching signal, a half tone signal, and OSD control signals, and generates and outputs the OSD selection signal and the video selection signal. When the video/OSD switching signal instructs an OSD output operation and the half tone signal instructs a half tone output operation, the selection signal generating circuit outputs the video selection signal and the OSD selection signal such that a half tone OSD background raster is displayed with a half tone video image in a predetermined OSD window.

According to an aspect of the present invention, the selection signal generating circuit is implemented by using logic gates. In the selection signal generating circuit, when the video/OSD switching signal instructs an OSD output operation, the half tone signal instructs a half tone operation, and the OSD signals have a predetermined logic combination, then a half tone display signal generator generates an active half tone display signal. An inverter inverts the video/OSD switching signal to output a video mode signal which is activated when only the video signal is to be output. An attenuator attenuates the half tone display signal to a fraction of, for example half, its original value. An adder adds the video mode signal to the output of the attenuator to output the addition result as the video selection signal and the OSD selection signal.

According to another aspect of the present invention, the selection signal generating circuit is implemented by using transistors and passive elements. In the selection signal generating circuit, a video/OSD switching unit receives the video/OSD switching signal and generates at least one switching signal according to the video/OSD switching signal. An OSD raster selector adjusts the swing ranges of the R/G/B OSD signals, determines whether each of the level-adjusted R/G/B OSD signals is at a first or second logic level, and outputs a raster selection signal when the R/G/B OSD signals corresponds to a predetermined combination of logic levels which is determined according to the OSD control signals. A half tone signal generator receives the switching signal and the raster selection signal from the video/OSD switching unit and the OSD raster selector, respectively, and generates the OSD selection signal and the video selection signal.

To achieve another one of the above objects, the on-screen display system of the present invention forms a first predetermined number of OSD windows in a displayed image and displays OSD information and video information in half tone in a second predetermined number of OSD windows among the first predetermined number of OSD windows. Three mixing and amplifying circuits are provided respectively for each of R/G/B channels. Each of the three mixing and amplifying circuits receives a video signal and an OSD signal of a respective channel, mixes the video signal and the OSD signal according to a video selection signal and an OSD selection signal, amplifies a mixed signal, and outputs an amplified image signal to a display. A selection signal generating circuit receives OSD signals for R/G/B channels, a video/OSD switching signal, a half tone signal, and OSD control signals for the second predetermined number of OSD windows, and generates and outputs the OSD selection signal and the video selection signal. When the video/OSD switching signal instructs an OSD output operation and the half tone signal instructs a half tone output operation, the selection signal generating circuit outputs the video selection signal and the OSD selection signal such that a half tone OSD background raster is displayed with a half tone video image in the second predetermined number of OSD windows.

In a preferred embodiment, the video selection signal and the OSD selection signal are identical and a single video/OSD selection signal is used. Each of the mixing and amplifying circuits amplifies only the video signal to output an amplified video signal when the video/OSD selection signal is at a first logic level, and only the OSD signal to output an amplified OSD signal when the video/OSD selection signal is at a second logic level. Each of the mixing and amplifying circuits mixes the video signal and the OSD signal to output an amplified and mixed signal when the video/OSD selection signal is at a medium logic level.

According to another aspect of the present invention, the selection signal generating circuit is implemented by using logic gates. In the on-screen display system, a gating signal generating unit generates a gating signal which is activated when the video/OSD switching signal instructs an OSD output operation and the half tone signal instructs an half tone operation. A first OSD determining unit receives the gating signal, OSD signals for the R/G/B channels, and the OSD control signals for a first window, and generates a first window discriminating signal which is activated only when the OSD signals have a first predetermined combination corresponding to the OSD control signals for the first window and the gating signal is activated. A second OSD determining unit receives the gating signal, OSD signals for the R/G/B channels, and the OSD control signals for a second window, and generates a second window discriminating signal which is activated only when the OSD signals have a second predetermined combination corresponding to the OSD control signals for the second window and the gating signal is activated. An OR gate performs an OR operation on the first window discriminating signal and the second window discriminating signal. An attenuator receives an output of the OR gate and attenuates the output of the OR gate to a half. An inverter receives and inverts the video/OSD switching signal and generates a video mode signal activated when only the video signal is to be output.

An adder adds the output of the attenuator to the video mode signal and outputs the addition result as the video/OSD selection signal.

According to another aspect of the present invention, the selection signal generating circuit is implemented by using transistors and passive elements. In the selection signal generating circuit, an OSD raster selector receives the OSD signals for R/G/B channels, and the OSD control signals for the first and second windows, and generates at least one raster selection signal which is enabled when the OSD signals have a logic combination corresponding the OSD control signals for the first window or the OSD control signals for the second window. A half tone signal generator receives the raster selection signal, the video/OSD switching signal and the half tone signal, and generates the video/OSD selection signal of medium level when the video/OSD switching signal instructs the OSD output operation, the half tone signal instructs the half tone output operation, and at least one of the raster selection signals is enabled.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 30A shows an example of a video screen on which OSD characters are displayed according to shadowing techniques.

FIG. 30B shows an example of a video screen on which OSD characters are displayed according to bordering techniques.

FIG. 30C shows an example of a video screen on which OSD characters are displayed in an OSD window of specific color.

FIG. 30D shows an example of a video screen on which OSD characters are displayed in an OSD window, while video signals are displayed in half tone in the OSD window.

DETAILED DESCRIPTION OF PREFERRED EMBODIMENTS

On-screen Display Systems for Implementing a Single OSD Window

Figure 1:
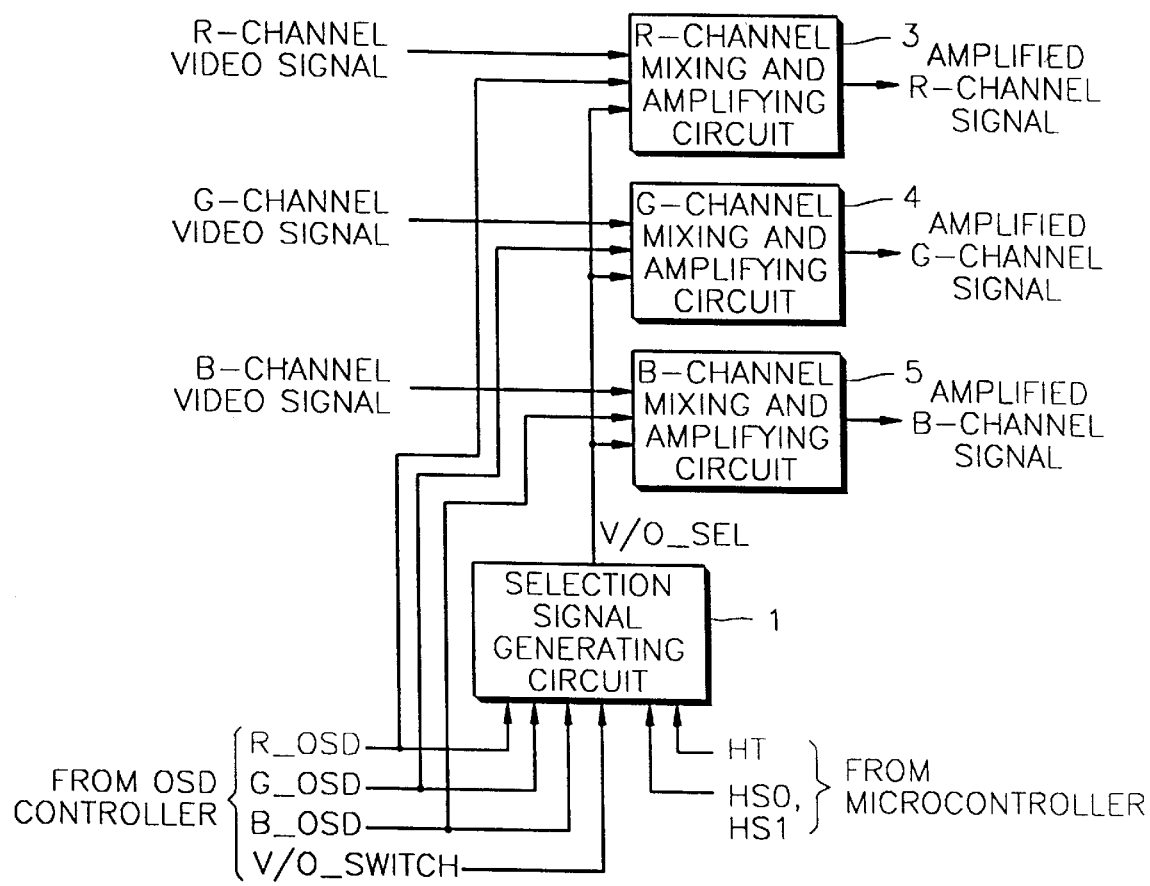
FIG. 1 is a block diagram of an embodiment of an on-screen display system according to the present invention.

Referring to FIG. 1, an on-screen display system includes a selection signal generating circuit 1 and mixing and amplifying circuits 3, 4, and 5 of red/green/blue (R/G/B) channels, respectively.

The selection signal generating circuit 1 receives OSD signals R_OSD, G_OSD, and B_OSD with respect to the R/G/B channels, a video/OSD switching signal V/O_SWITCH, a half tone signal HT, and an OSD control signal HS0 and HS1, and generates and outputs a video/OSD selection signal V/O_SEL according to the received signals.

Among the input signals, the OSD signals R_OSD, G_OSD, and B_OSD are input from a separate OSD controller (not shown). The video/OSD switching signal V/O_SWITCH, which indicates an OSD mode operation, is input from the OSD controller. The video/OSD switching signal V/O_SWITCH is, for example, at a "high" level in the OSD mode and at a "low" level in a non-OSD mode.

The half-tone signal HT, which is input from an external microcontroller (not shown), indicates whether the video signal is to be displayed in a half tone. When the half tone signal HT is at a "high" level and the OSD signals R_OSD, G_OSD, and B_OSD have a predetermined logic combination, the video signal is displayed with the tone, which will be described in detail below.

The OSD control signals HS0 and HS1 enable a manufacturer of a CRT monitor or a liquid crystal display (LCD) to select a desired OSD background raster so as to display the background screen of the OSD window with the selected color. The desired color of the background screen of the OSD window is programmed by the manufacturer of the display system, and the control signals HS0 and HS1 are input from the microcontroller according to the programming.

Figures 2, 3:
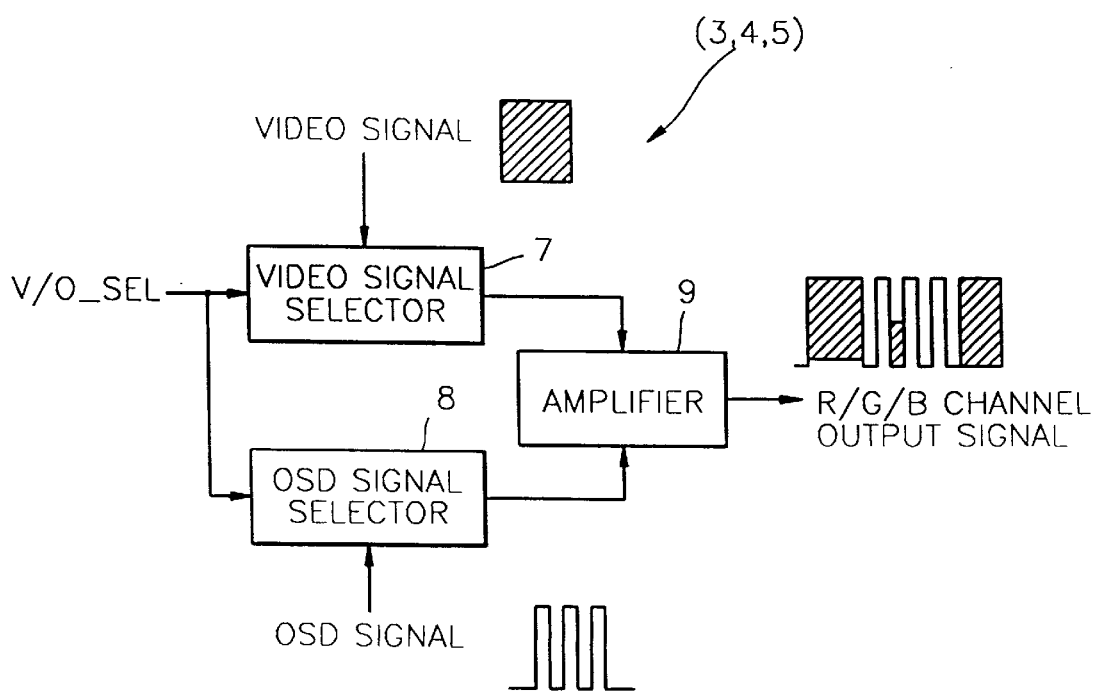
FIG. 2 is a boolean table summarizing intervals during which the video signal and the OSD background raster may be output in half tone in a OSD window and the resulting colors of the OSD background raster in accordance with the OSD control signals in the system of FIG. 1.
FIG. 3 is a detailed block diagram of one of the mixing and amplifying circuits of FIG. 1.

FIG. 2 is a boolean chart of intervals during which the video signal is output in the half tone along with the OSD background raster in the OSD window, along with the color of the OSD background raster, according to the OSD control signals HS0 and HS1.

If HS0 and HS1 are at "low" and "low" levels, respectively, the video signal and the OSD background raster can be output in the half tone when OSD signals R_OSD, G_OSD and B_OSD are at "low", "low" and "low" levels. In such a case, the color of the OSD background raster is black. At this time, the video signal and the OSD background raster is output in the half tone if the half tone signal HT is activated. However, the OSD background screen is filled with only the OSD background raster, completely overwriting the underlying image if the half tone signal HT is not activated.

If HS0 and HS1 are at "low" and "high" levels, respectively, the video signal and the OSD background raster can be output in the half tone when OSD signals R_OSD, G_OSD and B_OSD are at "low", "low" and "high" levels, and the color of the OSD background raster is blue. If HS0 and HS1 are at "high" and "low" levels, respectively, the video signal and the OSD background raster can be output in the half tone when OSD signals R_OSD, G_OSD and B_OSD are at "low", "high" and "low" levels, and the color of the OSD background raster is green. If HS0 and HS1 are at "high" and "high" levels, respectively, the video signal and the OSD background raster can be output in the half tone when OSD signals R_OSD, G_OSD and B_OSD are at "low", "high" and "high" levels, and the color of the OSD background raster is cyane.

Each of the mixing and amplifying circuits 3, 4, and 5 receives the video signals of a respective channel, mixes and amplifies the video signal and the OSD signal according to the video/OSD selection signal V/O_SEL, and outputs a mixed signal.

FIG. 3 is a block diagram of one of the mixing and amplifying circuits 3, 4, and 5 of FIG. 1.

A video signal selector 7 receives the video/OSD selection signal V/O_SEL through a first input terminal and the video signals through a second input terminal. When the video/OSD selection signal V/O_SEL is at a "high" level, the video signal selector 7 outputs the received video signal to an amplifier 9. However, when the video/OSD selection signal V/O_SEL is at a "low" level, the video signal selector 7 does not output the video signal. When the video/OSD selection signal V/O_SEL is at a "medium" level, the video signal selector 7 attenuates the received video signal to a fraction of its original level, for example half, and outputs the attenuated signal to the amplifier 9.

The OSD signal selector 8 receives the video/OSD selection signal V/O_SEL through an input terminal and the OSD signals through another input terminal. When the video/OSD selection signal V/O_SEL is at "low" level, the OSD signal selector 8 outputs the received OSD signals to the amplifier 9. However, when the video/OSD selection signal V/O_SEL is at "high" level, the OSD signal selector 8 does not output the OSD signal. When the video/OSD selection signal V/O_SEL is at "medium" level, the OSD signal selector 8 attenuates the received OSD signal to half its original level and outputs the attenuated signal to the amplifier 9.

The amplifier 9 receives the video signal and the OSD signal which are selectively output by the video signal selector 7 and the OSD signal selector 8, respectively, mixes and amplifies those signals, and outputs the amplified signal to a display driving unit such as an electron gun (not shown) of a cathode ray tube or an LCD driver.

Figure 26:
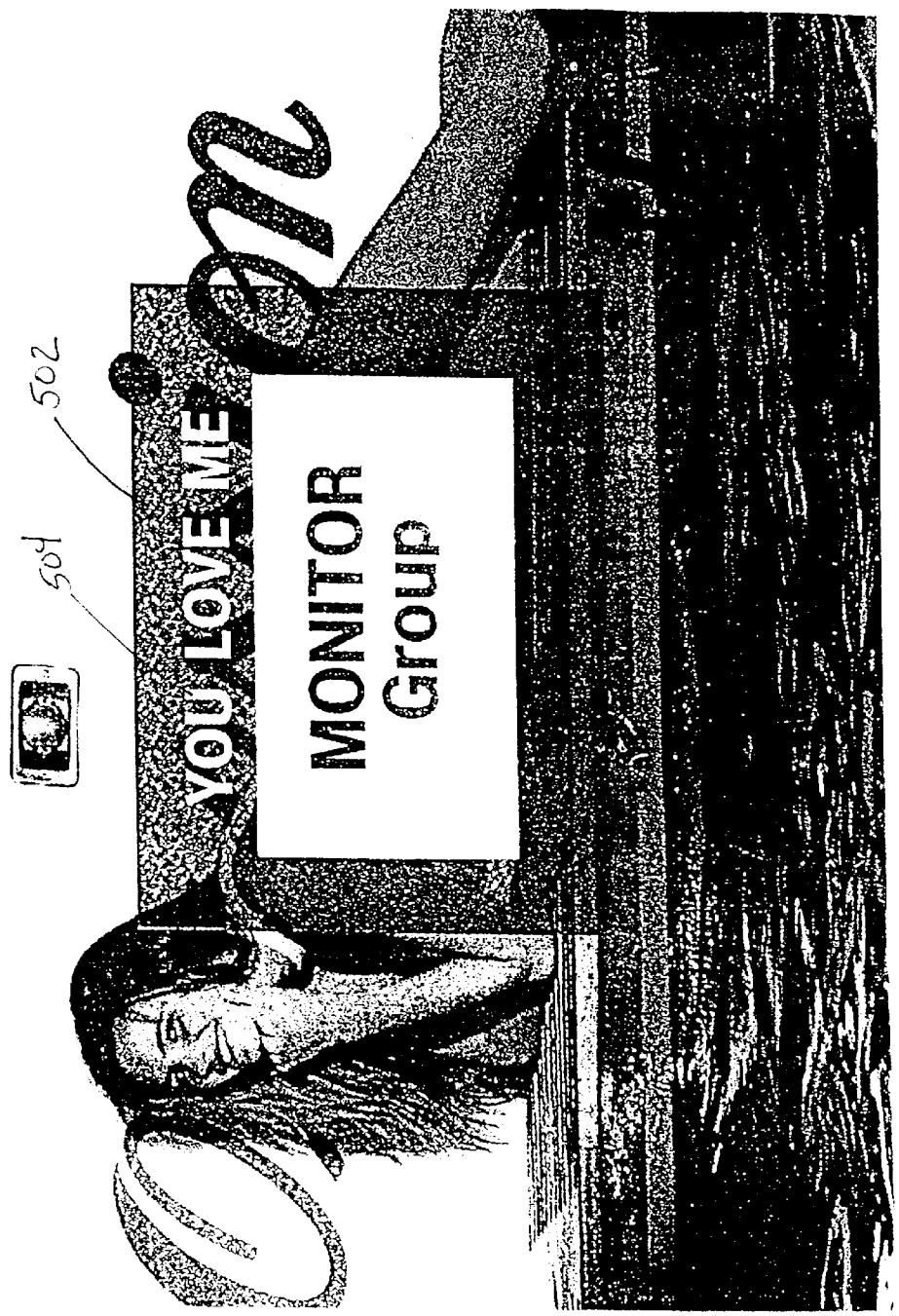
FIG. 26 shows an example of a video screen on which both video information and the OSD raster are displayed in the half tone in a single OSD window according to the on-screen display system of FIG. 1.

FIG. 26 shows an example of a screen on which both video information and the OSD raster are displayed in the half tone in a single OSD window according to the embodiment of an on-screen display system of FIG. 1. In the screen shown in FIG. 26, a half tone background raster is displayed along with the half tone video signal in the background portion 502. OSD characters 504 having a color different from that of the background portion are displayed on the background portion 502.

Figure 4:
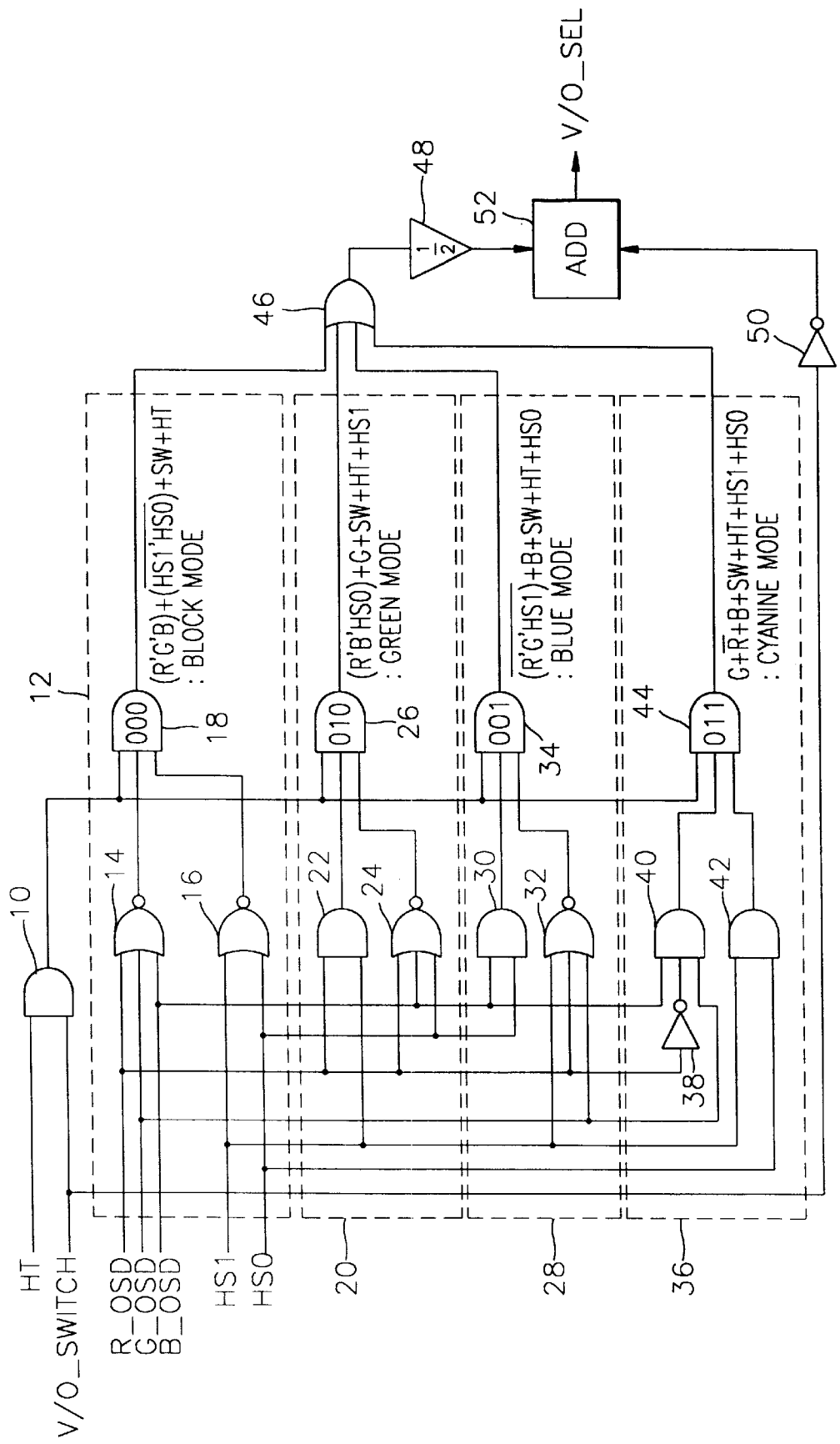
FIG. 4 is a circuit diagram of an embodiment of a selection signal generating circuit of FIG. 1.

FIG. 4 is a schematic diagram of an embodiment of the selection signal generating circuit of FIG. 1. The selection signal generating circuit includes an AND gate 10, first through fourth OSD determining units 12, 20, 28, and 36, an OR gate 46, an attenuator 48, an inverter 50, and an adder 52.

The AND gate 10 receives the half tone signal HT and the video/OSD switching signal V/O_SWITCH and performs an AND operation. Therefore, the AND gate 10 outputs a "high" signal only when the half tone signal HT and the video/OSD switching signal V/O_SWITCH are at "high" levels.

The output of the AND gate 10 operates as a gating signal in the first through fourth OSD determining circuits 12, 20, 28, and 36. Namely, only when the AND gate 10 outputs "high", the AND operation result of other input signals of the AND gates 18, 26, 34, and 44 in the first through fourth OSD determining circuits 12, 20, 28, and 36, respectively, are transmitted to the OR gate 46. When the AND gate 10 outputs a "low" level, the AND gates 18, 26, 34, and 44 in the first through fourth OSD determining circuits 12, 20, 28, and 36 output "low", and the OR gate 46 outputs "low".

The OR gate 46 performs an OR operation on the outputs of the first through fourth OSD determining circuits 12, 20, 28, and 36. The attenuator 48 attenuates the output of the OR gate 46 to a fractional value, for example half, and outputs the attenuated signal. The inverter 50 inverts the video/OSD switching signal V/O_SWITCH and outputs the inverted signal. The adder 52 adds the output signal of the attenuator 48 to that of the inverter 50 and outputs the addition result as the video/OSD selection signal V/O_SEL to the mixing and amplifying circuits 3, 4, and 5.

FIGS. 5A through 5E show output signals according to input signals for the circuit shown in FIG. 4. Hereinafter, the operation of the selection signal generating circuit of FIG. 4 will be described in further detail with reference to FIGS. 5A through 5E.

During intervals 60, 64, 68, and 72, a video mode operation is performed since the video/OSD switching signal V/O_SWITCH is at a "low" level. At this time, the AND gate 10 outputs "low" level, and the OR gate 46 accordingly outputs "low" level. However, the inverter 50 outputs "high". Therefore, the adder 52 outputs the video/OSD selection signal V/O_SEL of "high" level. Mixing and amplifying circuits 3, 4, and 5 of FIG. 1 amplify and output only R/G/B video signals, respectively, in response to the video/OSD selection signal V/O_SEL of "high" level.

During intervals 62 and 70, an OSD mode operation is performed since the video/OSD switching signal V/O_SWITCH is at a "high" level. Since the half tone signal HT is at a "low" level, the AND gate 10 outputs a "low" level and the OR gate 46 accordingly outputs "low". Also, the inverter 47 outputs "low". Accordingly, the adder 52 outputs a video/OSD selection signal V/O_SEL of "low" level. In response to the video/OSD selection signal V/O_SEL of "low" level, the mixing and amplifying circuits 3, 4, and 5 of FIG. 1 output only the OSD signals. Accordingly, only OSD information is displayed on the screen. The OSD information includes OSD character information and a background screen. The background screen has a specific color defined by the OSD control signals HS0 and HS1.

During intervals 66 and 74, the video/OSD switching signal V/O_SWITCH is at a "high" level to indicate the OSD operation mode, and the half tone signal HT is at a "high" level. In such a case, both the video signal and the OSD background raster are displayed in half tone in the background screen of the OSD window, which is now described in detail.

Figure 5A:
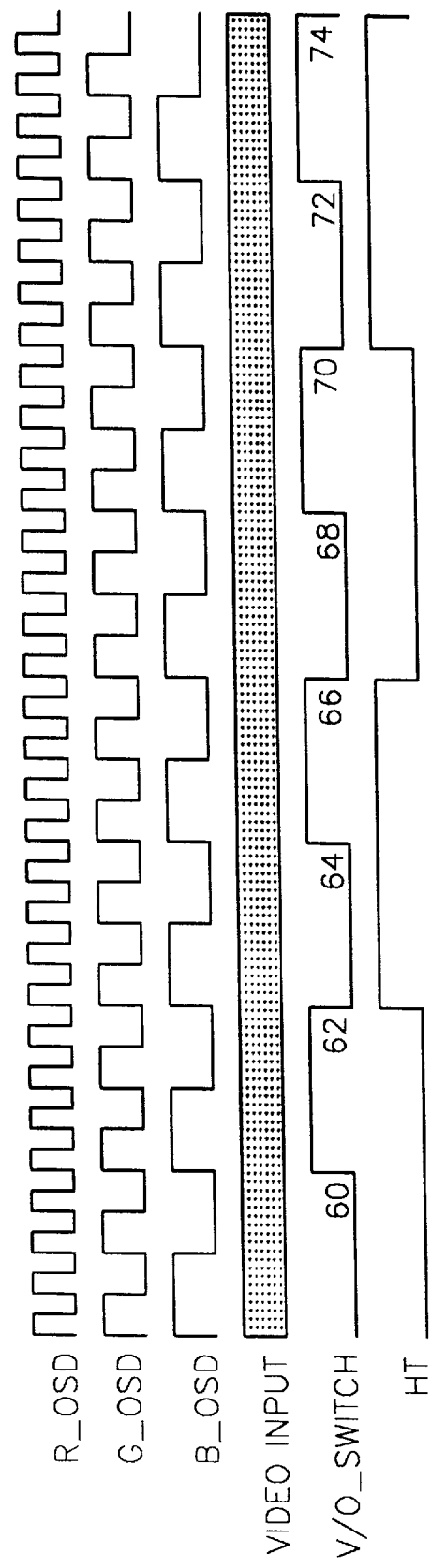
FIGS. 5A through 5E are waveform diagrams showing output signals resulting from various input signals for the circuit shown in FIG. 4.
Figure 5B:
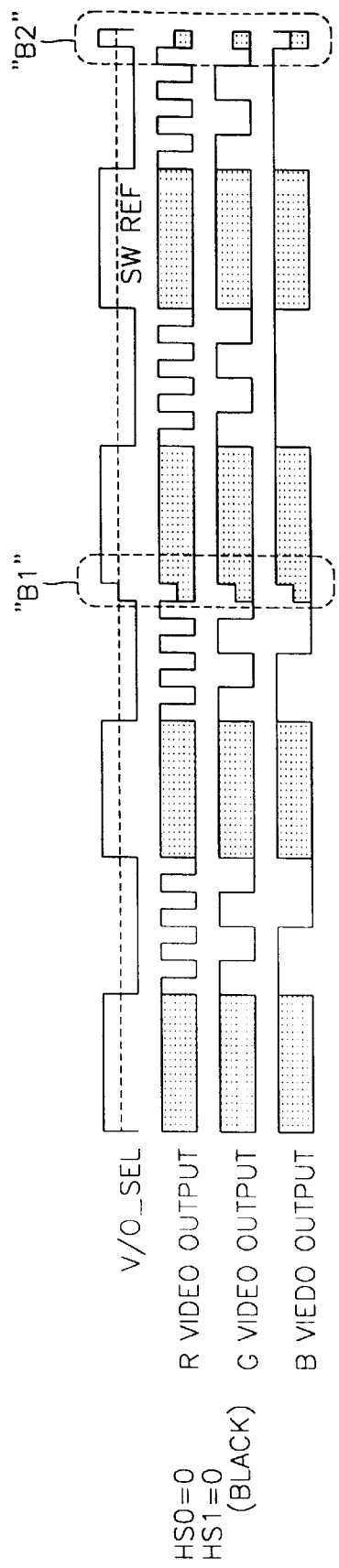

Assume that HS0 is at a "low" level and that HS1 is at a "low" level as shown in FIG. 5B. In such a case, since the OSD control signals HS0 and HS1 are at "low" levels, an inverted OR gate 16 in the first OSD determining circuit 12 outputs a "high" signal level. However, since gates 22, 30, and 42 output "low", the second through fourth OSD determining circuits 20, 28, and 36 output "low", and are deactivated.

In the first OSD determining circuit 12, the inverted OR gate 14 outputs "high" only when the OSD signals R_OSD, G_OSD, and B_OSD are at "low" levels. Therefore, only when the OSD signals R_OSD, G_OSD, and B_OSD are at "low" levels, the AND gate 18 outputs "high" and the OR gate 46 accordingly outputs "high". The attenuator 48 attenuates the output of the OR gate 46 to half its original value and outputs a signal at the "medium" level. The invertor 50 inverts the video/OSD switching signal V/O_SWITCH and outputs "low". The adder 52 adds the output of the attenuator 48 to the output of the inverter 50, and outputs the video/OSD selection signal V/O_SEL at the "medium" level. Therefore, when the OSD signals R_OSD, G_OSD, and B_OSD are at "low" level, i.e. during intervals "B1" and "B_2", a half tone OSD background screen raster of black color is displayed along with the half tone video information.

Figure 5C:
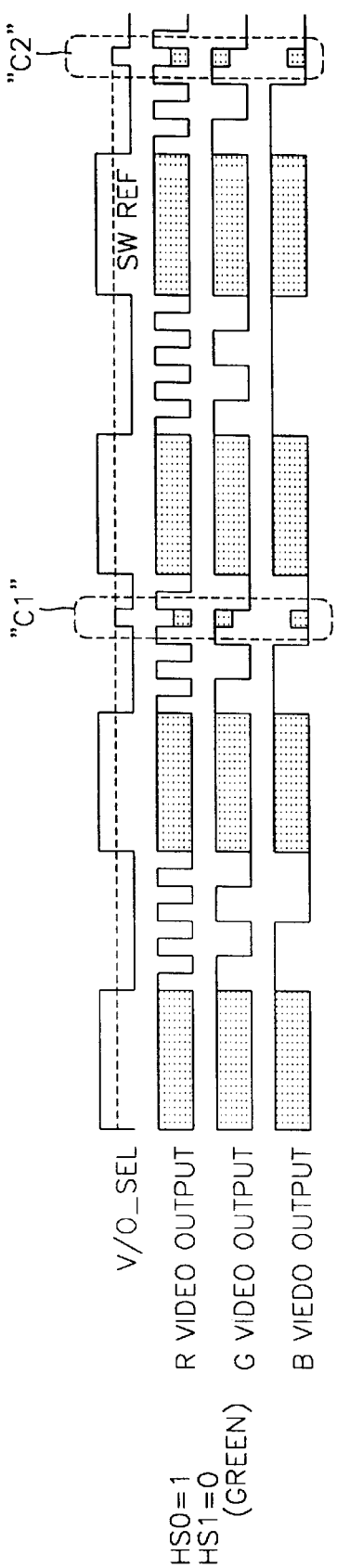

Assume now that HS0 is at a "low" level and HS1 is at a "high" level as shown in FIG. 5C. In this case, since gates 16, 24, and 30 output "low", the first, third, and fourth OSD determining circuits 12, 28, and 36 output "low" and are deactivated.

In the second OSD determining circuit 20, when the OSD signal G_OSD is at a "high" level and the OSD signals R_OSD and B_OSD are at "low" levels, the AND gate 26 outputs "high" and the OR gate 46 accordingly outputs "high". The attenuator 50 attenuates the output of the OR gate 46 to half its original value and outputs a signal at the "medium" level. At this time, the inverter 47 inverts the video/OSD switching signal V/O SWITCH and outputs "low". The adder 48 adds the output of the attenuator 50 to the output of the inverter 47, and outputs the video/OSD selection signal V/O_SEL at the "medium" level. Therefore, when the OSD signal G_OSD is at a "high" level and the OSD signals R_OSD and B_OSD are at "low" levels, i.e. during intervals "C1" and "C2,"a half tone OSD background screen raster of blue color is displayed along with the half tone video information.

Figure 5D:
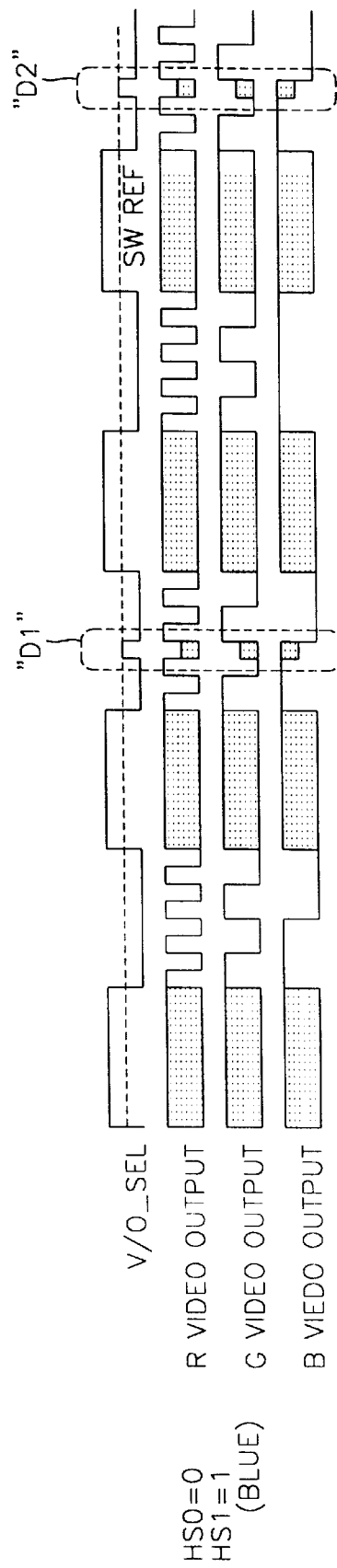

Assume now that HS0 is at a "high" level and that HS1 is at a "low" level as shown in FIG. 5D. In this case, since the gates 16, 22, and 42 output "low", the first, second, and fourth OSD determining circuits 12, 20, and 36 output "low" and are deactivated.

In the third OSD determining circuit 28, when the OSD signal B_OSD is at a "high" level and the OSD signal R_OSD and G_OSD are at "low" levels, the AND gate 34 outputs "high". At this time, the OR gate 46 outputs "high". Therefore, when the OSD signal B_OSD is at a "high" level and the OSD signals R_OSD and G_OSD are at "low" levels, i.e. during intervals "D1" and "D2,"a half tone OSD background screen raster of green color is displayed along with the half tone video information.

Figure 5E:
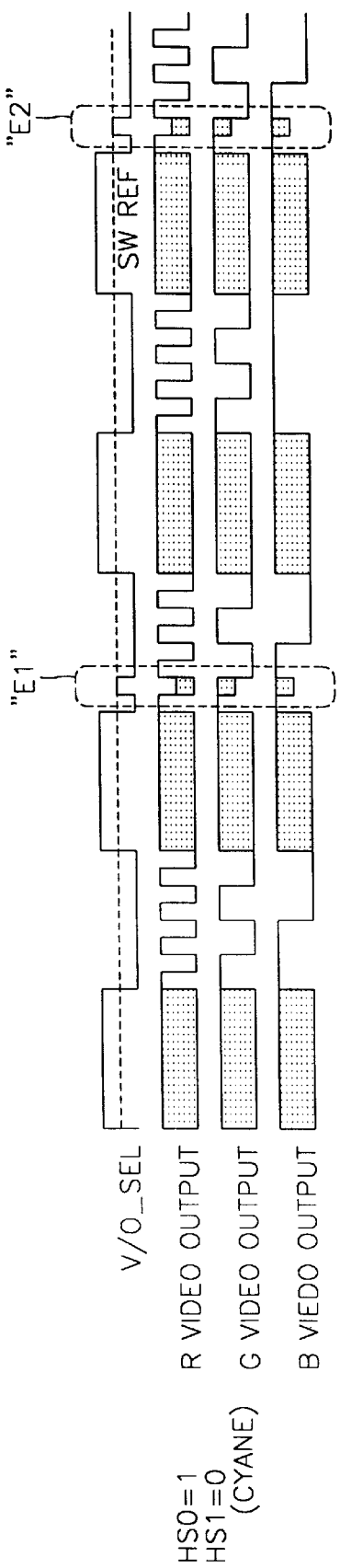

Assume now that HS0 is at a "high" level and that HS1 is at a "high" level as shown in FIG. 5E. In this case, since the gates 16, 24, and 32 output "low", the first, second, and third OSD determining circuits 12, 20, and 28 output "low" and are deactivated.

In the fourth OSD determining circuit 36, when the OSD signal R_OSD is at a "low" level and the OSD signals G_OSD and B_OSD are at "high" levels, the AND gate 44 outputs "high". At this time, the OR gate 46 outputs "high". Therefore, only when the OSD signal R_OSD is at a "low" level and the OSD signals G_OSD and B_OSD are at "high" levels, i.e. during intervals "E1" and "E2", a half tone OSD background screen raster of cyane is displayed along with the half tone video information.

As mentioned above, according to the present embodiment, it is possible to display the OSD background screen by an arbitrary OSD raster selected from a plurality of OSD rasters having different colors (the interval 62 and 70) or by a half tone OSD background screen raster of a specific color along with the half tone video information, in the OSD display area (the intervals 66 and 74).

Figure 6:
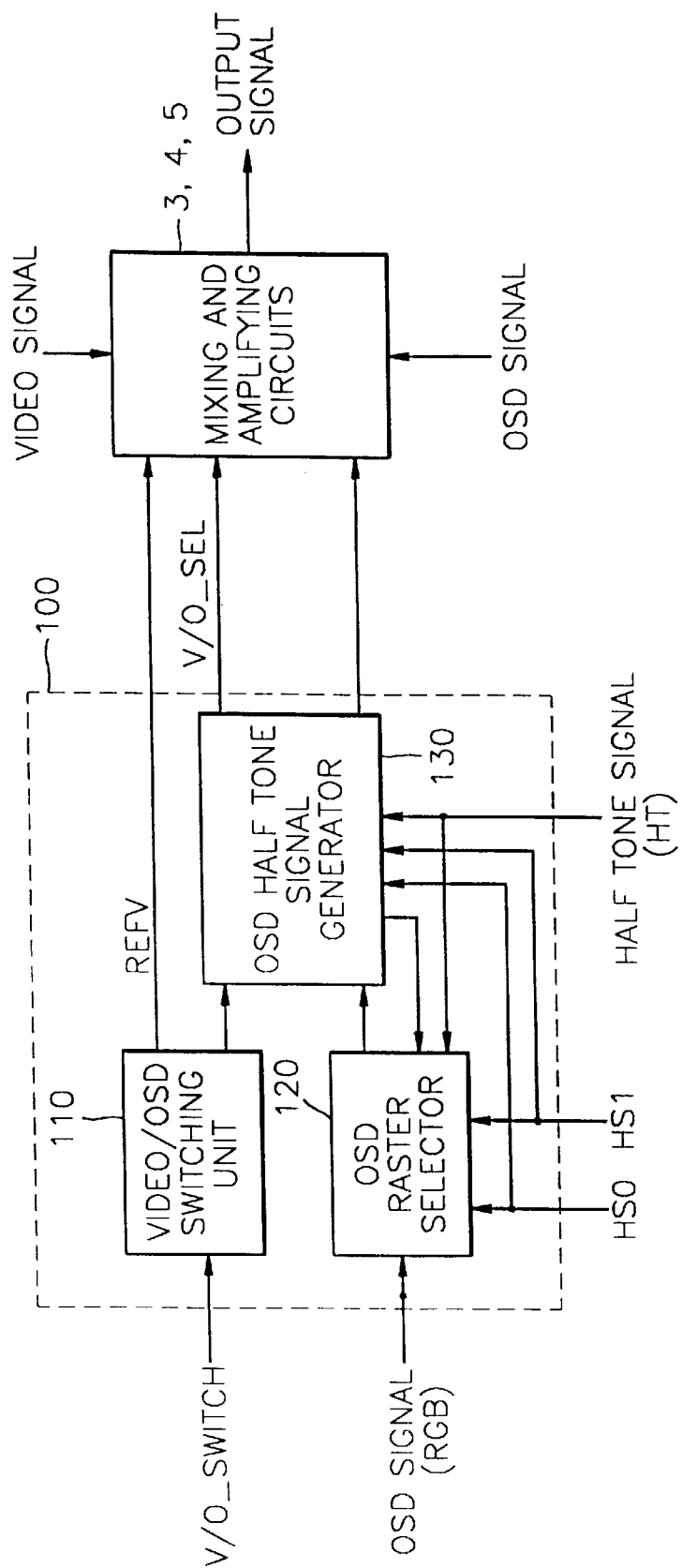
FIG. 6 is a block diagram of an alternative embodiment of the selection signal generating circuit of FIG. 1.

FIG. 6 shows an alternative embodiment of the selection signal generating circuit of FIG. 1.

Referring to FIG. 6, the selection signal generating circuit 100 includes a video/OSD switching unit 110, an OSD raster selector 120, and an OSD half tone signal generator 130. The mixing and amplifying circuits 3, 4, and 5 are also incorporated into the block diagram of FIG. 6.

The video/OSD switching unit 110 receives the video/OSD switching signal V/O_SWITCH and generates and outputs first and second switching signals SW1 and SW2. Also, the video/OSD switching unit 110 generates and outputs a reference voltage REFV for determining the level of a video/OSD selection signal V/O_SEL.

The OSD raster selector 120 adjusts the swing range of the RGB OSD signals and outputs a raster selection signal RSV according to a specific OSD signal input timing which depends on the OSD control signals HS0 and HS1 in the OSD operation mode, so that one of the plurality of OSD rasters is selected.

The OSD half tone signal generator 130 generates and outputs the video/OSD selection signal V/O_SEL according to the switching signals SW1 and SW2, and the OSD control signals HS0 and HS1, when the half tone signal HT dictates a half tone video output.

In order to further describe the present embodiment, the signals shown in FIGS. 6 and 7 through 10 are summarized as follows.

a video/OSD switching signal V/O_SWITCH: TTL level signal switching between 0 and 5V.

a first switching signal SW1: in a negative phase with respect to the video/OSD switching signal V/O_SWITCH and swings in the range of 5.1 through 6V.

a reference voltage REFV1: is at a central level of the swing range of the first switching signal SW1.

a second switching signal SW2: in a negative phase with respect to the video/OSD switching signal V/O_SWITCH and swings in the range of 4.35 through 5.25V.

a reference voltage REFV: is at a central level of the swing range of the second switching signal SW2.

an OSD control signal HS1: controls the G_OSD signal to select the OSD background raster and is switched between 0.1 and 2.1V.

an OSD control signal HS0: controls the B_OSD signal to select the OSD background raster and is switched between 0.1 and 2.1V.

a raster selection signal RSV: activated under a specific combination of the OSD signals in accordance with the OSD control signals HS0 and HS1 so that a certain OSD background raster is selected.

a half tone signal HT: switches between 0.1 and 3.1V and is at "high" level in a half tone operation mode.

a mode control signal HT_RS: is at 1.01V to enable the OSD raster selector in the OSD operation mode and is at 0V to disable the OSD raster selector in a non-OSD operation mode.

a select reference voltage BS2: a reference signal for determining the level of the OSD control signals HS0 and HS1.

Figure 7:
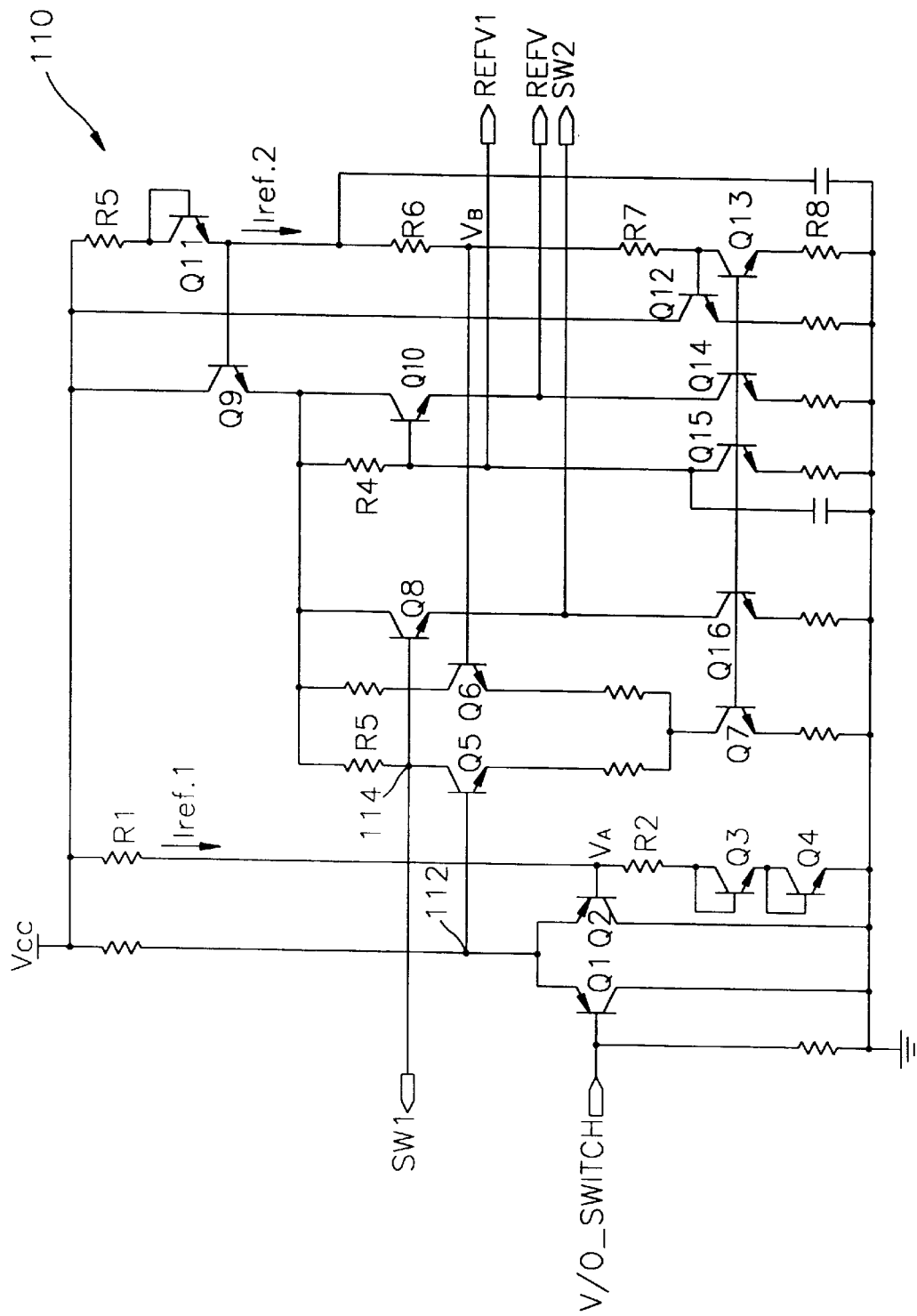
FIG. 7 is a circuit diagram of a video/OSD switching unit of FIG. 6.

FIG. 7 is a detailed circuit diagram of the video/OSD switching unit 110 of FIG. 6.

Referring to FIG. 7, transistors Q1 and Q2 comprise a comparator for restricting an upper limit of the video/OSD switching signal V/O_SWITCH to within a certain range. The video/OSD switching signal V/O_SWITCH is input to the base of the transistor Q1. Resistors R1 and R2 and transistors Q3 and Q4 form a first reference current $I_{ref,1}$ expressed by a following equation 1, so that a reference voltage $V_A$ expressed by a following equation 2 is provided to the base of the transistor Q2.

$$I_{ref,1} = \frac{Vcc - 2V_{be}}{R1 + R2} \tag{1}$$

$$V_A = Vcc - I_{ref,1} \cdot R1 \tag{2}$$

In the present illustrative embodiment, the reference voltage $V_A$ is 2.8V.

Transistors Q5 and Q6 comprise a comparator for restricting the lower limit of the swing range of the video/OSD switching signal V/O_SWITCH to within a certain range. Resistors R5, R6, R7, and R8 and transistors Q12 and Q13 form a second reference current $I_{ref,2}$ expressed by the following equation 3, so that a reference voltage $V_A$ expressed by the following equation 4 is provided to the base of the transistor Q6.

$$I_{ref,2} = \frac{Vcc - 3V_{be}}{R5 + R6 + R7 + R8} \quad (3)$$

$$V_B = Vcc - I_{ref,2} \cdot (R5 + R6) \quad (4)$$

In the present illustrative embodiment, the reference voltage $V_B$ is 1.5V. The second reference current $I_{ref,2}$ is repeated to the collectors of the transistors Q14, Q15, Q16, and Q7 by a current mirror which includes the transistors Q12 and Q13.

When the video/OSD switching signal V/O_SWITCH is at a "high" level, transistor Q1 is turned off but transistor Q2 is turned on. The electric potential of node 112 is about 3.6V, which is higher than the reference voltage $V_A$ by $1V_{be}$. The electric potential of the node 112 is provided to the base of the transistor Q5. At this time, the transistor Q5 is turned on but the transistor Q6 is turned off, so that the collector current of the transistor Q7 having the same magnitude as that of the second reference current $I_{ref,2}$ flows through the transistor Q5. The electric potential of a node 114 is expressed by a following equation 5 and has a value of 5.1V, which is output as the first switching signal SW1.

$$SW1 = Vcc - R4 \cdot I_{ref,2} - V_{be,11} - V_{be,9} - R3 \cdot I_{ref,2} \quad (5)$$

When the video/OSD switching signal V/O_SWITCH is at a "low" level, transistor Q1 is turned on but transistor Q2 is turned off. The electric potential of the node 112 falls and turns off transistor Q5 and turns on transistor Q6. Therefore, little current flows through the transistor Q5 and the collector current of the transistor Q7 flows through the transistor Q6. At this time, the electric potential of the node 114, i.e. the first switching signal SW1 is expressed by a following equation 6 and has a value of 6V.

$$SW1 = Vcc - R4 \cdot I_{ref,2} - V_{be,11} - V_{be,9} \quad (6)$$

As mentioned above, the first switching signal SW1 switches between 5.1 and 6V in response to the video/OSD switching signal V/O_SWITCH.

Another switching signal SW2 has a magnitude reduced from that of the first switching signal SW1 by $V_{be,8}$. Therefore, the second switching signal SW2 has the same phase as that of the first switching signal SW1 and switches between 4.35 and 5.25V.

On the other hand, the video/OSD switching unit of FIG. 7 generates and outputs two reference voltages REFV1 and REFV. The reference voltage REFV1 is calculated according to a following equation 7 and has a value of 5.55V.

$$REFV1 = Vcc - R5 \cdot I_{ref,2} - V_{be,11} - V_{be,9} - R4 \cdot I_{ref,2} \quad (7)$$

The reference voltage REFV has a magnitude reduced from that of the reference voltage REFV1 by $V_{be,10}$.

Figure 8A:
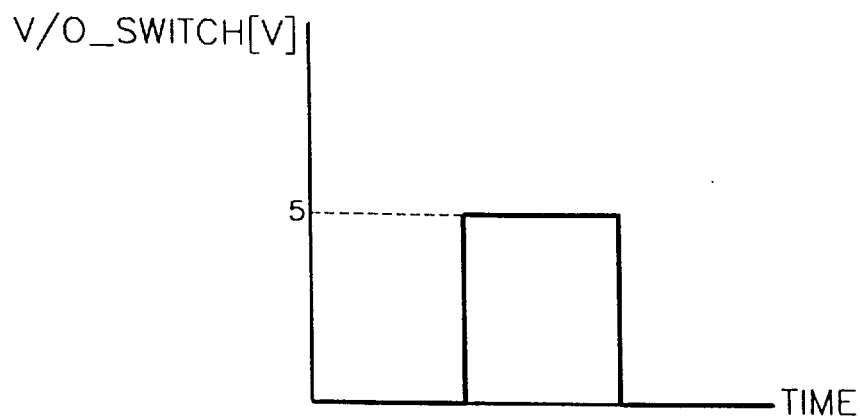
FIGS. 8A through 8C are graphs showing output signals responsive to an input signal in the video/OSD switching unit of FIG. 7.
Figure 8B:
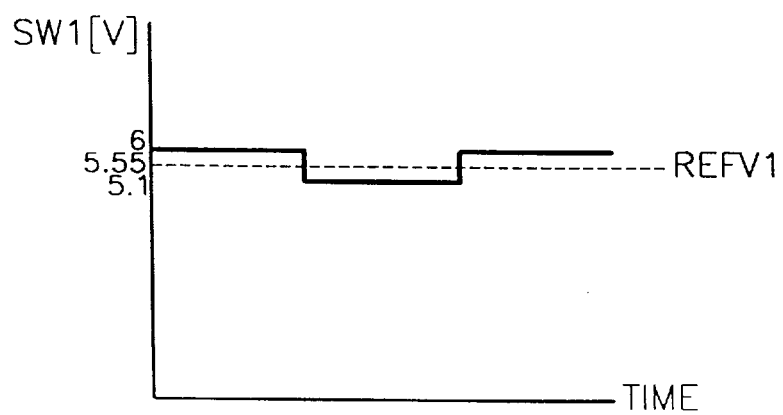
Figure 8C:
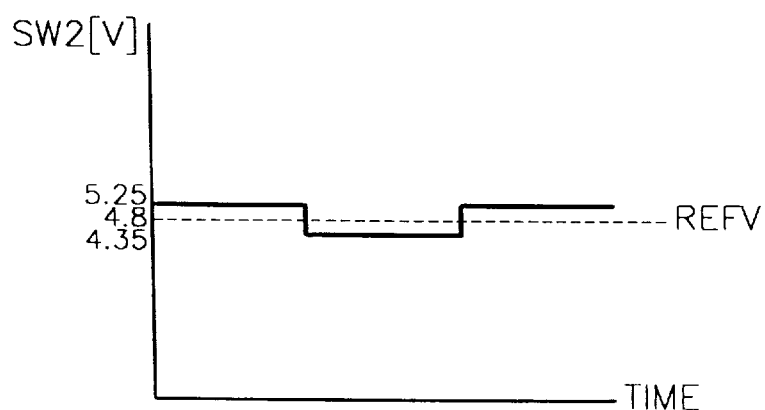

FIGS. 8A through 8C are graphs showing an output signal according to an input signal for the circuit of FIG. 7. As shown in FIG. 8A, when the video/OSD switching signal V/O_SWITCH of the TTL level is input, the first switching signal SW1 is in the opposite phase to that of the video/OSD switching signal V/O SWITCH and switches between of 5.1 and 6V. The reference voltage REF1 is at a central level of the swing range of the first switching signal SW1. The second switching signal SW2 has the same phase as that of the first switching signal SW1 and switches between 4.35 and 5.25V. The reference voltage REFV is at a central level of the swing range of the second switching signal SW2.

Figure 9:
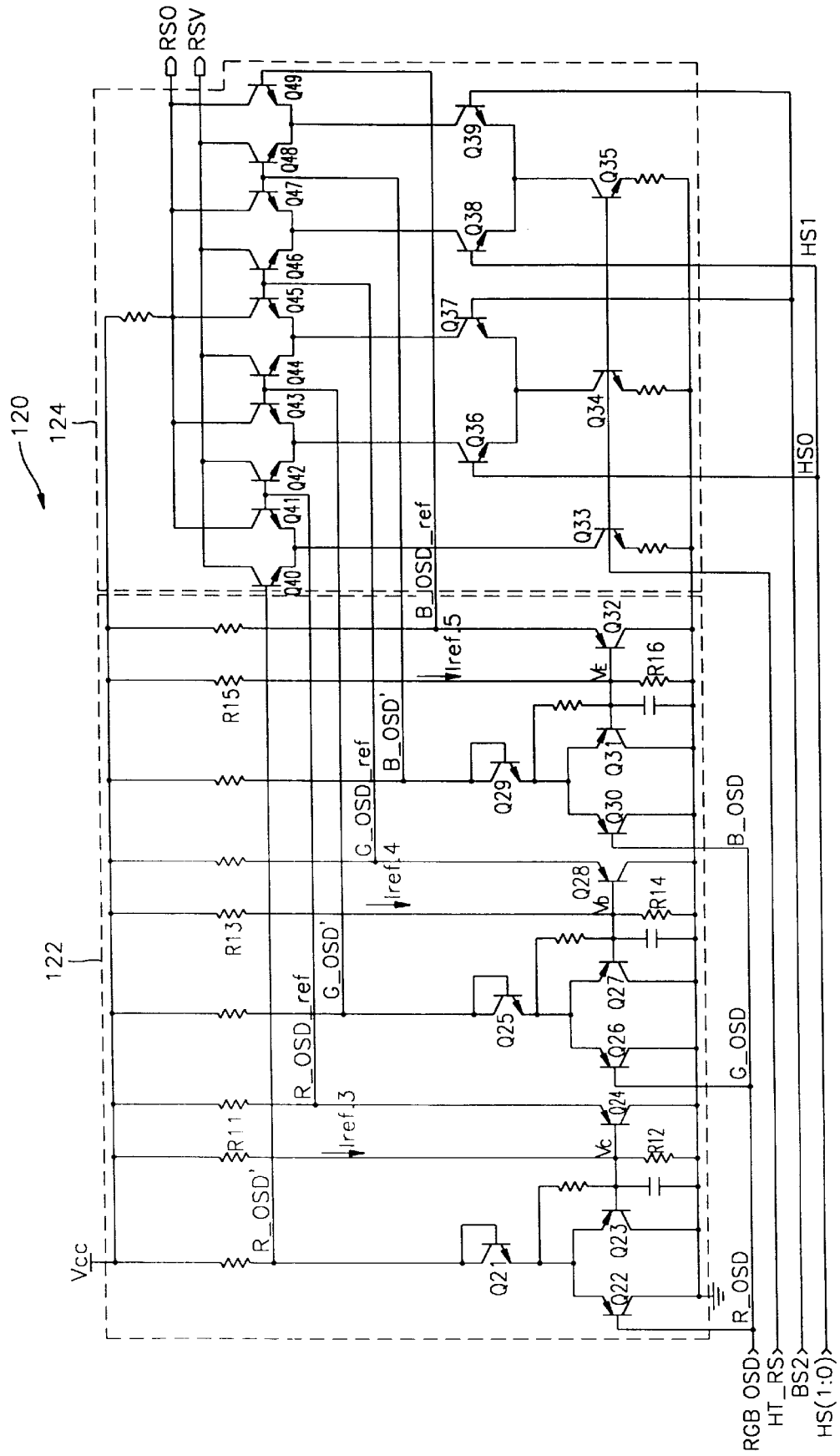
FIG. 9 is a circuit diagram of an OSD raster selector of FIG. 6.

FIG. 9 is a detailed schematic diagram of the OSD raster selector 120 of FIG. 6.

The OSD raster selector 120 includes a level adjustment circuit 122 and a comparing circuit 124. The level adjustment circuit 122 adjusts the swing range of the OSD signals R_OSD, G_OSD, and B_OSD and provides the level-adjusted OSD signals to the comparing circuit 124. The comparing circuit 124 outputs the raster selection signal RSV for the OSD window, which is activated only when a specific logic combination of the OSD signals is input according to the OSD control signals HS0 and HS1.

In the level adjusting circuit 122, resistors R11 and R12 form a third reference current $I_{ref,3}$ and divides a power voltage Vcc so that a voltage $V_c$ is provided to the base of a transistor Q23. The transistors Q22 and Q23 compares the R_OSD with the voltage $V_C$ in order to adjust the swing range of the R_OSD. According to the comparison result, the collector voltage of the transistor Q21 varies, and is provided to the comparing circuit 124 as a level-adjusted OSD signal R_OSD'. The "low" and "high" levels of the level-adjusted OSD signal R_OSD' are determined by the following equation 8 and have the values of 1.6V and 3.6V, respectively, in the present embodiment.

$$R\_OSD'(low) = R\_OSD(low) + V_{be,22} + V_{be,21}$$

$$R\_OSD'(high) = R12 \cdot I_{ref,3} + V_{be,23} + V_{be,21} \quad (8)$$

Resistors R13 and R14 form a fourth reference current $I_{ref,4}$ and divide the power voltage Vcc so that a voltage VD is provided to the base of a transistor Q27. The transistors Q26 and Q27 compare the G_OSD with the voltage $V_D$ in order to adjust the swing range of the G_OSD. According to the comparison result, the collector voltage of the transistor Q25 varies, and is provided to the comparing circuit 124 as a level-adjusted OSD signal G_OSD'. The level-adjusted OSD signal G_OSD' swings in the range of 2.9 through 3.7V.

Resistors R15 and R16 form a fifth reference current $I_{ref,5}$ and divide the power voltage Vcc so that a voltage $V_E$ is provided to the base of a transistor Q31. The transistors Q30 and Q31 compare the B_OSD with the voltage $V_E$ in order to adjust the swing range of the B_OSD. According to the comparison result, the collector voltage of the transistor Q29 varies, and is provided to the comparing circuit 124 as a level-adjusted OSD signal B_OSD'. The level-adjusted OSD signal B_OSD' swings in the range of 2.9 through 3.7V.

The emitter voltage of the transistor Q24 is higher than the voltage $V_C$ by $1V_{be}$ and is output to the comparing circuit 124 as an R channel OSD reference signal R_OSD_ref. The emitter voltage of the transistor Q28 is higher than the voltage $V_D$ by $1V_{be}$ and is output to the comparing circuit 124 as a G channel OSD reference voltage G_OSD_ref. The emitter voltage of the transistor Q32 is higher than the voltage $V_E$ by $1V_{be}$ and is output to the comparing circuit 124 as a B channel OSD reference voltage B_OSD_ref.

The operation of the comparing circuit 124 is controlled by a mode control signal HT_RS output by the OSD half tone signal generating circuit 130 of FIG. 6. When the mode control signal HT_RS is at a "high" level, transistors Q33, Q34, and Q35 provide current to activate the comparing circuit 124. When the mode control signal HT_RS is at "low" level, the transistors Q33, Q34, and Q35 are deactivated and the comparing circuit 124 does not operate. In the following description, it is assumed that the mode control signal HT_RS is at a "high" level.

The comparators comprised of transistors Q36 and Q37 and transistors Q38 and Q39 compare the OSD control signals HS1 and HS0 with a reference voltage BS2 from the half tone signal generating circuit 130 and control the operations of the comparators comprised of transistor pairs Q40 and Q41, Q42 and Q43, Q44 and Q45, Q46 and Q47, and Q48 and Q49 according to the comparison result. The five comparators comprised of the transistor pairs Q40 and Q41, Q42 and Q43, Q44 and Q45, Q46 and Q47, and Q48 and Q49 compare the level-adjusted OSD signals R_OSD', G_OSD', and B_OSD' with the OSD reference voltages R_OSD_ref, G_OSD_ref, and B_OSD$_{ref}$, and output the raster selection signal RSV according to the comparison result. Therefore, the raster selection signal RSV, which is an active-low signal, is enabled or disabled according to the OSD control signals HS1 and HS2. As described below, the video/OSD selection signal V/O_SEL is at a "high" level when the raster selection signal RSV is disabled to "high", but the video/OSD selection signal V/O_SEL is at either "low" or "medium" level depending on the logic status of the half tone signal HT when the raster selection signal RSV is enabled to "low".

Assume that HS0 is at "low" level and that HS1 is at "low" level. In this case, transistor Q36 is deactivated but transistor Q37 is activated. Also, the transistor Q38 is deactivated but transistor Q39 is activated. Therefore, the transistor pairs Q40 and Q41, Q44 and Q45, and Q48 and Q49 operate. Accordingly, only when the signals R_OSD', G_OSD', and B_OSD' are at "low" levels, the raster selection signal RSV is activated to a "low" level. Therefore, a black OSD background raster is selected.

Assume now that HS0 is at a "low" level and HS1 is at a "high" level. In this case, transistor Q36 is activated but transistor Q39 is activated. Therefore, the transistor pairs Q40 and Q41, Q42 and Q43, and Q48 and Q49 operate. Accordingly, only when the signals R_OSD' and G_OSD' are at "low" levels and the signal B_OSD' is at a "high" level, the raster selection signal RSV is activated. Therefore, the blue OSD background raster is selected in such a case.

Assume now that HS0 is at "high" level and that HS1 is at a "low" level. In this case, transistor Q36 is deactivated but transistor Q37 is activated. Also, transistor Q38 is activated and transistor Q39 is deactivated. Therefore, the transistor pairs Q40 and Q41, Q44 and Q45, and Q46 and Q47 operate in this case. Accordingly, only when the signals R_OSD' and B_OSD' are at "low" levels and the signal B_OSD' is at a "high" level, the raster selection signal RSV is activated. Therefore, the green OSD background raster is selected in this case.

Assume now that HS0 is at a "high" level and that HS1 is at a "high" level. In this case, transistor Q36 is activated but transistor Q37 is deactivated. Also, transistor Q38 is activated and transistor Q39 is deactivated. Therefore, the transistor pairs Q40 and Q41, Q42 and Q43, and Q46 and Q47 operate. Accordingly, only when the signal R_OSD' is at "low" level and the signals G_OSD' and B_OSD' are at "high" levels, the raster selection signal RSV is activated. Therefore, the cyane OSD background raster is selected.

Figure 10:
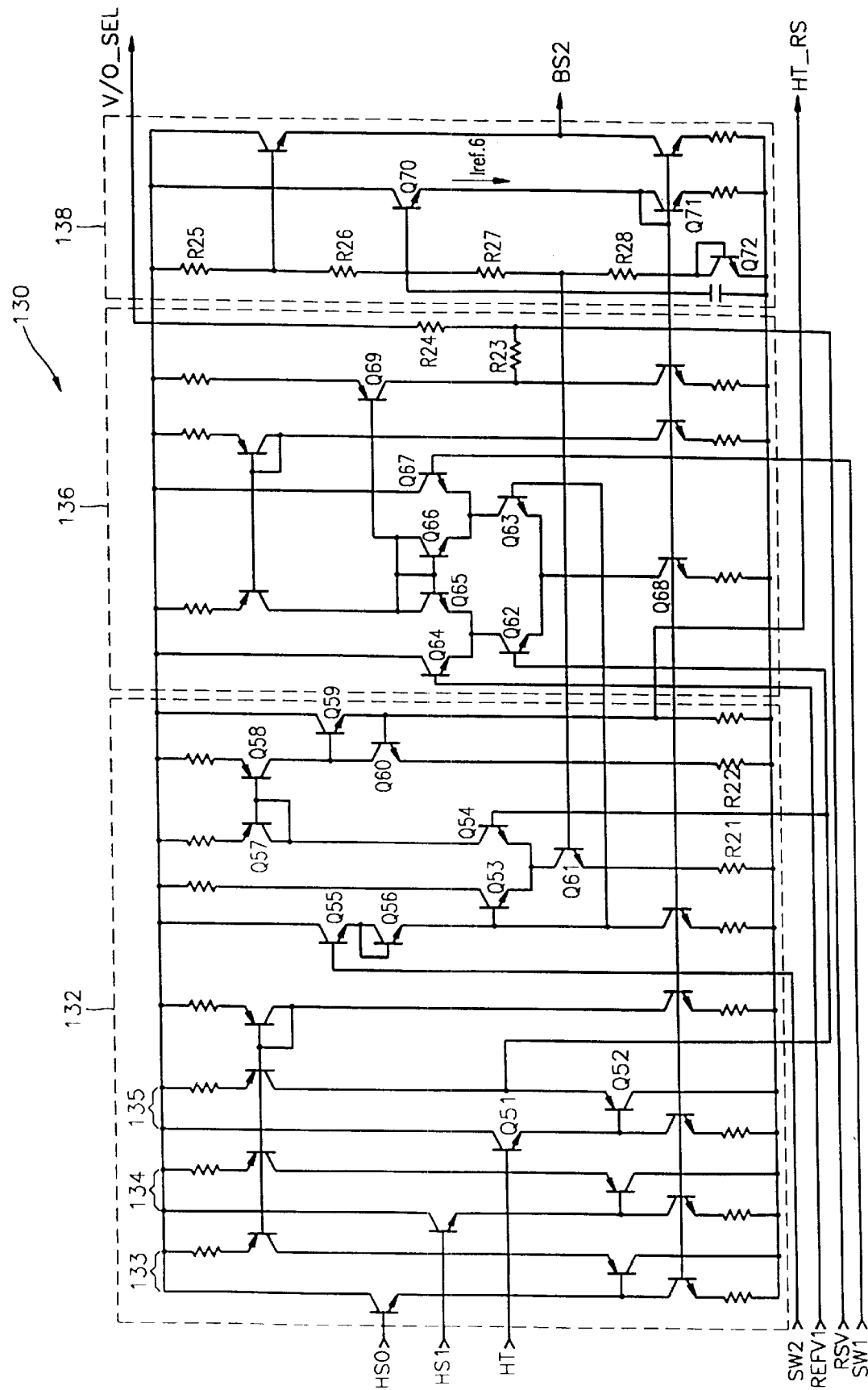
FIG. 10 is a circuit diagram of an OSD half tone signal generator of FIG. 6.

FIG. 10 is a detailed schematic diagram of the OSD half tone signal generator 130 of FIG. 6. The OSD half tone signal generator 130 of FIG. 10 includes a mode control signal generating circuit 132, an output signal generating circuit 136, and a reference signal generating circuit 138.

The mode control signal generating circuit 132 receives the half tone signal HT and the second switching signal SW2, generates the mode control signal HT_RS, and outputs such signal to the OSD raster selector 120 of FIG. 9. The output signal generating circuit 136 receives the raster selection RSV and a signal SW2–2V$_{be}$ reduced from the second switching signal SW2 by 2V$_{be}$, and generates and outputs the video/OSD selection signal V/O_SEL. The reference signal generating circuit 138 generates a plurality of reference voltages and provides such signals to the mode control signal generating circuit 132 and the output signal generating circuit 136. Also, the reference signal generating circuit 138 generates the reference voltage BS2 and output such signal to the OSD raster selector 120 of FIG. 9.

In the reference signal generating circuit 138, the serially connected resistors R25, R26, R27, and R28 and transistor Q72 divide the power supply voltage Vcc, so that a predetermined voltage is provided to the base of the transistor Q61 and a constant current flows through a transistor Q61. Also, since the base of a transistor Q70 is biased at a constant level, a certain reference current I$_{ref,6}$ flows through the transistors Q70 and Q71. The current is repeated through various transistors such as transistor 68.

In the mode control signal generating circuit 132, transistors Q53 and Q54 comprise a comparator. A signal SW2–2V$_{be}$, reduced from the second switching signal by 2V$_{be}$ through transistors Q55 and Q56, is applied to the base of transistor Q53. The half tone signal HT having 3.1V level in the half tone mode is reduced by V$_{be}$ by transistor Q51 and increased by 1V$_{be}$ by transistor Q52, and is applied to the base of transistor Q54. In this manner, the half tone signal HT is applied to the base of transistor Q54. When the second switching signal SW2 is at a "high" level to indicate the video interval, transistor Q53 is activated, but transistor Q54 is deactivated. Accordingly, minimal current flows through transistor Q60 and resistor R22, and the mode control signal HT_RS is at "low" level of about 0V. When the second switching signal SW2 is at "low" level to indicate the OSD interval, transistor Q53 is deactivated but transistor Q54 is activated. Accordingly, some current flows through transistor Q60 and resistor R22. In a current mirror comprised of transistors Q57 and Q58, transistor Q58 supplies about three times amount of current than that of transistor Q57. Therefore, the magnitude of the mode control signal HT_RS at this time is expressed by the following equation 9 and is at a "high" level of 1.01V.

$$HT\_RS = 3I_{ref,6} \cdot R25 + V_{be,60} \quad (9)$$

In the output signal generating circuit 136, transistors Q62 and Q63 comprise a comparator. A signal having the same level as that of the half tone signal HT is applied to the base of a transistor Q62. A signal SW2-2V$_{be}$ reduced from the second switching signal by 2V$_{be}$ is applied to the base of the transistor Q62. The transistor Q62 is activated to operate a buffer comprised of the transistors Q64 and Q65 only when the half tone signal HT is at "high" level and the second switching signal SW2 is at "low" level. A voltage having the same magnitude as that of the reference voltage REFV1 is applied to the base of the transistor Q69 and is output as the video/OSD selection signal V/O_SEL through the resistors R23 and R24. At this time, the current output to the OSD raster selector 120 of FIG. 9 through the RSV signal is negligible. Therefore, the video/OSD selection signal V/O_SEL has the same level as that of the reference voltage REFV1. When the second switching signal SW2 is at a "high" level to indicate the video interval, the second switching signal SW2 is input to the buffers comprised of the transistors Q66 and Q67 and output through the transistor Q69 and the resistors R23 and R24 as the video/OSD selection signal V/O_SEL.

In FIG. 10, buffers 133, 134, and 135 minimize the current load of the OSD control signals HS0 and HS1 by buffering the OSD control signals HS0 and HS1 and the half tone signal HT. Also, buffered signals HS0' and HS1' are used instead of the OSD control signals HS0 and HS1 in the OSD raster selector 120 of FIG. 9. However, in the above description, the buffered signals HS0' and HS1' were written as the OSD control signals HS0 and HS1 for convenience.

Figure 11A:
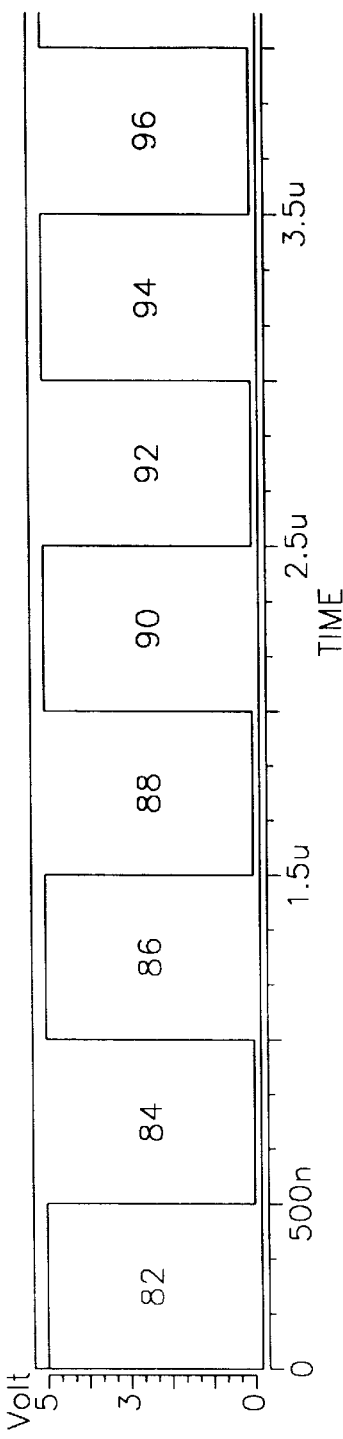
FIGS. 11A through 11C are waveform diagrams showing a simulation result for an on-screen display system integrated circuit chip implemented in accordance with the embodiment of FIG. 6.
Figure 11B:
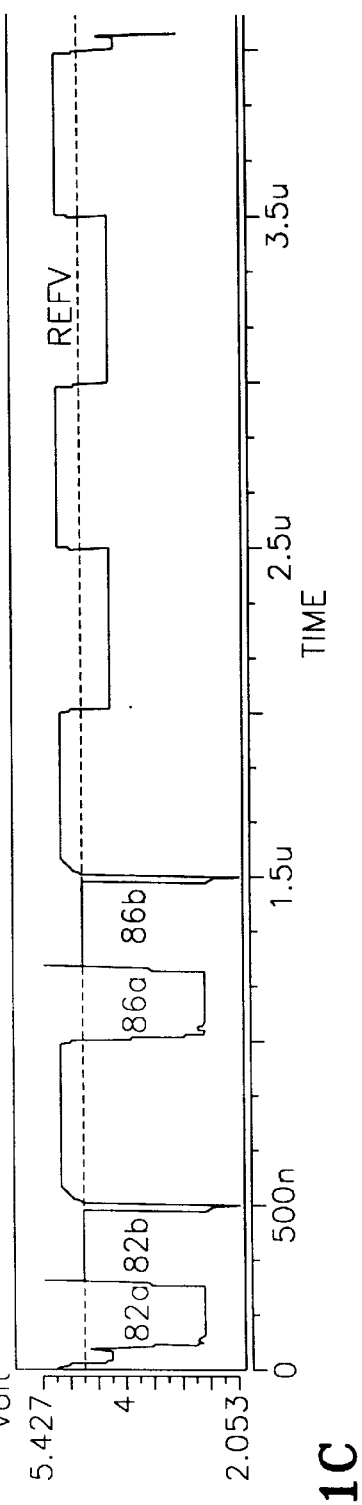
Figure 11C:
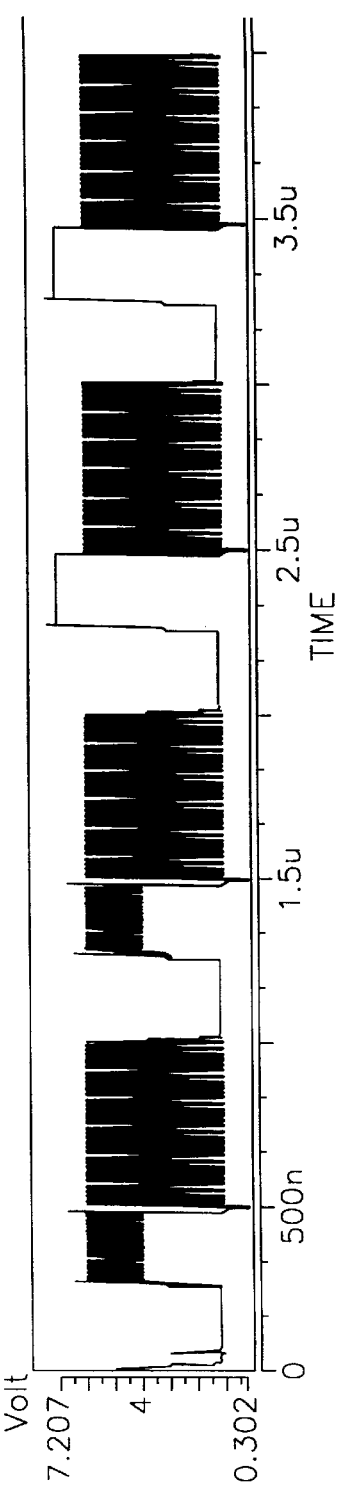

FIGS. 11A through 11C are waveform diagrams showing a simulation result of the on-screen display system integrated circuit chip implemented in accordance with the present embodiment. FIG. 11A shows the waveform of the video/OSD switching signal V/O_SWITCH. FIG. 11B shows the waveform of the video/OSD selection signal V/O_SEL. FIG. 11C shows the output signal of a mixing and amplifying circuit with respect to an arbitrary channel. In the simulation of FIGS. 11A through 11C, it is assumed that the half tone signal HT is activated in intervals 82 through 88 and deactivated in intervals 90 through 96.

Interval 82 can be divided into two sub-intervals 82a and 82b in which the video/OSD selection signal V/O_SEL has a different level from each other according to the OSD control signals HS0 and HS1 (not shown). During interval 82a, the video/OSD selection signal V/O_SEL is at a "low" level, and no signal is output from the mixing and amplifying circuit. During interval 82b, the video/OSD selection signal V/O_SEL has the same level as that of the reference voltage REFV. Accordingly, the half tone video signal is output along with the half tone OSD signal. The operation in a interval 86 is the same as that of interval 82.

During intervals 84, 88, 92, and 96, which are the video output intervals, only video signals are output regardless of the half tone signal HT. During interval 90, the video/OSD selection signal V/O_SEL is at "low" level, and only the OSD signals are output from the mixing and amplifying circuit. The operation of interval 94 is the same as that of interval 90.

As mentioned above, according to the present embodiment, it is possible to display the OSD background screen by selecting one among the OSD rasters of various colors in realizing the OSD function or by the half tone video signal along with the half tone OSD signal.

On-screen Display Systems for Implementing Plural OSD Windows

Figure 12:
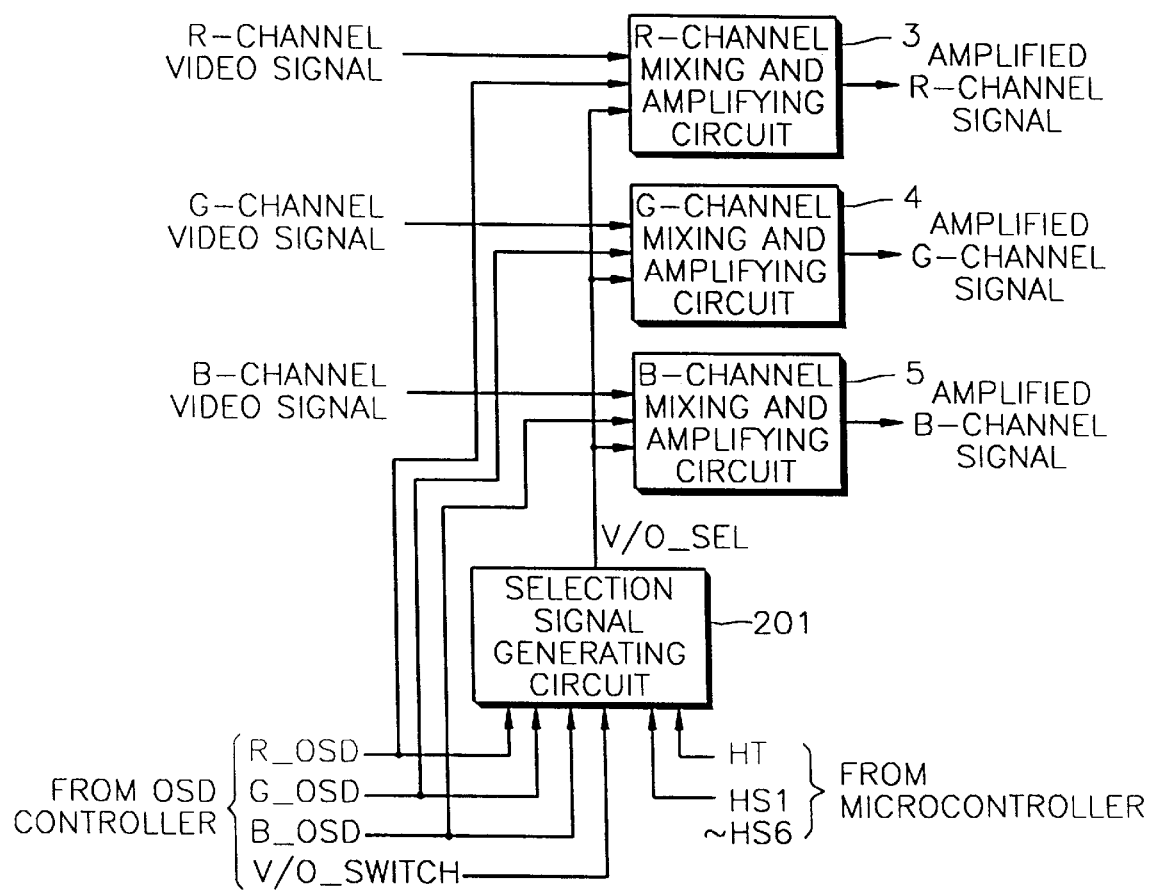
FIG. 12 is a block diagram of an alternative embodiment of the on-screen display system according to the present invention.

FIG. 12 is a block diagram of another embodiment of the on-screen display system according to the present invention, which implements multiple OSD windows. Referring to the figure, an on-screen display system includes a selection signal generating circuit 201 and mixing and amplifying circuits 3, 4, and 5 of R/G/B channels, respectively.

The selection signal generating circuit 201 receives OSD signals R_OSD, G_OSD, and B_OSD with respect to the R/G/B channels, a video/OSD switching signal V/O_SWITCH, a half tone signal HT, and an OSD control signal HS0 and HS1, and generates and outputs a video/OSD selection signal V/O_SEL according to the received signals.

Among the input signals, the OSD signals R_OSD, G_OSD, and B_OSD are input from a separate OSD controller (not shown). The video/OSD switching signal V/O_SWITCH, which indicates an OSD mode operation, is input from the OSD controller. The video/OSD switching signal V/O_SWITCH is, for example, at a "high" level in the OSD mode and at a "low" level in a non-OSD mode.

The half-tone signal HT, which is input from an external microcontroller (not shown), indicates whether the video signal is to be displayed in a half tone or not. When the half tone signal HT is at a "high" level and the OSD signals R_OSD, G_OSD, and B_OSD have a predetermined logic combination, the video signal is displayed with the half tone, which will be described in detail below.

The OSD control signals HS1 through HS6 enable a manufacturer of a CRT monitor or a liquid crystal display (LCD) to select a desired OSD background raster so as to display the background screen of the OSD window with the selected color. The desired color of the background raster of the OSD window is programmed by the manufacturer of the display system, and the control signals HS0 and HS1 are input from the microcontroller according to the programming.

In the present illustrative embodiment, up to two OSD windows can be displayed and three OSD control signals are used for each of the OSD windows to select one of eight OSD background rasters. That is, the OSD control signals HS1 through HS3 are used to select one of eight possible OSD background rasters for a first window, and the OSD control signals HS4 through HS6 are used to select one of eight possible OSD background rasters for a second window. However, in an alternative of the present embodiment, two OSD control signals may be employed for each of the OSD windows to select one of four OSD background rasters. Also, in another alternative of the present embodiment, three OSD windows may be displayed simultaneously. In such a case, additional OSD control signals may be provided to select different colors of OSD background rasters for each of the windows.

Figures 13, 14:
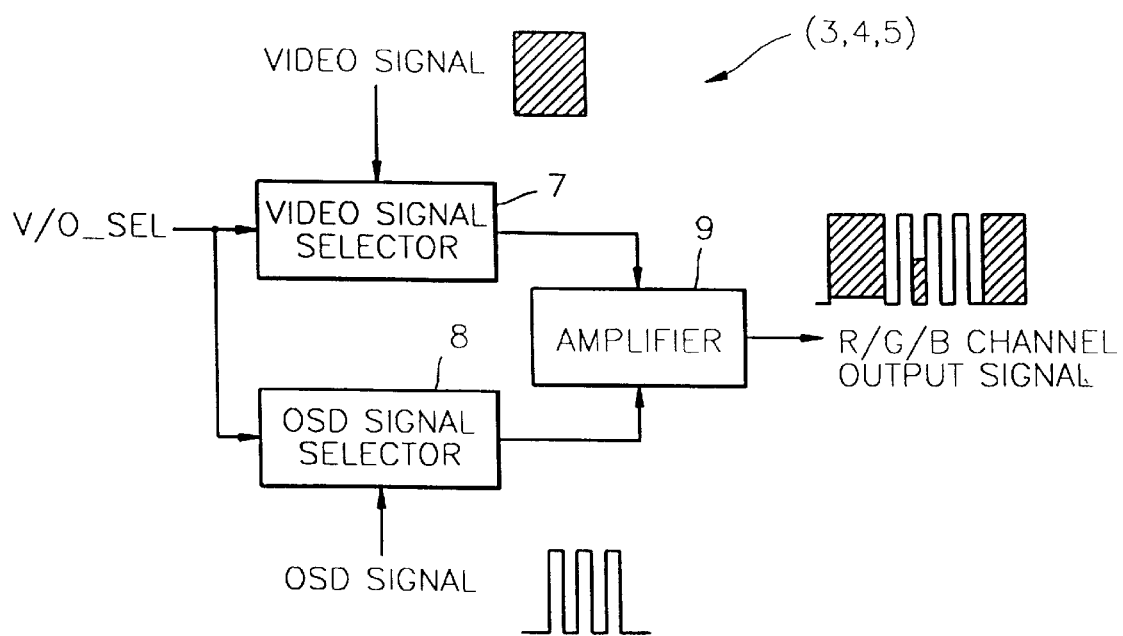
FIG. 13 is a boolean table summarizing intervals during which the video signal and the OSD background raster may be output in the half tone in a first OSD window and the resulting colors of the OSD background raster in accordance with the OSD control signals in the system of FIG. 12.
FIG. 14 is a detailed block diagram of one of the mixing and amplifying circuits of FIG. 12.

FIG. 13 is a boolean chart of intervals during which the video signal is output in the half tone along with the OSD background raster in the first OSD window, along with the color of the OSD background raster, according to the OSD control signals HS1 through HS3.

If HS1 through HS3 are at "low", "low" and "low" levels, respectively, the video signal and the OSD background raster can be output in the half tone when OSD signals R_OSD, G_OSD and B_OSD are at "low", "low" and "low" levels. In such a case, the color of the OSD background raster is black. At this time, the video signal and the OSD background raster is output in the half tone if the half tone signal HT is activated. However, the OSD background screen is filled with only the OSD background raster, completely overwriting the underlying image, if the half tone signal HT is not activated.

If HS1 through HS3 are at "low", "low" and "high" levels, respectively, the video signal and the OSD background raster can be output in the half tone when OSD signals R_OSD, G_OSD and B_OSD are at "low", "low" and "high" levels, and the color of the OSD background raster is blue. If HS1 through HS3 are at "low", "high" and "low" levels, respectively, the video signal and the OSD background raster can be output in the half tone when OSD signals R_OSD, G_OSD and B_OSD are at "low", "high" and "low" levels, and the color of the OSD background raster is green. If HS1 through HS3 are at "low", "high" and "high" levels, respectively, the video signal and the OSD background raster can be output in the half tone when OSD signals R_OSD, G_OSD and B_OSD are at "low", "high" and "high" levels, and the color of the OSD background raster is cyane.

Also, if HS1 through HS3 are at "high", "low" and "low" levels, respectively, the video signal and the OSD background raster can be output in the half tone when OSD signals R_OSD, G_OSD and B_OSD are at "high", "low" and "low" levels, and the color of the OSD background raster is red. If HS1 through HS3 are at "high", "low" and "high" levels, respectively, the video signal and the OSD background raster can be output in the half tone when OSD signals R_OSD, G_OSD and B_OSD are at "high", "low" and "high" levels, and the color of the OSD background raster is magenta. If HS1 through HS3 are at "high", "high" and "low" levels, respectively, the video signal and the OSD background raster can be output in the half tone when OSD signals R_OSD, G_OSD and B_OSD are at "high", "high" and "low" levels, and the color of the OSD background raster is yellow. If HS1 through HS3 are at "high", "high" and "high" levels, respectively, the video signal and the OSD background raster are output in the half tone when OSD signals R_OSD, G_OSD and B_OSD are at "high", "high" and "high" levels, and the color of the OSD background raster is white.

Meanwhile, the intervals during which the video signal is output in the half tone along with the OSD background raster in the second OSD window and the color of the OSD background raster according to the OSD control signals HS4 through HS6 are similar to those in the first OSD window and the detailed description thereof will be omitted.

In FIG. 12, each of the mixing and amplifying circuits 3, 4, and 5 receive the video signals of respective channel, mixes and amplifies the video signal and the OSD signal according to the video/OSD selection signal V/O_SEL, and outputs a mixed signal.

FIG. 14 is a block diagram of one of the mixing and amplifying circuits 3, 4, and 5 of FIG. 12. Since the operation of the circuit shown in FIG. 15 is the same as that of the circuit of FIG. 3, the detailed explanation thereof will be omitted.

Figure 27:
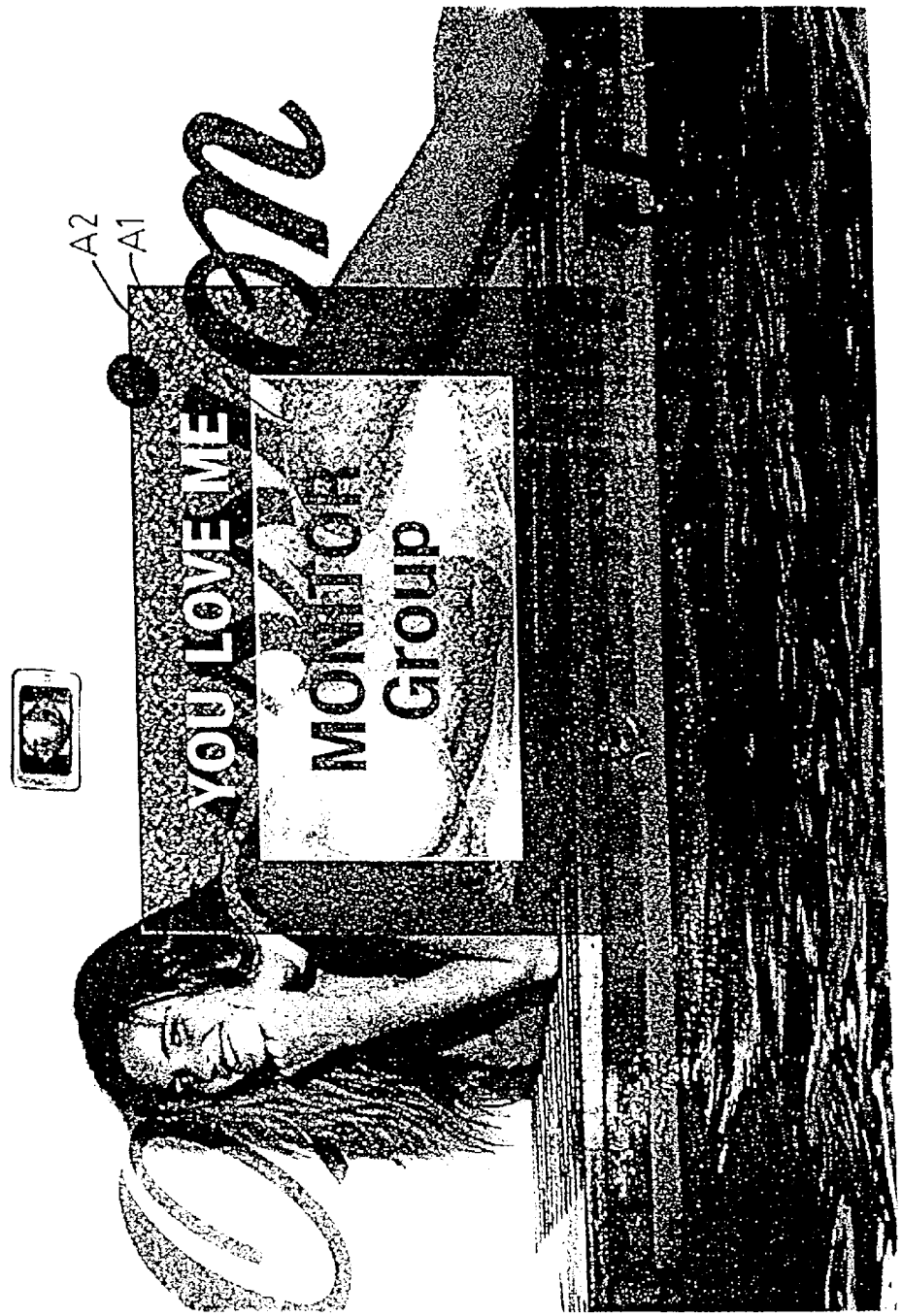
FIG. 27 shows an example of a screen on which both video information and the OSD raster are displayed in the half tone in dual OSD windows according to the on-screen display system of FIG. 12.

FIG. 27 shows an example of a screen on which both video information and the OSD raster are displayed in the half tone in two OSD windows according to the embodiment of an on-screen display system of FIG. 12. In the screen shown in FIG. 27, two OSD windows A1 and A2 are formed on the screen. In a first window A1, a half tone background raster of white color, for example, is displayed along with the half tone video signal in the background portion. OSD characters of red color, for example, are displayed on the background portion. In a second window A2, a half tone background raster of blue color, for example, is displayed along with the half tone video signal in the background portion. OSD characters of yellow color, for example, are displayed on the background portion.

Figure 15:
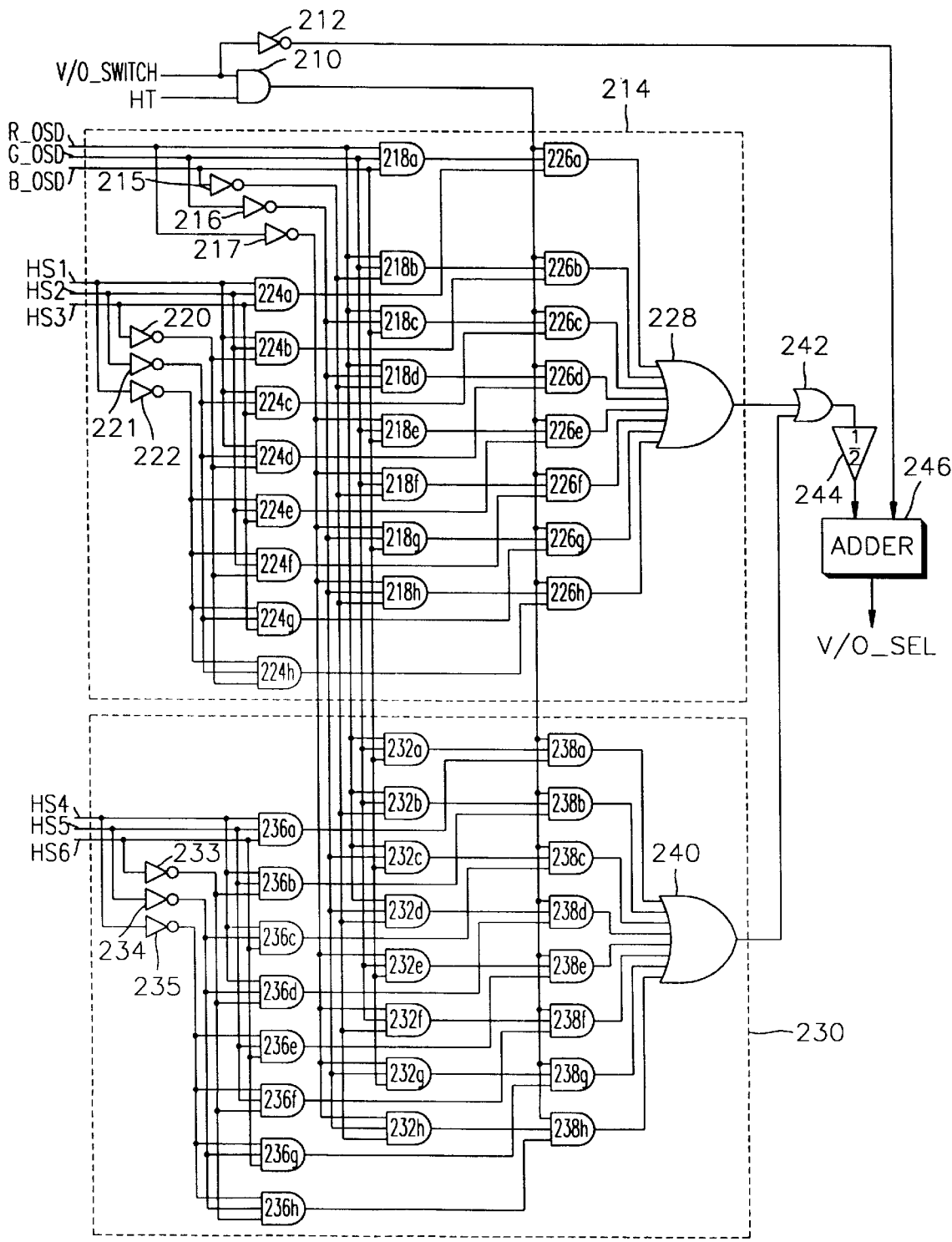
FIG. 15 is a circuit diagram of an embodiment of a selection signal generating circuit of FIG. 12.

FIG. 15 is a schematic diagram of an embodiment of the selection signal generating circuit 201 of FIG. 12. The selection signal generating circuit includes an AND gate 210, an inverter 212, first and second OSD background screen determining units 214 and 230, an OR gate 242, an attenuator 244, an inverter 250, and an adder 252.

The AND gate 210 receives a half tone signal HT and a video/OSD switching signal V/O_SWITCH and performs an AND operation. Therefore, the AND gate 210 outputs "high" only when the half tone signal HT and the video/OSD switching signal V/O_SWITCH are at "high" levels.

The output of the AND gate 210 operates as a gating signal in the first and second OSD background screen determining units 214 and 230. Namely, only when the AND gate 210 outputs "high", AND gates 226a through 226h in the first OSD background screen determining unit 214 transmit results of logic operations on OSD signals R_OSD, G_OSD, and B_OSD and OSD control signals HS1 through HS3 to an OR gate 228. AND gates 238a and 238h in the second OSD background screen determining unit 230 transmit results of logic operations on the OSD signals R_OSD, G_OSD, and B_OSD and the OSD control signals HS4 through HS6 to the OR gate 240. When the AND gate 210 outputs "low", the AND gates 226a through 226h and 238a through 238h output "low", and the first and second background screen determining units 214 and 230 output "low", also.

In the first OSD background screen determining unit 214, inverters 215, 216, and 217 receive and invert the OSD signals R_OSD, G_OSD, and B_OSD, respectively, and output the inverted OSD signals. Also, inverters 220, 221, and 222 receive and invert the OSD control signals HS1 through HS3, respectively, and output the inverted OSD control signals. AND gates 218a through 218h receive the R_OSD signal or the inverted R_OSD signal, the G_OSD signal or the inverted G_OSD signal, and the B_OSD signal or the inverted B_OSD signal and perform AND operations on the received signals. AND gates 224a through 224h receive the OSD control signal HS1 or an inverted OSD control signal /HS1, the OSD control signal HS2 or an inverted OSD control signal /HS2, and the OSD control signal HS3 or an inverted OSD control signal /HS3 and perform the AND operations on the received signals. Each of the AND gates 226a through 226h receives an output from the corresponding one of the AND gates 218a through 218h, an output from the corresponding one of the AND gates 224a through 224h and the output of the AND gate 210, and performs an AND operation. The OR gate 228 receives the outputs of the AND gates 224a through 224h and performs an OR operation.

In the second OSD background screen determining unit 230, inverters 233, 234, and 235 receive and invert OSD control signals HS4 through HS6, respectively, and output the inverted OSD control signals. AND gates 232a through 232h receive the R_OSD or the inverted R_OSD, the G_OSD signal or the inverted G_OSD signal, and the B_OSD signal or the inverted B_OSD signal, and perform the AND operations. AND gates 236a through 236h receive the OSD control signal HS4 or the inverted OSD control signal /HS4, the OSD control signal HS5 or the inverted OSD control signal /HS5, the OSD control signal HS6 OR the inverted OSD control signal /HS6 and perform the AND operations. Each of the AND gates 238a through 238h receives an output from the corresponding one of the AND gates 232a through 232h, an output from the corresponding one of the AND gates 234a through 234h and the output of the AND gate 210, and performs an AND operation. The OR gate 240 receives the outputs of the AND gates 238a through 238h and performs an OR operation.

The OR gate 242 performs an OR operation on the outputs of the first and second OSD background screen determining unit 214 and 230. The attenuator 244 attenuates the output of the OR gate 242 to a fractional value, for example half, and outputs an attenuated signal. The adder 246 adds the output signal of the attenuator 244 to that of the inverter 212 and outputs the addition result as the video/OSD selection signal V/O_SEL.

FIGS. 16A through 16J show output signals in response to input signals for the circuit shown in FIG. 15. The operation of the selection signal generating circuit of FIG. 15 will be described with reference to FIGS. 16A through 16J.

When the video/OSD switching signal V/O_SWITCH is at a "low" level (intervals 250 and 254), the AND gate 210 outputs "low". Accordingly, the first and second OSD background screen determining units 214 and 230 output "low".

As a result, the OR gate 242 and the inverter 244 output "low". However, the inverter 212 outputs "high". Therefore, the adder 246 outputs the video/OSD selection signal V/O__SEL at a "high" level. Mixing and amplifying circuits 3, 4, and 5 amplify and output only R/G/B video signals, respectively, in response to the video/OSD selection signal V/O__SEL of "high" level.

Next, it is assumed that the video/OSD switching signal V/O__SWITCH is at a "high" level to indicate an OSD operation mode and that the half tone signal HT is at a "low" level (interval 252). In such a case, the AND gate 210 outputs "low", and the attenuator 244 outputs "low". Also, the inverter 212 outputs "low". Accordingly, the adder 246 outputs the video/OSD selection signal V/O__SEL of "low" level. The video/OSD selection signal V/O__SEL is provided to the video signal selecting units and the OSD signal selecting units of the mixing and amplifying circuits 3, 4 as an OSD selection signal O__SEL and a video selection signal V__SEL. Each of the mixing and amplifying circuits 3, 4, and 5 intercepts the R/G/B video signals, and amplifies and outputs only the OSD signals in response to the video/OSD selection signal V/O__SEL of "low" level. Therefore, the OSD information including the OSD character information and the background screen is displayed.

Next, it is assumed that the video/OSD switching signal V/O__SWITCH is at "high" level to indicate the OSD operation mode, and the half tone signal HT is at "high" level (interval 256). In such a case, both the video signal and the OSD background raster are displayed in the half tone in the background screen of the OSD window, which will be described in detail.

When HS1="low", HS2="low", and HS3="low", only the AND gate 224h among the AND gates 224a through 224h outputs "high" and the AND gates 224a through 224g output "low". Accordingly, the AND gates 226a through 226g output "low". Also, when the OSD signals R__OSD, G__OSD, and B__OSD are at "low", "low", and "low" levels, respectively, the AND gate 218h and the AND gate 226h output "high". Therefore, the first OSD background screen determining unit 214 outputs "high". At this time, the attenuator 244 attenuates a signal output by the OR gate and outputs a "medium" level. The adder 246 receives the output of the attenuator 244 and outputs the video/OSD selection signal V/O__SEL of "medium" level. In response to the video/OSD selection signal V/O__SEL of "medium" level, each of the mixing and amplifying circuits 3, 4, and 5 attenuates corresponding one of the R/G/B video signals to half their original levels, and outputs the attenuated signal. Also, each of the mixing and amplifying circuits 3, 4, and 5 attenuates corresponding the one of the OSD signals to half its original level, and output the attenuated signal. Accordingly, a half tone OSD background screen raster of black color is displayed along with the half tone video information. When HS1="low", HS2="low", and HS3="high", only the AND gate 224g among the AND gates 224a through 224h outputs "high" and the AND gates 224a through 224f and 224h output "low". Accordingly, the AND gates 226a through 226f and 226h output "low". Also, when the OSD signals R__OSD, G__OSD, and B__OSD are at "low", "low", and "high" levels, respectively, the AND gate 218g outputs "high" and the AND gate 226g outputs "high". Therefore, the first OSD background screen determining unit 214 outputs "high". At this time, the attenuator 244 attenuates the signal output by the OR gate and outputs "medium" level. The adder 246 receives the output of the attenuator 244 and outputs the video/OSD selection signal V/O__SEL of "medium" level. In response to the video/OSD selection signal V/O__SEL of "medium" level, each of the mixing and amplifying circuits 3, 4, and 5 attenuates the R/G/B video signals to half their original levels, and outputs the attenuated video signal. Also, each of the mixing and amplifying circuits 3, 4, and 5 attenuates corresponding one of the OSD signals to half their original levels and outputs the attenuated OSD signals. Accordingly, a half tone OSD background screen raster of blue color is displayed along with the half tone video information.

When the OSD signals have other combinations, the circuit of FIG. 6 operates in a similar manner. The second OSD background screen determining unit 230 operates similarly to the first OSD background screen determining unit 214. Therefore, a detailed description on the operation of the second OSD background screen determining unit 230 will be omitted.

Figure 16:
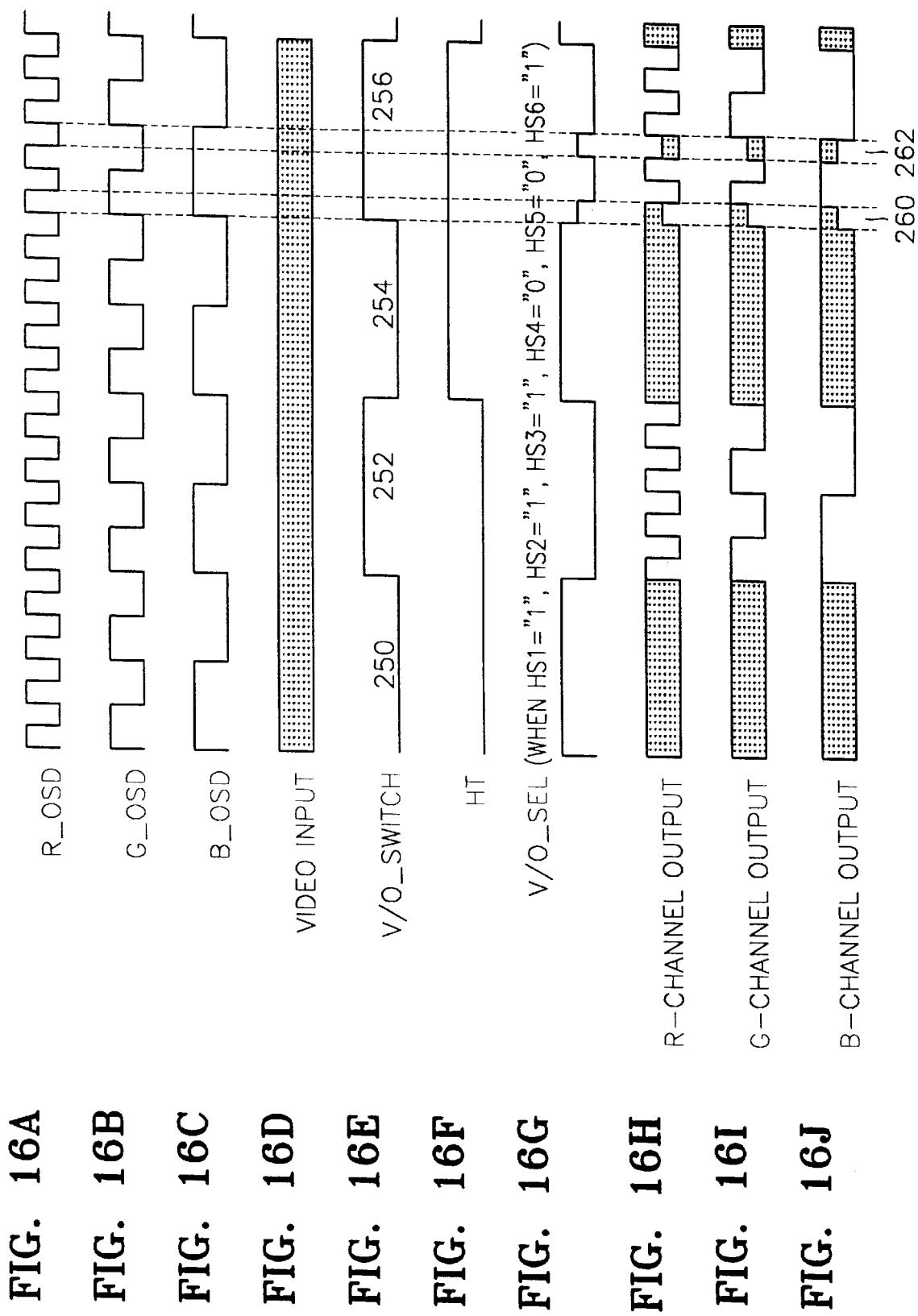
FIGS. 16A through 16J are waveform diagrams showing output signals responsive to input signals in the circuit shown in FIG. 15.

FIG. 16G shows the video/OSD selection signal V/O__SEL when the OSD control signals HS1 through HS6 are at "high", "high", "high", "low", "low", and "high" levels, respectively. When the video/OSD switching signal V/O__SWITCH is at a "high" level to indicate the OSD operation mode and the half tone signal HT is at a "high" level, the AND gate 210 outputs "high". As a result, the attenuator 244 outputs "medium". The inverter 212 outputs "low". The first OSD background screen determining unit 214 outputs "high" only when the OSD signals R__OSD, G__OSD, and B__OSD are at "high", "high" and "high" levels, respectively (interval 60). Also, the second OSD background screen determining unit 230 outputs "high" only when the OSD signals R__OSD, G__OSD, and B__OSD are at "low", "low" and "high" levels, respectively (interval 262).

Therefore, the video/OSD selection signal V/O__SEL is at a "medium" level in the intervals 60 and 62. Accordingly, when the OSD signals R__OSD, G__OSD, and B__OSD are at "high", "high" and "high" levels, respectively, i.e. when a white first OSD background screen signal is input, the mixing and amplifying circuits 3, 4, and 5 output the attenuated R/G/B video signals and the attenuated OSD signals. When the OSD signals R__OSD, G__OSD, and B__OSD are at "low", "low" and "high" levels, respectively, i.e. when the blue second OSD background screen signal is input, the mixing and amplifying circuits 3, 4, and 5 output the attenuated R/G/B video signals and the attenuated OSD signals.

As mentioned above, according to the present embodiment, it is possible to form two OSD windows in the screen. Further, the OSD background screen may be displayed by one among the various colors of OSD rasters in the respective OSD windows (the interval 252) or by the half tone video signal with the half tone OSD background screen signal (interval 256). On the other hand, in the monitor or the liquid crystal display employing the on-screen display according to the present invention, the colors of the background rasters of the first and second OSD windows and the OSD characters are determined by a programming of a manufacturer of the monitor or the liquid crystal display.

Figure 17:
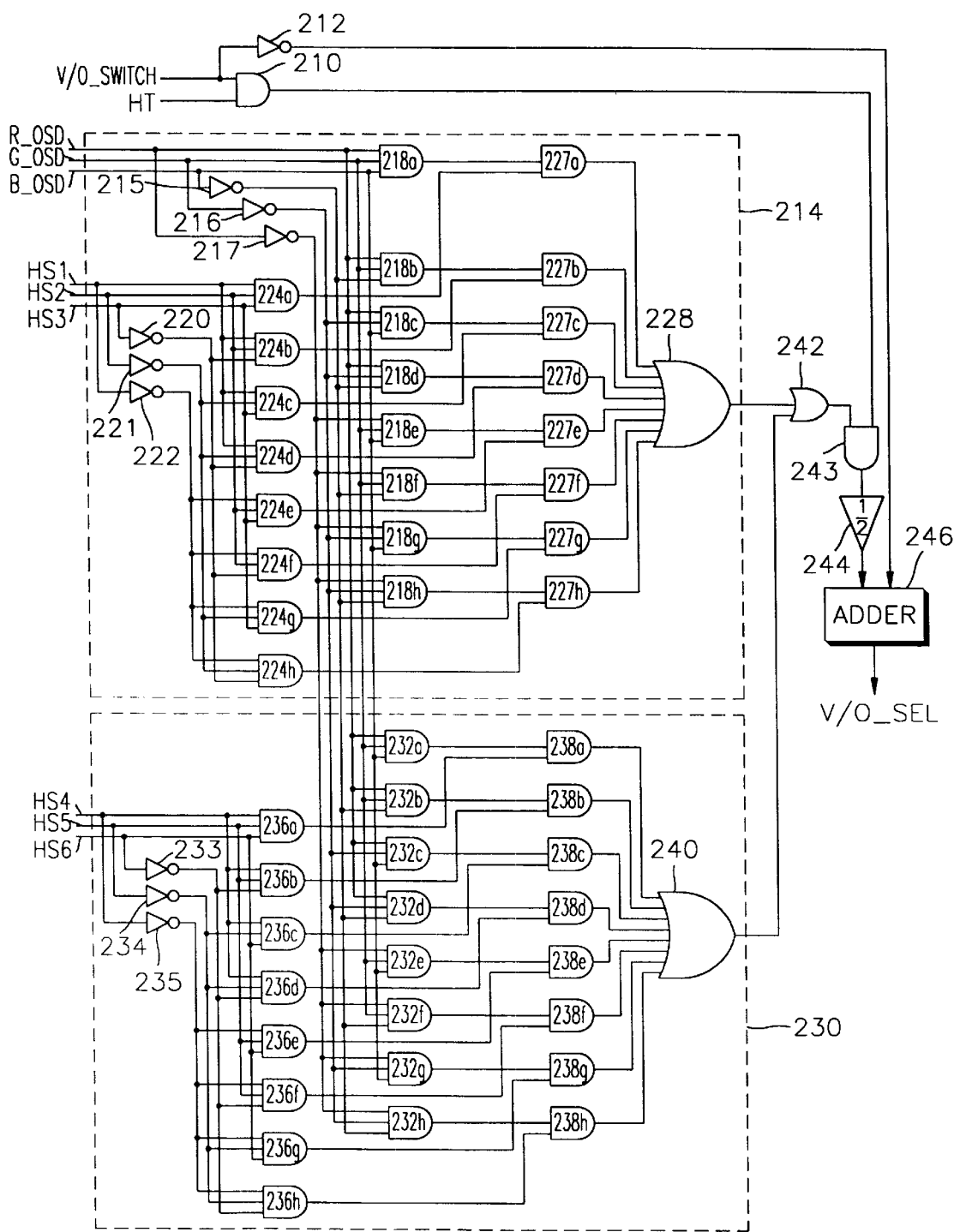
FIG. 17 is an alternative embodiment of the selection signal generating circuit of FIG. 15.

FIG. 17 shows an alternative embodiment of the selection signal generating circuit of FIG. 15.

In the embodiment of FIG. 17, a gating signal output by the AND gate 210 is not input to AND gates 227a through 227h and an additional AND gate 243 is provided. Therefore, the AND gates 227a through 227h are comprised of two input gates. The AND gate 243 performs an AND operation on the output of the OR gate 242 and the gating signal. The attenuator 244 receives the output of the AND gate 243 and attenuates the received signal to a half. Since the operation of the circuit of FIG. 17 is similar to that of the circuit of FIG. 15, a detailed description thereof will be omitted.

Figure 18:
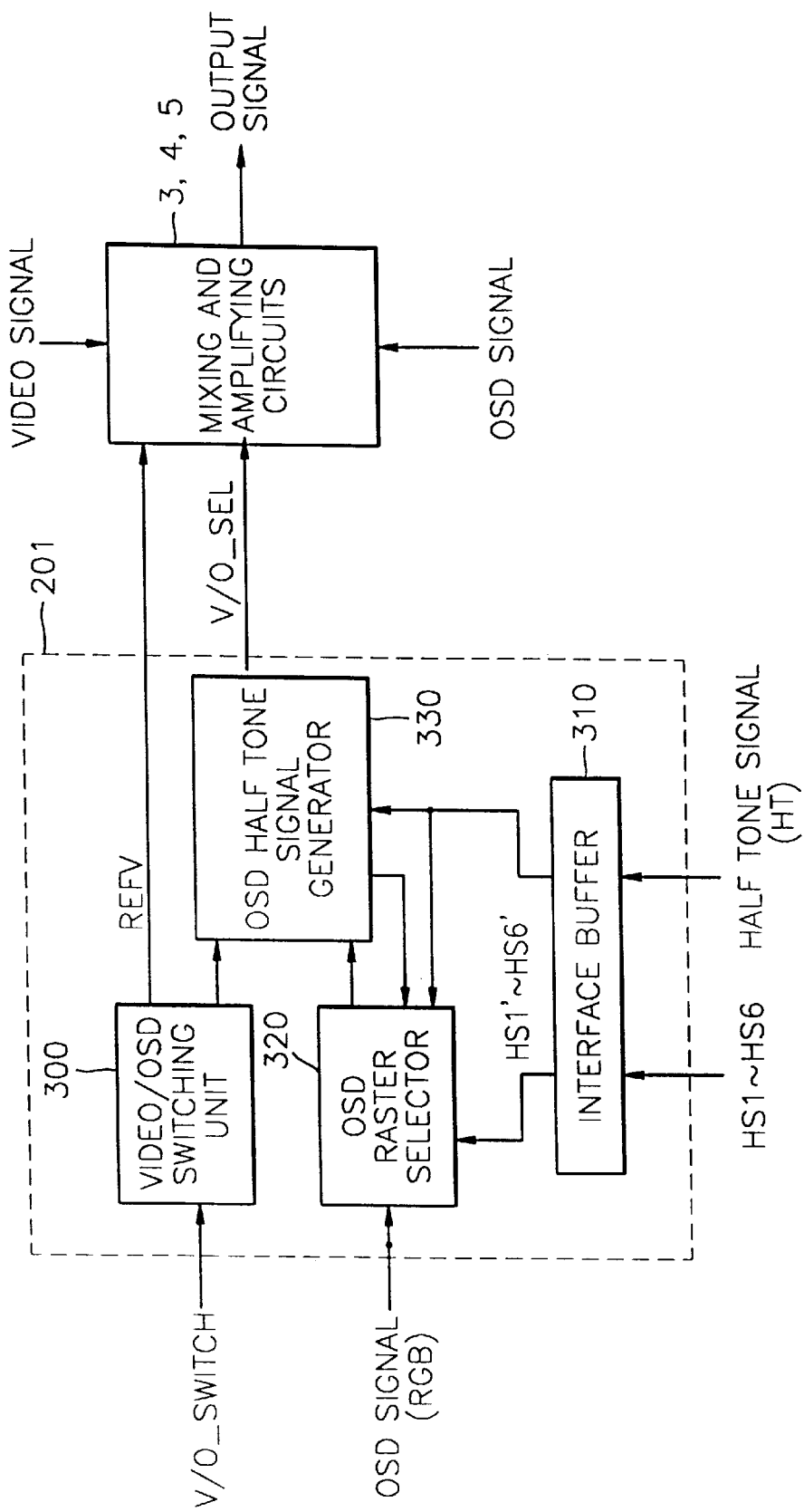
FIG. 18 is a block diagram of an alternative embodiment of the selection signal generating circuit of FIG. 12.

FIG. 18 shows an additional embodiment of the selection signal generating circuit of FIG. 12. Referring to figure, the selection signal generating circuit 201 includes a video/OSD switching unit 300, an interface buffer 310, an OSD raster selector 320, and an OSD half tone signal generator 330. The mixing and amplifying circuits 3, 4, and 5 are also incorporated into the block diagram of FIG. 18.

The video/OSD switching unit 300 receives the video/OSD switching signal V/O_SWITCH and generates and outputs first and second switching signals SW1 and SW2. Also, the video/OSD switching unit 300 generates and outputs a reference voltage REFV for determining the level of a video/OSD selection signal V/O_SEL.

The interface buffer 310, which is optionally employed, receives the OSD control signals and the half tone signal HT through an inter-chip (IIC) bus, buffers the received signal, and outputs buffered signals HS1' through HS6' and HT'.

The OSD raster selector 320 adjusts the swing range of the RGB OSD signals and outputs a raster selection signals RAS1 and RAS2 in specific OSD signal input timings which depend on the OSD control signals HS0 and HS1 in the OSD operation mode, so that one of the plurality of OSD rasters is selected for each of the first and second OSD windows.

The OSD half tone signal generator 330 generates and outputs the video/OSD selection signal V/O_SEL according to the switching signals SW1 and SW2 and the OSD control signals HS0 and HS1 when the half tone signal HT dictates a half tone video output.

In order to further details the present embodiment, the signals shown in FIGS. 18 and 19 through 23 are summarized as follows.

a video/OSD switching signal V/O_SWITCH: TTL level signal switching between 0 and 5V.

a first switching signal SW1: in a negative phase with respect to the video/OSD switching signal V/O_SWITCH and swings in the range of 5.1 through 6V.

a reference voltage REFV1: is at a central level of the swing range of the first switching signal SW1.

a second switching signal SW2: in a negative phase with respect to the video/OSD switching signal V/O_SWITCH and swings in the range of 4.35 through 5.25V.

a reference voltage REFV: is at a central level of the swing range of the second switching signal SW2.

an OSD control signal HS1: controls the R_OSD signal to select the OSD background raster of the first OSD window and is switched between 0.1 and 2.1V.

an OSD control signal HS2: controls the G_OSD signal to select the OSD background raster of the first OSD window and is switched between 0.1 and 2.1V.

an OSD control signal HS3: controls the B_OSD signal to select the OSD background raster of the first OSD window and is switched between 0.1 and 2.1V.

an OSD control signal HS4: controls the R_OSD signal to select the OSD background raster of the second OSD window and is switched between 0.1 and 2.1V.

an OSD control signal HS5: controls the G_OSD signal to select the OSD background raster of the second OSD window and is switched between 0.1 and 2.1V.

an OSD control signal HS6: controls the B_OSD signal to select the OSD background raster of the second OSD window and is switched between 0.1 and 2.1V.

a raster selection signal RAS1: activated under a specific combination of the OSD signals in accordance with the OSD control signals HS0 and HS1 so that a certain OSD background raster is selected for the first OSD window.

a raster selection signal RAS2: activated under a specific combination of the OSD signals in accordance with the OSD control signals HS0 and HS1 so that a certain OSD background raster is selected for the second OSD window.

a half tone signal HT: switches between 0.1 and 3.1V and is at "high" level in a half tone operation mode.

a mode control signal HT_RS: is at 0.902V to enable the OSD raster selector in the OSD operation mode and is at 0V to disable the OSD raster selector in a non-OSD operation mode.

a inverted half tone signal HT_I: is in a negative phase with respect to the half tone signal HT and switches between 0 and 1.26V.

a select reference voltage BS1: is a reference signal for biasing the interface buffer and is at 1.197V.

a select reference voltage BS2: is a reference signal for determining the level of the OSD control signals HS1 through HS6 and is at 1.624V.

a select reference voltage BS3: is a reference signal for determining the level of a level-adjusted half tone signal HT' to generate the inverted half tone signal HT_I and is at 1.65V.

Figure 19:
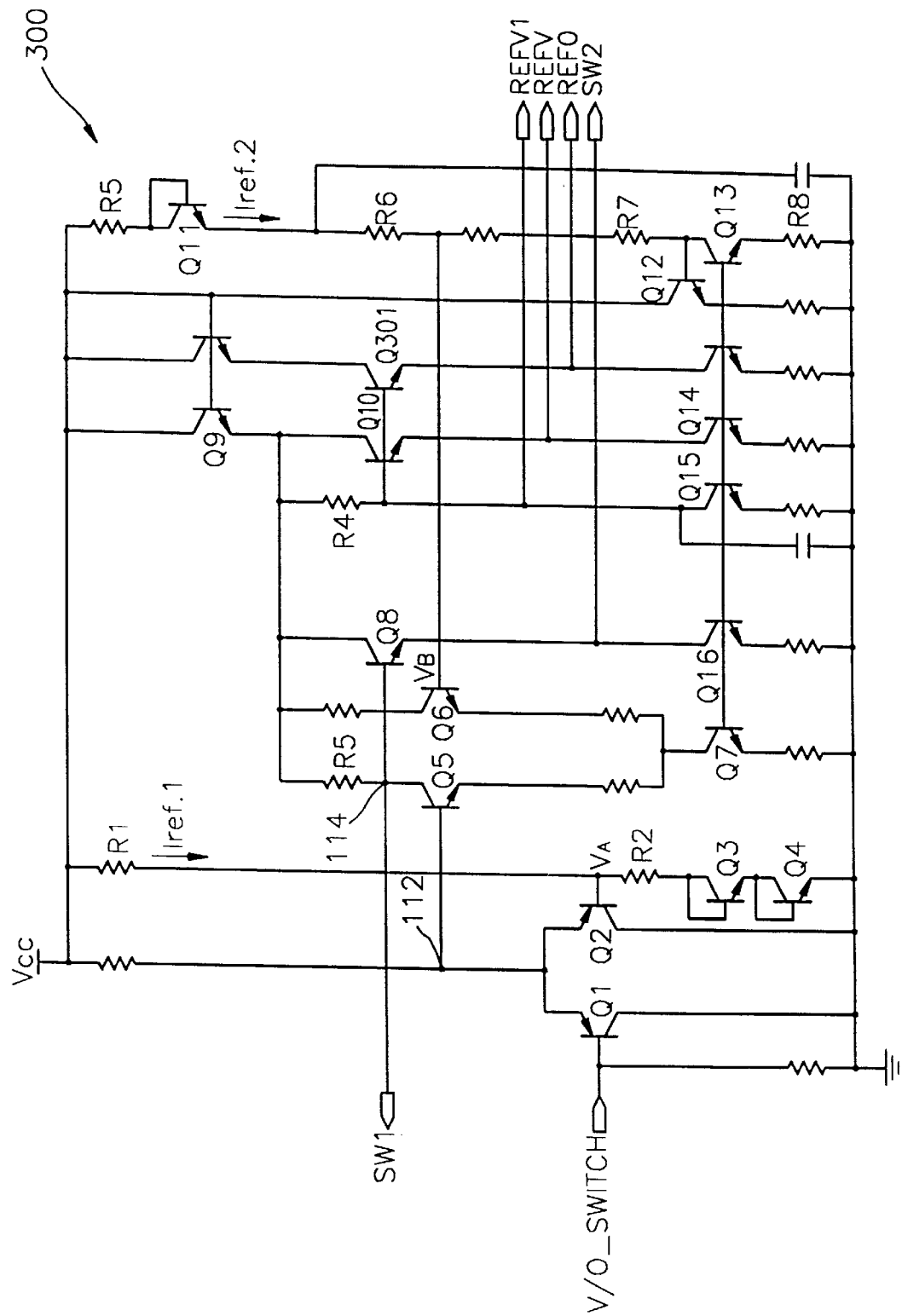
FIG. 19 is a circuit diagram of a video/OSD switching unit of FIG. 18.
Figure 20A:
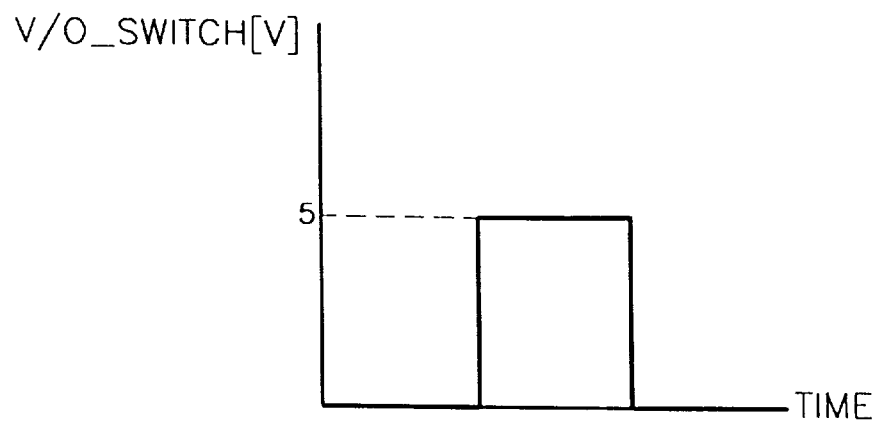
FIGS. 20A through 20C are graphs showing output signals responsive to an input signal in the video/OSD switching unit of FIG. 19.
Figure 20B:
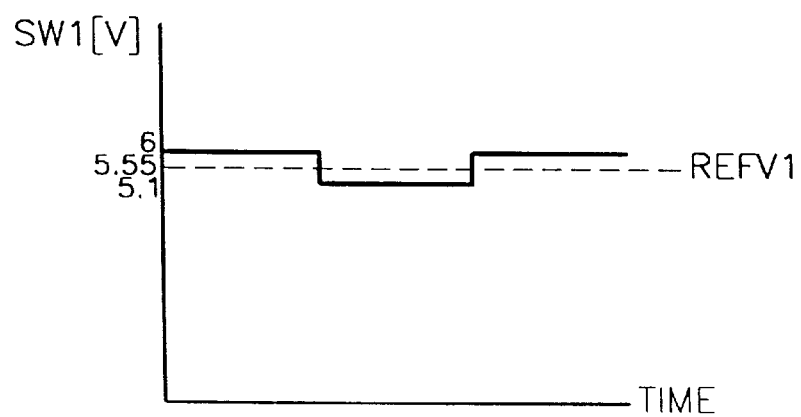
Figure 20C:
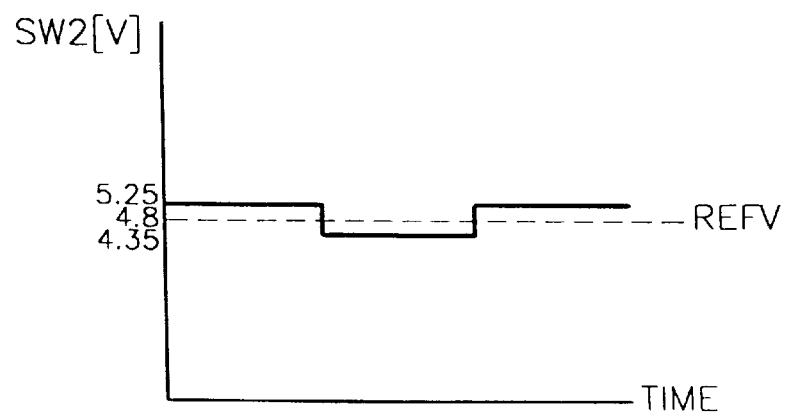

FIG. 19 is a detailed circuit diagram of a video/OSD switching unit 300 of FIG. 18, and FIGS. 20A through 20C show example output signals according to an input signal in the video/OSD switching unit of FIG. 19. Since the configuration and operation of the video/OSD switching unit of FIG. 18 is similar to that of the circuit of FIG. 7, the detailed description thereof will be omitted.

Figure 21:
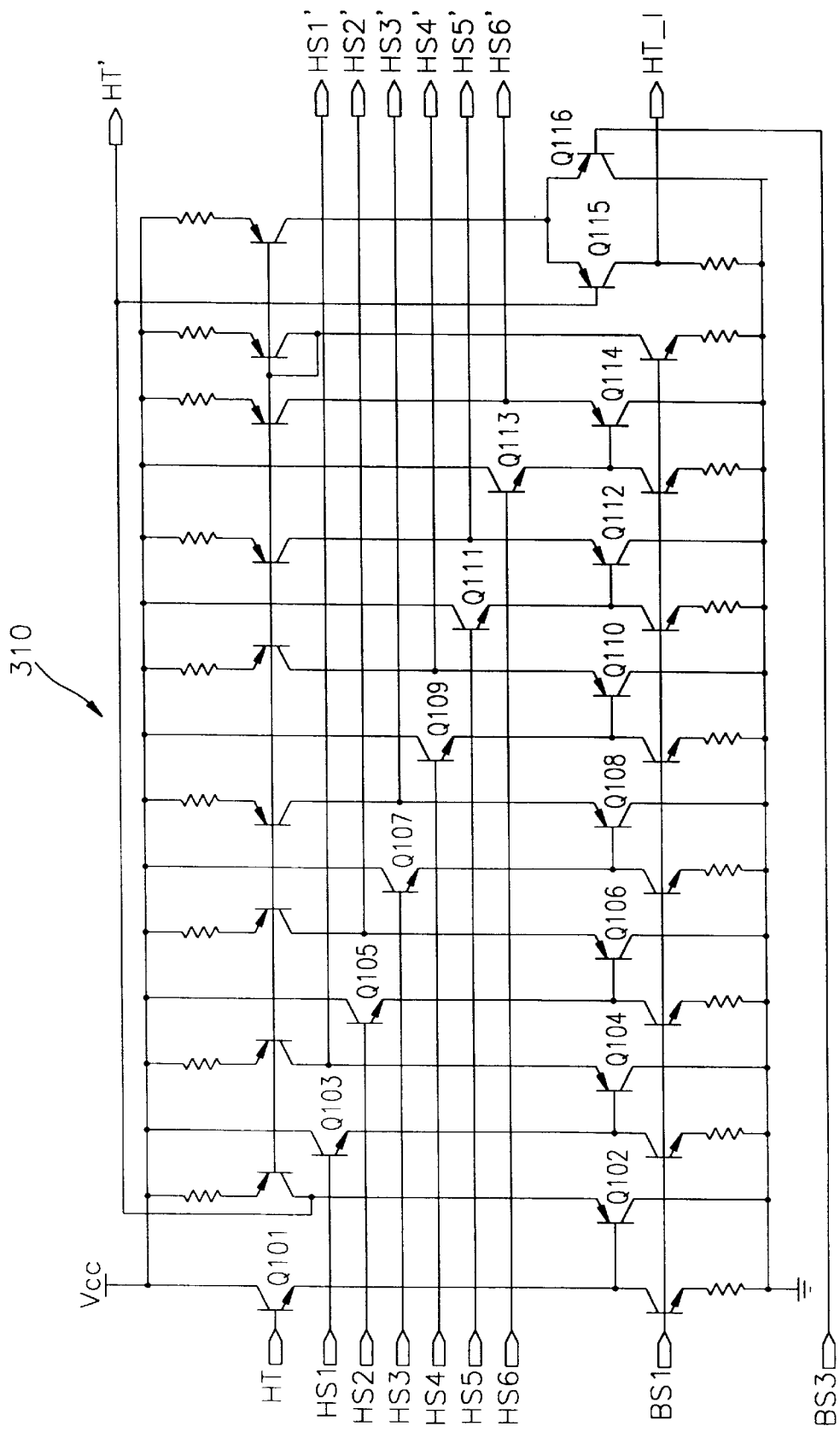
FIG. 21 is a circuit diagram of an interface buffer of FIG. 18.

FIG. 21 shows the interface buffer 310 of FIG. 18 in detail.

The half tone signal HT is input to a base of a transistor Q101. An emitter voltage of the transistor Q101 having a level lower than that of the half tone signal HT by $1V_{be,101}$ is applied to a base of a transistor Q102. An emitter voltage of the transistor Q102 having a level higher than the base voltage of the transistor Q102 by $1V_{be,102}$ is output as a buffered half tone signal HT'. Since the magnitude of the voltage $V_{be,101}$ between the base and the emitter of the transistor Q101 is equal to that of the voltage $1V_{be,102}$ between the base and the emitter of the transistor Q102, the buffered half tone signal HT' is at the same level as that of the input half tone signal HT. However, the buffered half tone signal HT' has a greater current driving capability than the input half tone signal HT.

The OSD control signal HS1 is input to a base of the transistor Q103. A buffered OSD control signal HS1' having the same level as that of the OSD control signal HS1 and having higher current driving capability is output through the emitter of a transistor Q104 in the same manner as the buffered half tone signal HT' is output. The OSD control signals HS2 through HS6 are input to the bases of transistors Q105, Q107, Q109, Q111, and Q113. Buffered OSD control signals HS2' through HS6' having the same levels as those of the OSD control signals HS2 through HS6 and having higher current driving capability are output through the emitters of transistors Q106, Q108, Q110, Q112, and Q114.

Hereinafter, the 'buffered halftone signal (HT')' will be simply referred to as the '(half tone signal HT')'. The 'buffered OSD control signals (HS1' through HS6')' will be simply referred to as the 'OSD control signals (HS1' through HS6')'.

Transistors Q115 and Q116 comprise a comparator. The half tone signal HT' is applied to the base of the transistor Q115. A third bias voltage BS3 output by an OSD half tone signal generating unit 330 is applied to the base of a transistor Q116. When the half tone signal HT' is larger than the third bias voltage BS3, the collector voltage of the transistor Q115 is at "low" level. When the half tone signal HT' is smaller than the third bias voltage BS3, the collector voltage of the transistor Q115 is at "high" level. The collector voltage of the transistor Q115 which is an inverted half tone signal HT_I is output to the OSD raster selector 320. In the present embodiment, the inverted half tone signal HT_I is switched between 0V and 1.26V.

Figure 22A:
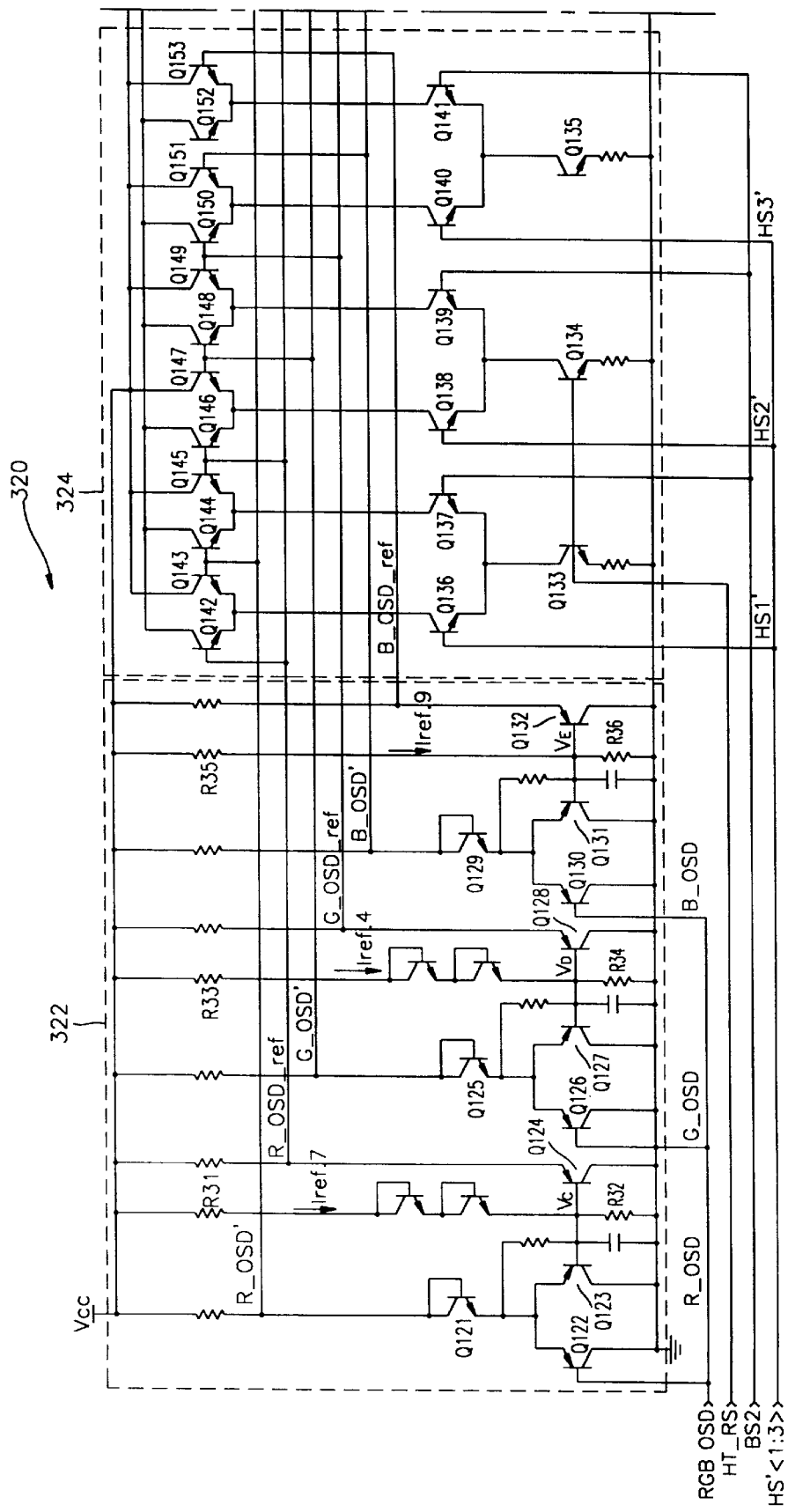
FIGS. 22A and 22B are circuit diagrams of an OSD raster selector of FIG. 18.
Figure 22B:
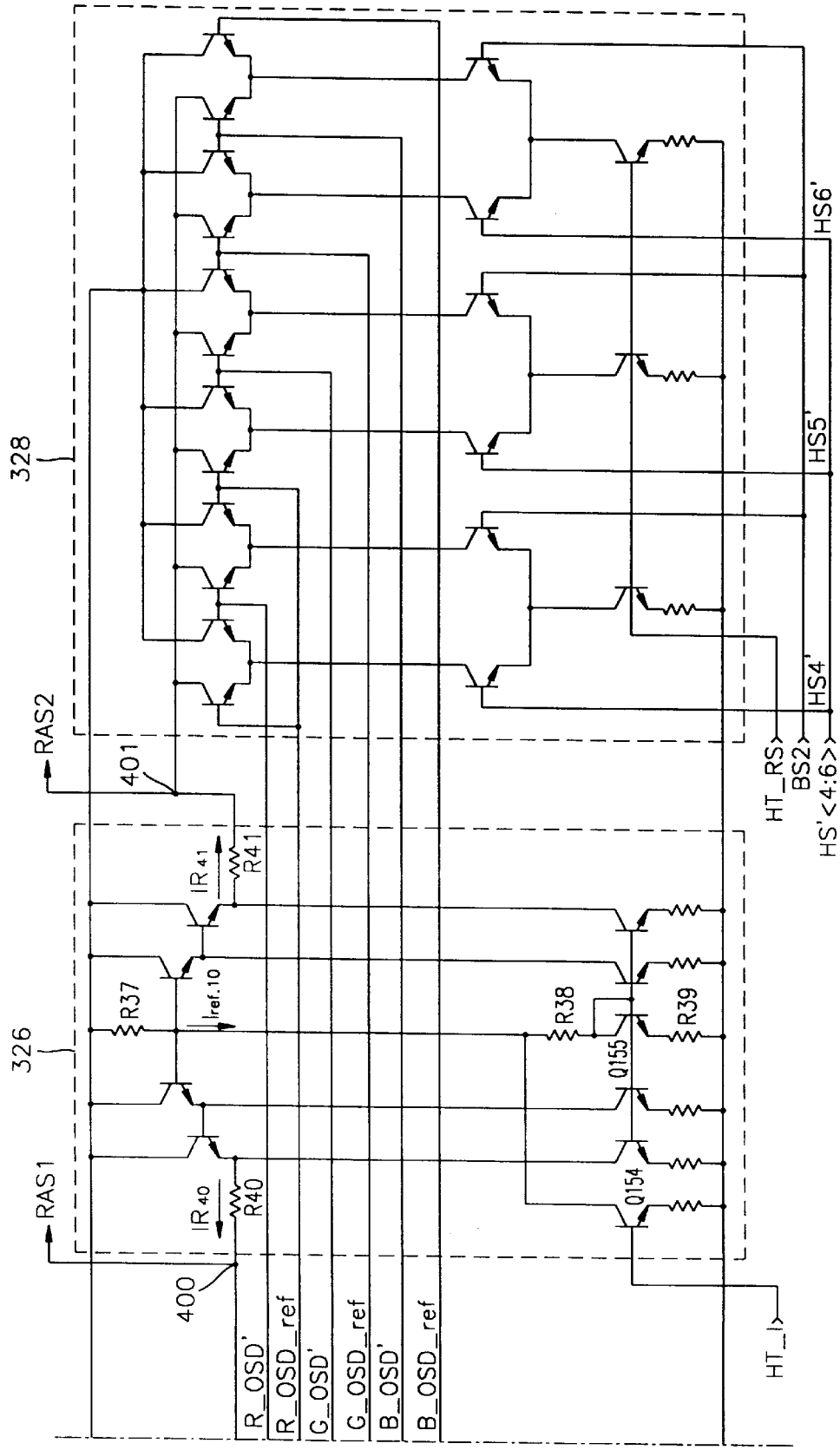

FIGS. 22A and 22B show the OSD raster selector 320 of FIG. 9 in detail.

Referring to FIGS. 22A and 22B, the OSD raster selector 320 includes a level adjustment circuit 322, a first comparing circuit 324, a bias circuit 326, and a second comparing circuit 328. The level adjusting circuit 322 adjusts the swing ranges of the OSD signals R_OSD, G_OSD, and B_OSD and provides level-adjusted OSD signals to the first and second comparing circuits 324 and 328. The first comparing circuit 324 outputs a first raster selection signal RAS1 for the first OSD window, which is activated only when a specific logic combination of the OSD signals is input according to the OSD control signals HS1' through HS3'. The second comparing circuit 328 outputs a second raster selection signal RAS2 for the second OSD window, which is activated only when a specific logic combination of the OSD signals is input according to the OSD control signals HS4' through HS6'.

In the level adjusting circuit 322, resistors R31 and R32 and two diode-connected transistors form a seventh reference current $I_{ref,7}$ and divides a power voltage Vcc so that a voltage $V_C$ is provided to the base of a transistor Q123. The transistors Q122 and Q123 compares the R_OSD with the voltage $V_C$ in order to adjust the swing range of the R_OSD. According to the comparison result, the collector voltage of the transistor Q121 varies, and is provided to the comparing circuit 324 as a level-adjusted OSD signal R_OSD'. The "low" and "high" levels of the level-adjusted OSD signal R_OSD' are determined by the following equation 10 and have the values of 1.6V and 3.6V, respectively, in the present embodiment.

$$R\_OSD'(low)=R\_OSD(low)+V_{be,122}+V_{be,121}$$

$$R\_OSD'(high)=R12 \cdot I_{ref,7}+V_{be,123}+V_{be,121} \quad (10)$$

Resistors R33 and R34 and two diode-connected transistors form a eighth reference current $I_{ref,8}$ and divide the power voltage Vcc so that a voltage $V_D$ is provided to the base of a transistor Q127. The transistors Q126 and Q127 compare the G_OSD with the voltage $V_D$ in order to adjust the swing range of the G_OSD. According to the comparison result, the collector voltage of the transistor Q125 varies, and is provided to the comparing circuit 324 as a level-adjusted OSD signal G_OSD'. The level-adjusted OSD signal G_OSD' swings in the range of 1.6V through 3.6V.

Resistors R35 and R36 and two diode-connected transistors form a ninth reference current $I_{ref,9}$ and divide the power voltage Vcc so that a voltage $V_E$ is provided to the base of a transistor Q131. The transistors Q130 and Q131 compare the B_OSD with the voltage $V_E$ in order to adjust the swing range of the B_OSD. According to the comparison result, the collector voltage of the transistor Q129 varies, and is provided to the comparing circuit 324 as a level-adjusted OSD signal B_OSD'. The level-adjusted OSD signal B_OSD' swings in the range of 1.6v through 3.6V.

The emitter voltage of the transistor Q124 is higher than the voltage $V_C$ by $1V_{be}$ and is output to the first and second comparing circuits 324 and 328 as an R channel OSD reference signal R_OSD_ref. The emitter voltage of the transistor Q128 is higher than the voltage $V_D$ by $1V_{be}$ and is output to the first and second comparing circuits 324 and 328 as a G channel OSD reference voltage G_OSD_ref. The emitter voltage of the transistor Q132 is higher than the voltage $V_E$ by $1V_{be}$ and is output to the first and second comparing circuits 324 and 328 as a B channel OSD reference voltage B_OSD_ref.

The operation of the first comparing circuit 324 is controlled by a mode control signal HT_RS output by the OSD half tone signal generating circuit 330. When the mode control signal HT_RS is at a "high" level, transistors Q133, Q134, and Q135 provide current to activate the comparing circuit 324. When the mode control signal HT_RS is at a "low" level, the transistors Q133, Q134, and Q135 are deactivated and the comparing circuit 324 does not operate.

A bias circuit 326 (see FIG. 22B) provides a bias voltage with respect to the first and second comparing circuits 324 and 328. Resistors R37 and R38, a diode-connected transistor Q155, and a resistor R39 form a tenth reference current $I_{ref,10}$. When the inverted half tone signal HT_I is at "high" level, the transistor Q154 forms a bypass current path, so that the tenth reference current $I_{ref,10}$ has a larger value than when the inverted half tone signal HT_I is at a "low" level.

A first raster selection signal RAS1 which is a voltage at a node 400 is expressed by a following equation.

$$RAS1=Vcc-R37 \cdot I_{ref,10}-2V_{be}-IR_{40} \quad (11)$$

When the half tone signal HT is at a "low" level to indicate a non-half tone mode operation, the inverted half tone signal HT_I is at a "high" level. Therefore, the tenth reference current $I_{ref,10}$ has a large value and a current $IR_{40}$ which flows the resistor R40 becomes zero. At this time, the first raster selection signal RAS1 has a low value of 2.5V in the present embodiment.

When the half tone signal HT is at a "high" level to indicate the half tone mode operation, the first raster selection signal RAS1 has a magnitude of 4.88V or 3.5V according to the OSD control signals HS1 through HS3 and the OSD signals R_OSD, G_OSD, and B_OSD. This is described below in detail.

In the first comparing circuit 324, three comparators comprised of the transistors Q136 and Q137, the transistors Q138 and Q139, and the transistors Q140 and Q141 compare the OSD control signals HS1, HS2, and HS3, respectively, with the second bias voltage BS2, and control the operations of six comparators comprised of pairs of transistors Q142 and Q143, Q144 and Q145, Q146 and Q147, Q148 and Q149, Q150 and Q151, and Q152 and Q153 according to the comparison results. Six comparators comprised of the transistor pairs Q142 and Q143, Q144 and Q145, Q146 and Q147, Q148 and Q149, Q150 and Q151, and Q152 and Q153 compare the level-adjusted OSD signals R_OSD', G_OSD', and B_OSD' with the OSD reference voltages R_OSD_ref, G_OSD_ref, and B_OSD_ref. According to the comparison results, the magnitude of the current $IR_{40}$ flowing from the node 400 to the first comparing circuit 324 varies.

As an example, it is assumed that HS1'="low", HS2'="low", and HS3'="low". In such a case, the transistors Q136, Q138, and Q140 are deactivated but the transistors Q137, Q139, and Q141 are activated. Therefore, transistor pairs Q144 and Q145, Q148 and Q149, and Q152 and Q153 operate. When at least one of the signals R_OSD', G_OSD', and B_OSD' is at "high" level, a transistor among the transistors Q144, Q148, and Q152 which receives the "high" level through its base is activated. Accordingly, the current $IR_{40}$ flowing from the node 400 to the first comparing circuit 324 is increased. At this time, the first raster selection signal RAS1 expressed by the equation 11 is at "low" level of 3.5V. Meanwhile, when all the signals R_OSD', G_OSD', and B_OSD' are at "low" levels, the current $IR_{40}$ flowing from the node 400 to the first comparing circuit 324 is zero and the first raster selection signal RAS 1 is at "high" level of 4.88V. Accordingly, the first raster selection signal RAS1 is enabled to "high" level only in a white OSD background screen. Therefore, the OSD information can be displayed on the OSD background screen which is formed by the white half tone OSD raster and the half tone video signal, which is described below.

When it is assumed that HS1'="high", HS2'="low", and HS3'="low", the transistors Q137, Q138, and Q140 are deactivated but the transistors Q136, Q139, and Q141 are activated. Therefore, the transistor pairs Q142 and Q143, Q148 and Q149, and Q152 and Q153 operate. When the signal R_OSD' is at "low" level, the signal G_OSD' is at "high" level, or the signal B_OSD' is at "high" level, the transistor Q142, Q148 or Q152 is activated. Accordingly, the current $IR_{40}$ flowing from the node 400 to the first comparing circuit 324 is increased. At this time, the first raster selection signal RAS1 is at "low" level of 3.5V. Meanwhile, when the signal R_OSD' is at "high" level and the signals G_OSD' and B_OSD' are at "low" level, the current $IR_{40}$ is 0 and the first raster selection signal RAS1 is at "high" level of 4.88V. Accordingly, the first raster selection signal RAS1 is enabled to "high" level only in a red OSD background screen. Therefore, the OSD information can be displayed on the OSD background screen which is formed by the red half tone OSD raster and the half tone video signal, which is described below.

When the OSD control signals HS1' through HS3' have other logic combinations, the first comparing circuit 324 operates similarly. To summarize, the first raster selection signal RAS1 has a low value of 2.5V during a non-half tone mode operation. While operating in the half tone mode, the first raster selection signal RAS1 is at "high" level of 4.88V only in an interval during which a specific combination of OSD signals determined by the OSD control signals HS1' through HS3' is input, but is at "low" level in an interval during which the combination of the OSD signals differently from the specific combination is input.

The second comparing circuit 328 operates in the same way as the first comparing circuit 324. Namely, current $IR_{41}$ flowing through the resistor R41 and a voltage at a node 401, i.e., the level of the second raster selection signal RAS2 vary according to the OSD control signals HS4' through HS6' and the signals OSD_R', OSD_G', and OSD_B'. The second raster selection signal RAS2 is at a "high" level of 4.88V only in an interval during which a specific combination of OSD signals determined by the OSD control signals HS4' through HS6' is input, but is at a "low" level in an interval during which the combination of the OSD signals differently from the specific combination is input.

Figure 23:
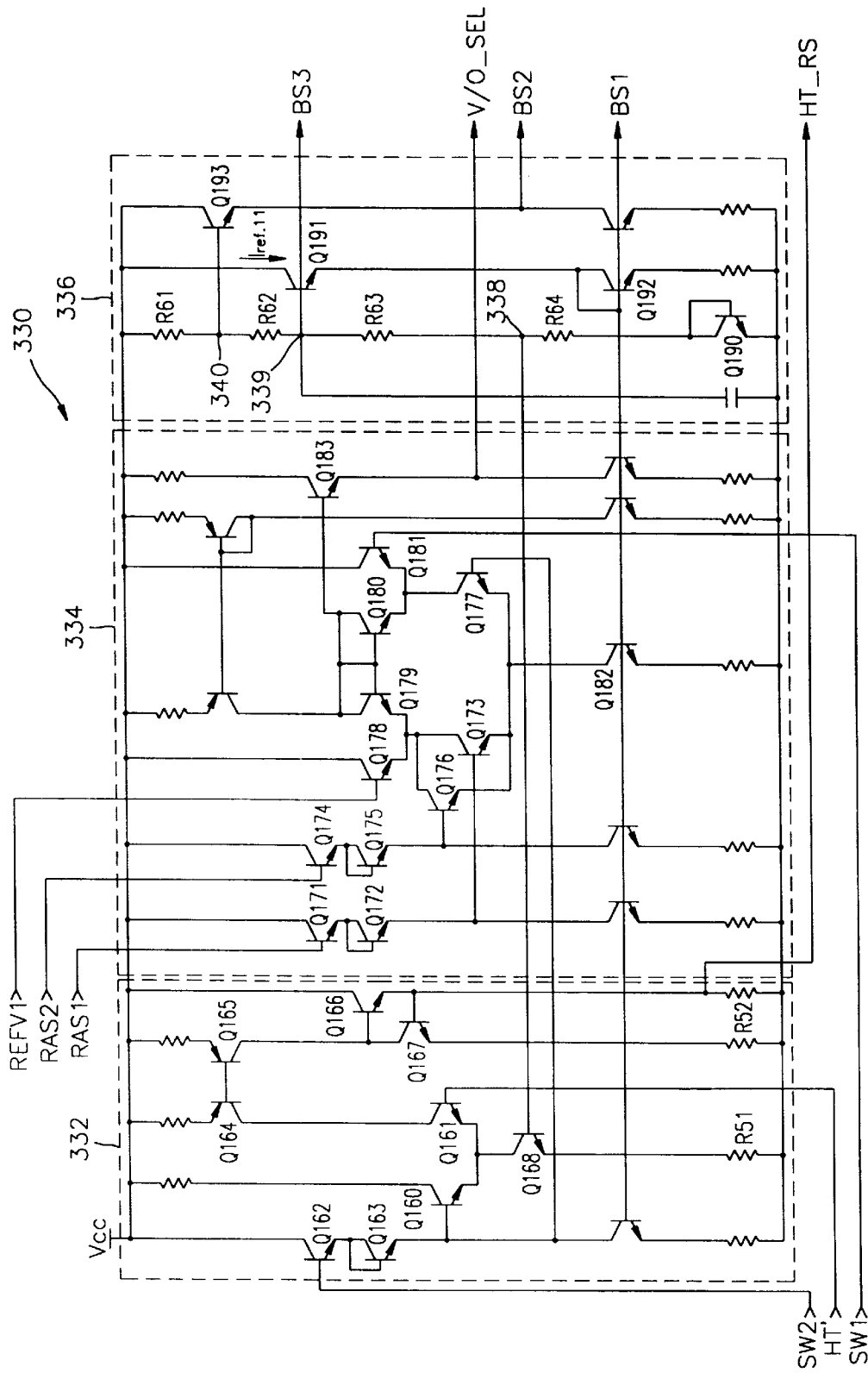
FIG. 23 is a circuit diagram of an OSD half tone signal generator of FIG. 18.

FIG. 23 is a detailed schematic diagram of the OSD half tone signal generator 330 of FIG. 18.

The OSD half tone signal generator 330 of FIG. 23 includes a mode control signal generating circuit 332, an output signal generating circuit 334, and a reference signal generating circuit 336.

The mode control signal generating circuit 332 receives the half tone signal HT' and the second switching signal SW2, generates the mode control signal HT_RS, and outputs the mode control signal HT_RS to the OSD raster selector 320 of FIGS. 22A and 22B. The output signal generating circuit 334 receives the first and second raster selection signals RAS1 and RAS2, the first switching signal SW1, a reference voltage REFV1, and a signal SW2-2$V_{be}$ lowered by 2$V_{be}$ from the second switching signal SW2, and generates and outputs the video/OSD selection signal V/O_SEL. The reference signal generating circuit 336 generates a plurality of reference voltages and provides such signals to the mode control signal generating circuit 332 and the output signal generating circuit 334. Also, the reference signal generating circuit 336 generates the first through third bias voltages BS1 through BS3, and outputs the first through third bias voltages to the interface buffer 310 of FIG. 21 and the OSD raster selector 320 of FIGS. 22A and 22B.

In the reference signal generating circuit 336, resistors R61, R62, R63, and R64 and a transistor Q190 which are connected in series divide the power supply voltage Vcc, so that a voltage level of a node 338 having a certain magnitude is supplied to the base of a transistor Q168 and certain amount of current flows through the transistor Q168. The voltage of the node 339 is provided to the base of a transistor Q192 after being lowered by the voltage between a base and an emitter of a transistor Q191. Since a base of a transistor Q192 is biased to a constant level, a predetermined reference current $I_{ref,7}$ flows through the transistors Q191 and Q192, which current is repeated through various transistors such as a transistor Q182. The base voltage of the transistor Q192 is output as the first bias voltage BS1. The voltage of the node 339 is output as the third bias voltage BS3. The voltage of a node 340 is output as the second bias voltage BS2 after being lowered by the voltage between a base and an emitter of a transistor Q193.

In the mode control signal generating circuit 332, transistors Q160 and Q161 comprise a comparator. The second switching signal lowered by 2$V_{be}$ by the transistors Q162 and Q163, SW2-2$V_{be}$, is applied to a base of a transistor Q160. The half tone signal HT' is applied to a base of a transistor Q161. The half tone signal HT' has a level of 3.2V in the half tone mode. When the second switching signal SW2 is at "high" level to indicate a video interval), transistor Q160 is activated but transistor Q161 is deactivated. Accordingly, little current flows through a transistor Q167 and a resistor R52, and the mode control signal HT_RS will be at "low" level. When the second switching signal SW2 is at "low" level to indicate an OSD interval, transistor Q160 is deactivated but transistor Q161 is activated. Accordingly, current flows through the transistor Q167 and the resistor R52. In a current mirror comprised of transistors Q164 and Q165, the transistor Q165 provides about four times the amount of current compared with the transistor Q164. Therefore, the magnitude of the mode control signal HT_RS is expressed by a following equation and is at "high" level of 0.902V.

$$HT_{RS}=4I_{c,168} \cdot R52+V_{be,167} \qquad (12)$$

In the output signal generating circuit 336, transistors Q173 and Q176 and a transistor Q177 comprise a comparator. The first raster selection signal lowered by 2$V_{be}$, RAS1-2$V_{be}$, is applied to a base of the transistor Q173. The second raster selection signal lowered by 2$V_{be}$, RAS2-2$V_{be}$, is applied to a base of the transistor Q177.

The transistor Q173 is activated and enables a buffer comprised of the transistors Q178 and Q179 only when the half tone signal HT' is at "high" level and the second switching signal SW2 is at "low" level. At this time, the reference voltage REFV1 applied to the base of the transistor Q178 is buffered by the buffer and the emitter voltage of the transistor Q183 lowered by $1V_{be}$ from the reference voltage REFV1 is output as the video/OSD selection signal V/O_SEL. As a result, when the half tone signal HT is at a "high" level and the second switching signal SW2 is at a "low" level to indicate the OSD half tone mode operation, the video/OSD selection signal V/O_SEL has the magnitude of the voltage lowered by $1V_{be}$ from the reference voltage REFV1, i.e., the reference voltages REFV and REFO.

When the second switching signal SW2 is at a "high" level to indicate a video interval, the first switching signal SW1 applied to the base of a transistor Q181 is buffered by the buffer comprised of the transistors Q180 and Q181 to be output. Namely, at this time, the level lowered by $1V_{be}$ from the first switching signal SW1 is output as the video/OSD selection signal V/O_SEL through the emitter of the transistor Q183. As a result, in the video interval, the video/OSD selection signal V/O_SEL has the same magnitude as that of the voltage lowered by $1V_{be}$, from the first switching signal SW1, i.e., the second switching signal SW2.

Figure 24A:
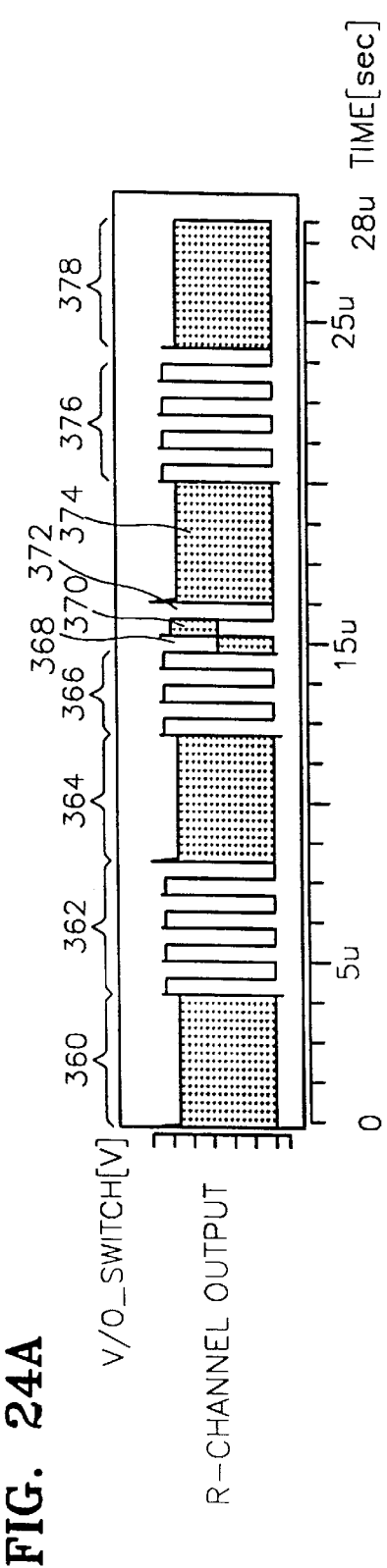
FIGS. 24A through 24C are waveform diagrams showing a simulation result for an on-screen display system integrated circuit chip implemented in accordance with the embodiment of FIG. 6.
Figure 24B:
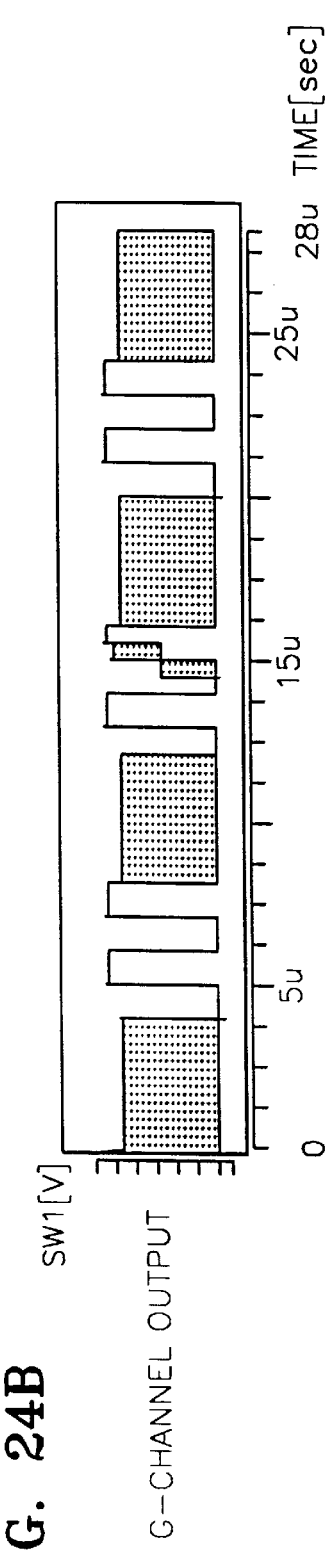
Figure 24C:
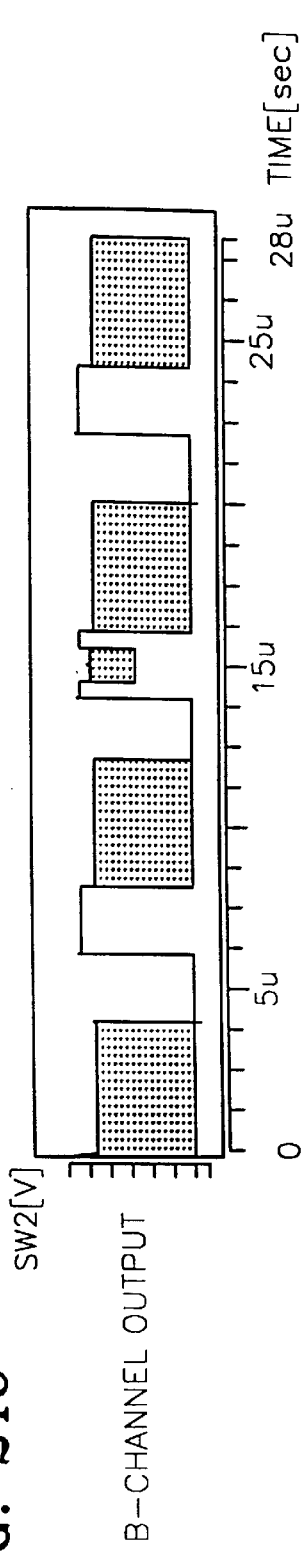
Figure 25:
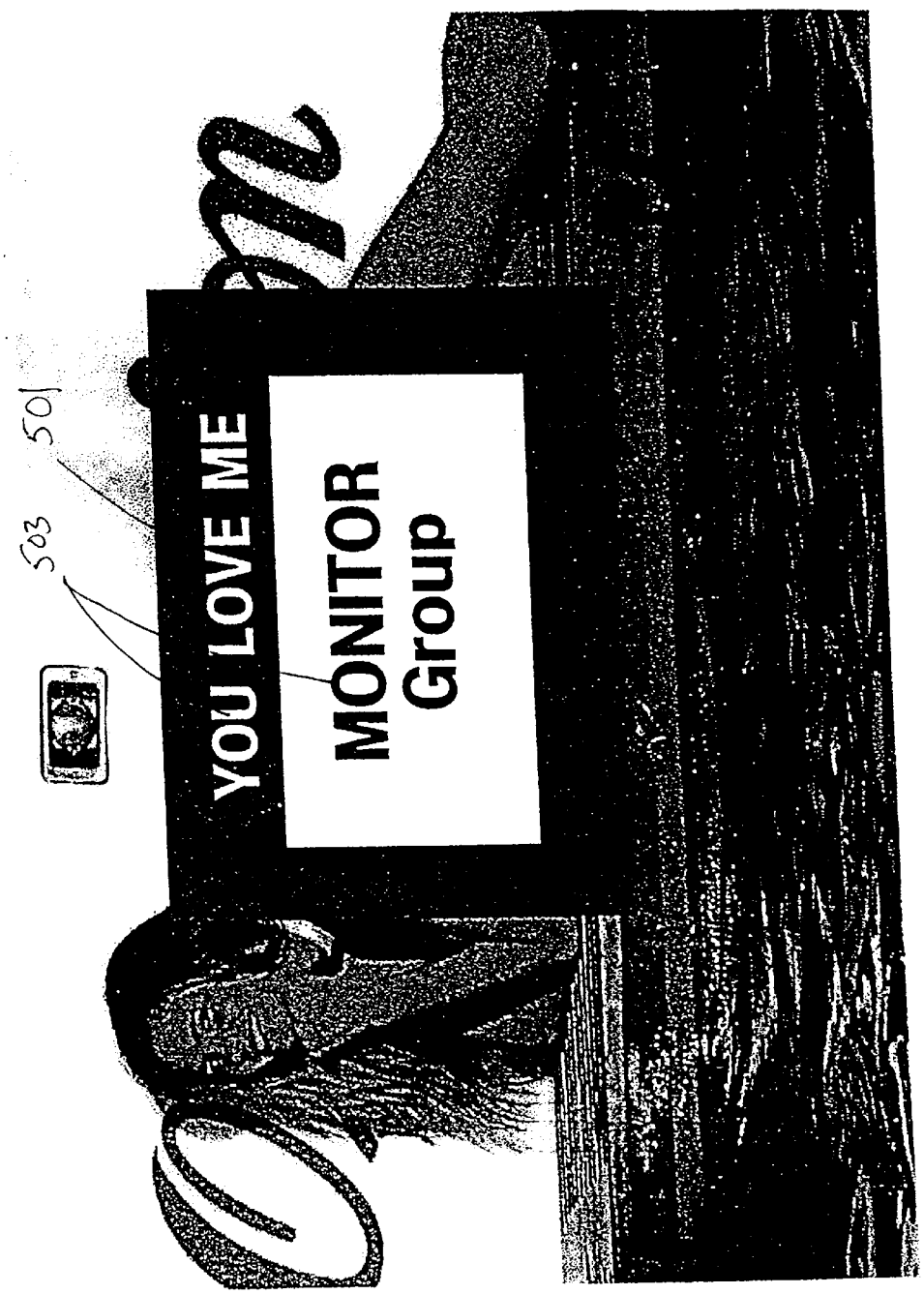
FIG. 25 shows an example of a video screen on which OSD characters are displayed on an OSD window background portion of a specific color, while intercepting video signals in the OSD window according conventional techniques.

FIGS. 24A through 24C are waveform diagrams showing a verification result of an on-screen display system integrated circuit implemented according to the above embodiment. FIG. 24A shows an R (red) channel output signal. FIG. 24B shows a G (green) channel output signal. FIG. 24C shows a B (blue) channel output signal. In the verification of FIGS. 24A through 24C, it is assumed that the OSD control signals HS1 through HS6 are respectively set to be "low", "low", "high", "high", "high", and "high" so that the blue raster is used on the background screen of the first OSD window and the white raster is used on the background screen of the second OSD window.

Only video signals are output during intervals 360, 364, 374, and 378. Only OSD signals are output during intervals 362, 366, 372, and 376. The video signals and the OSD signals are output at "medium" levels during intervals 368 and 370. Therefore, in these intervals, the video image and the OSD background screen input from an OSD interface (not shown) under the control of a micro controller (not shown) are displayed in the half tone. In particular, the blue background screen of the first OSD window is displayed in the interval 368, such a blue background screen is discriminated by the OSD control signals HS1 through HS3 applied to the on-screen display according to the present invention. Also, the white background screen of the second OSD window is displayed in the interval 370. Such a white background screen is discriminated by the OSD control signals HS4 through HS6 applied to the on-screen display according to the present invention.

Figure 28:
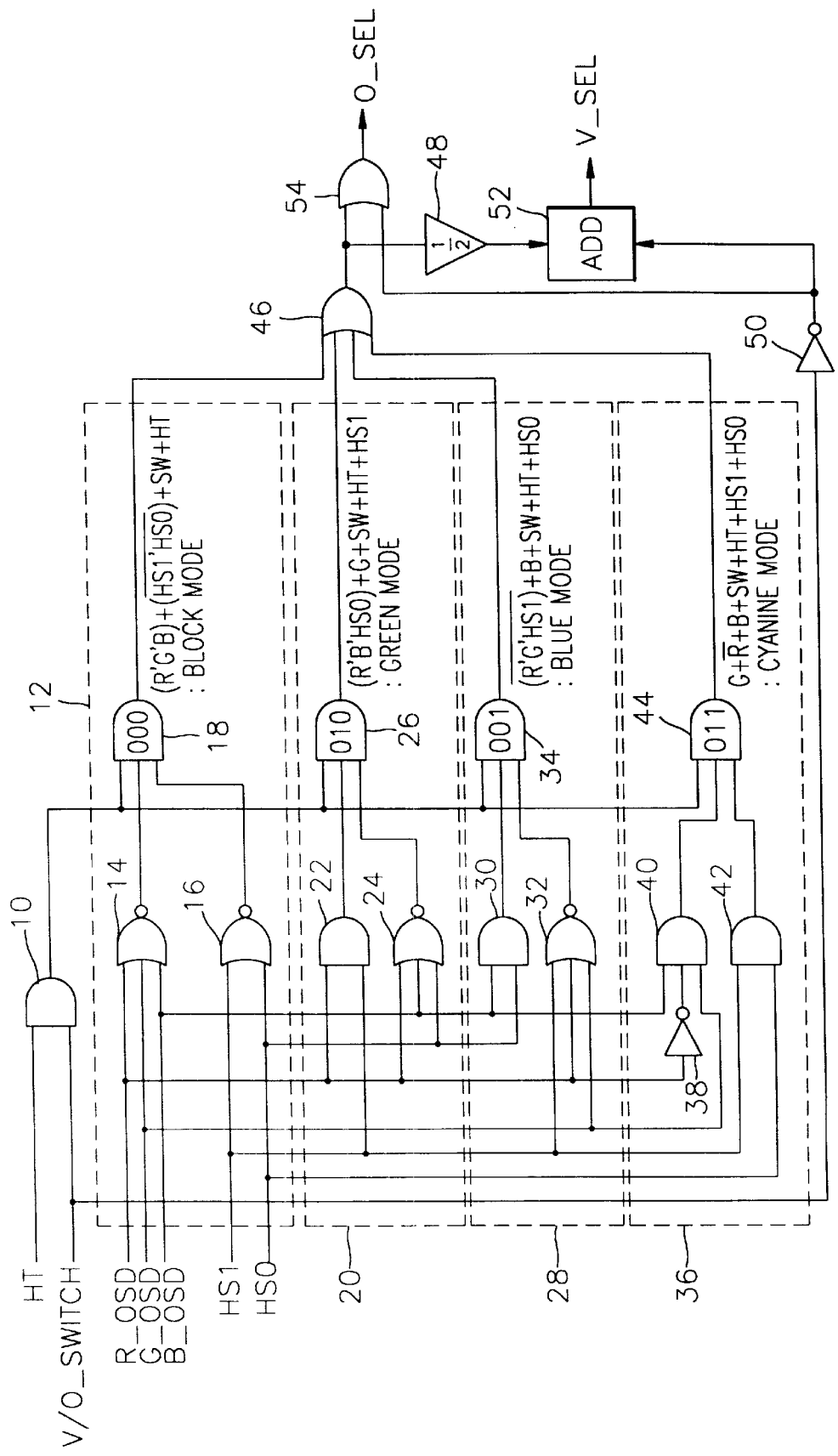
FIG. 28 is a circuit diagram of an alternative embodiment of the selection signal generating circuit of FIG. 1.

FIG. 28 shows another embodiment of the selection signal generating circuit of FIG. 1. FIG. 29 shows output signals according to an input signal in the circuit shown in FIG. 28. Since the embodiment of FIG. 28 is similar to that of FIG. 4, the same reference numerals as those of FIGS. 4 and 5 are given to the members or the portions similar to or the same as those of FIGS. 4 and 5. Detailed descriptions on the similar members or the portions will be omitted.

The selection signal generating circuit includes an AND gate 10, first through fourth OSD determining circuits 12, 20, 28, and 36, an OR gate 46, an attenuator 48, an inverter 50, an adder 52, and an OR gate 54.

The AND gate 10 receives a half tone signal HT and a video/OSD switching signal V/O_SWITCH and performs an AND operation. Therefore, the AND gate 10 outputs a "high" level only when the half tone signal HT and the video/OSD switching signal V/O_SWITCH are all input as a "high" level. The output of the AND gate 10 operates a gating signal in the first through fourth OSD determining circuits 12, 20, 28, and 36.

The OR gate 46 performs an OR operation with respect to the outputs of the first through fourth OSD determining circuits 12, 20, 28, and 36. The attenuator 48 attenuates the output of the OR gate 46 by ½ and outputs the attenuated signal. The inverter 50 inverts the video/OSD switching signal V/O_SWITCH and outputs the inverted signal. The adder 52 adds the output signals of the attenuator 48 to those of the inverter 50 and outputs the addition result to the mixing and amplifying circuits 3, 4, and 5 of the R/G/B channels as a video selection signal V_SEL. The OR gate 54 performs an OR operation on the outputs of the OR gate 46 and the inverter 50 and outputs the operation result to the mxing and amplifying circuits 3, 4, and 5 of the R/G/B channels as an OSD selection signal O_SEL.

As mentioned above, the video selection signal V_SEL and the OSD selection signal O_SEL are additionally generated by the circuit of FIG. 28 and output from the circuit of FIG. 28.

Hereinafter, the operation of the selection signal generating circuit of FIG. 28 will be described in detail with reference to FIG. 29.

The operation of the apparatus of FIG. 28 is similar to that of the apparatus of FIG. 4 in sections 60, 64, 68, and 72 and a section 62. The video/OSD switching signal V/O_SWITCH is "low" and shows a video mode operation in the sections 60, 64, 68, and 72. In this case, the AND gate 10 output level is "low". As a result, the OR gate 46 output is "low". However, the output of the inverter 50 is "high". Accordingly, the adder 52 outputs the video selection signal V_SEL at a "high" level and the OR gate 54 outputs the OSD selection signal O_SEL of a "high" level. The video selection signal V_SEL and the OSD selection signal O_SEL are applied to the video signal selecting unit and the OSD signal selecting unit of the mixing and amplifying circuits. Here, since the OSD selection signal O_SEL is an active low signal and the video selection signal V_SEL is an active high signal, only the R/G/B video signals are output from the mixing and amplifying circuits 3, 4, and 5 of FIG. 1.

The video/OSD switching signal V/O_SWITCH is "high" and shows an OSD operation mode in the sections 62 and 70. However, the half tone signal HT is "low" in these sections. In this case, the output of the AND gate 10 is "low". As a result, the output of the OR gate 46 is "low". Also, the output of the inverter 50 is "low". Accordingly, the adder 52 and the OR gate 54 respectively output the video selection signal V_SEL and the OSD selection signal 0_SEL, each being "low". Accordingly, only the OSD signals are output to the mxing and amplifying circuits 3, 4, and 5 of FIG. 1. Accordingly, only OSD information is displayed. The OSD information includes OSD character information and a background screen. The background screen has a specific color defined by OSD control signals HS0 and HS1.

Sections 66 and 74 will now be described. In these sections, the video/OSD switching signal V/O_SWITCH is "high" and shows the OSD operation mode and the half tone signal HT is "high". Accordingly, the video signal is displayed in a half tone.

Figure 29A:
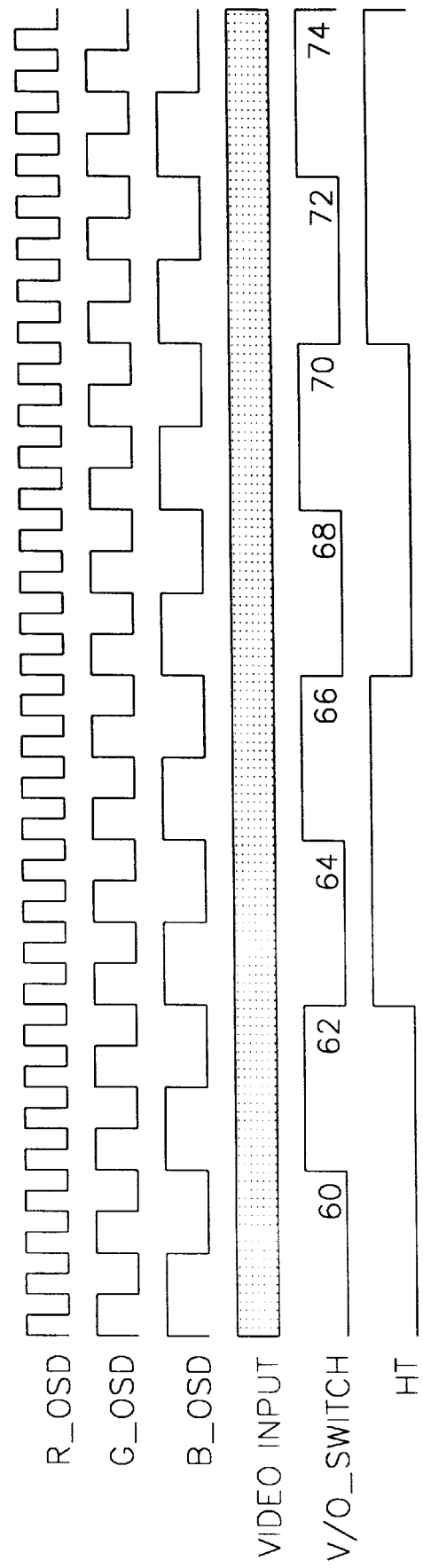
FIG. 29A through 29E are waveform diagrams showing output signals resulting from various input signals for the circuit shown in FIG. 28.
Figure 29B:
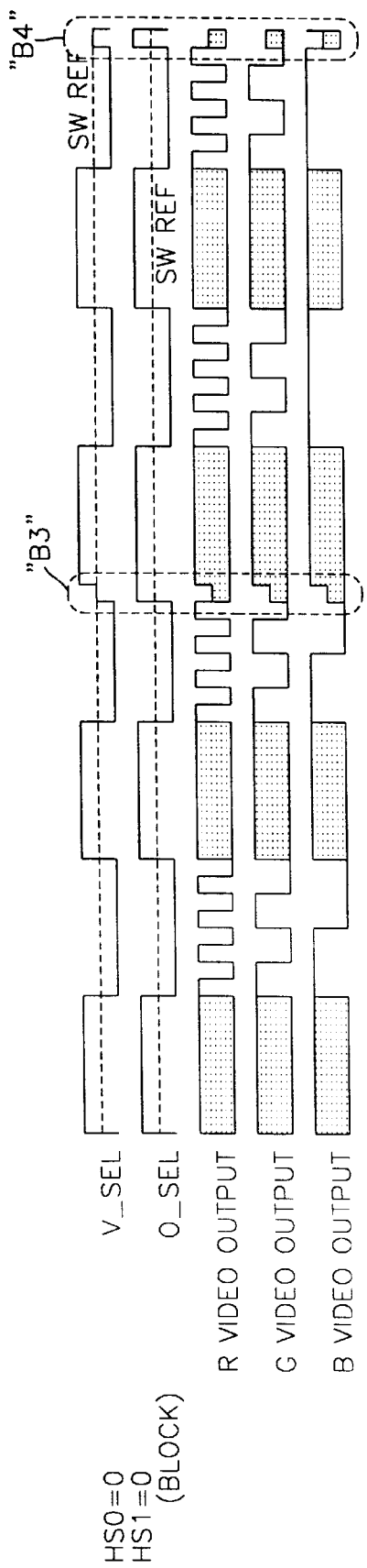

Assuming that the OSD control signals HS0 and HS1 are "low" as shown in FIG. 29B, since the outputs of the gates 22, 32, and 42 are each "low", the outputs of the second through fourth OSD determining circuits 20, 28, and 36 are "low" and are deactivated.

In the first OSD determining circuit 12, only when the OSD signals R_OSD, G_OSD, and B_OSD are "low" is the output of the AND gate 18 "high". Accordingly, the output of the OR gate 46 is "high". The attenuator 48 attenuates the output of the OR gate 46 by ½ and outputs a signal of a "middle" level. The inverter 50 inverts the video/OSD switching signal V/O_SWITCH and has an output of a "low" level. The adder 52 adds the output of the attenuator 48 to that of the inverter 50 and outputs the video selection signal V_SEL of the "middle" level. Also, the OR gate 54 outputs the OSD selection signal O_SEL of the "high" level. Therefore, the video signal is output in a half tone when the OSD signals R_OSD, G_OSD, and B_OSD are "low", namely, only in portions "B3" and "B4". At this time, the OSD signals are not output.

Figure 29C:
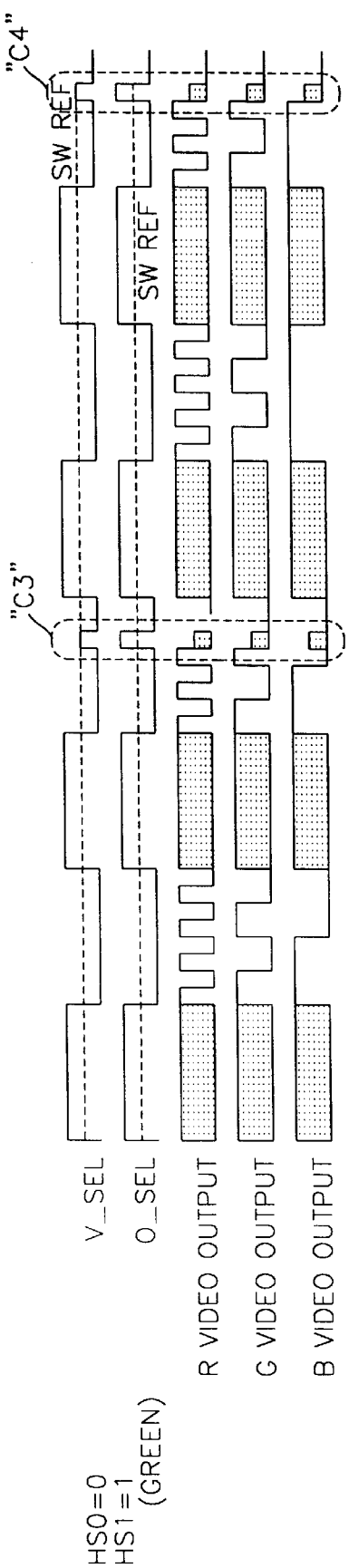

Assuming that the OSD control signals HS0 and HS1 are "low" and "high" respectively, as shown in FIG. 29C, since the outputs of the gates 16, 30, and 42 are "low", the outputs of the first, third, and fourth OSD determining circuits 12, 28, and 36 are "low" and are deactivated.

In the second OSD determining circuit 20, the output of the AND gate 26 is "high" only when the OSD signal G_OSD is at the "high" level and the OSD signals R OSD and B_OSD are at the "low" level. Accordingly, the output of the OR gate 46 is "high". Therefore, the video signal is output in the half tone when the OSD signal G_OSD is at the "high" level and the OSD signals R_OSD Aand B_OSD are "low", namely, in portions "C3" and "C4". At this time, the OSD signals are not output.

Figure 29D:
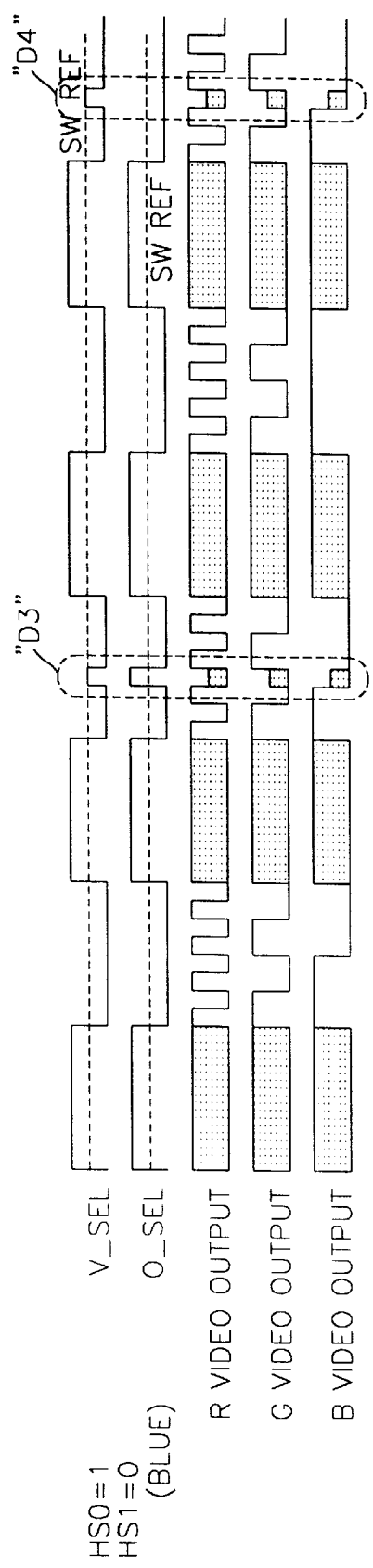

Assuming that the OSD control signals HS0 and HS1 are "high" and "low", respectively, as shown in FIG. 29D, since the outputs of the gates 16, 22, and 42 are "low", the outputs of the first, second, and fourth OSD determining circuits 12, 20, and 36 are "low" and are deactivated.

In the third OSD determining circuit 28, the output of the AND gate 34 is "high" only when the OSD signal B_OSD is "high" and the OSD signals R_OSD and G_OSD are "low". Accordingly, the output of the OR gate 46 is "high". Therefore, when the OSD signal B_OSD is at the "high" level and the OSD signals R_OSD and G_OSD are at the "low", namely, in portions "D3" and "D4", the video signal is output in half tone. At this time, the OSD signals are not output.

Figure 29E:
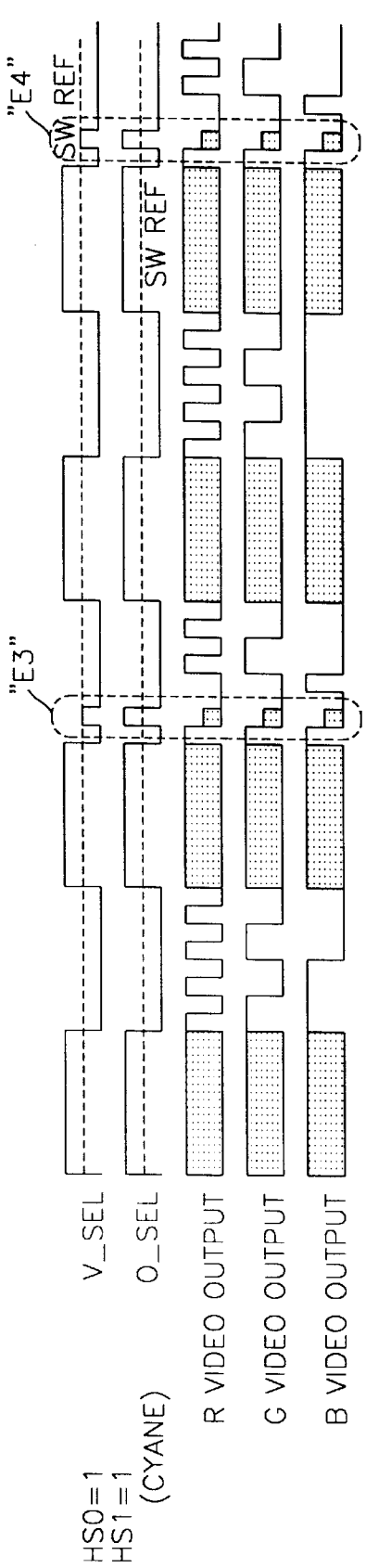

Assuming that the outputs of the OSD control signals HS0 and HS1 are "high" as shown in FIG. 29E, since the outputs of the gates 16, 24, and 32 are "low", the outputs of the first, second, and third OSD determining circuits 12, 20, and 28 are "low" and are deactivated.

In the fourth OSD determining circuit 36, the output of the AND gate 44 is "high" only when the OSD signal R OSD is "low" and the OSD signals G_OSD and B_OSD are at the "high" level. Accordingly, the output of the OR gate 46 is "high". Therefore, the video signal is in half tone when the OSD signal R_OSD is "low" and the OSD signals G_OSD and B_OSD are at the "high" level, namely, in portions "E3" and "E4". At this time, the OSD signals are not output.

As mentioned above, according to the present embodiment, it is possible to display the background screen by selecting one among the OSD rasters of various colors realizing OSD (sections 62 and 70) and to display the video signal in half tone in the OSD display area (sections 66 and 74).

The on-screen display system of the present invention is applicable to use with various display systems, including monitors, TFT-LCD displays, and the like.

While this invention has been particularly shown and described with references to preferred embodiments thereof, it will be understood by those skilled in the art that various changes in form and details may be made therein without departing from the spirit and scope of the invention as defined by the appended claims.

For example, even though in the above description two OSD windows are displayed in the above embodiment, the number of the OSD windows is not limited to two and can be increased. In the selection signal generating circuit of FIG. 15 or 17, the number of OSD windows can be increased by increasing the number of the OSD background screen determining units 214 and 230. Also, in the selection signal generating circuit of FIG. 18, the number of the OSD windows can be increased by increasing the number of the comparing circuits 324 and 328 of FIGS. 22A and 22B and the number of the raster selection signals RAS 1 and RAS2. Preferably, the number of the OSD control signals HS1 through HS6 and the number of the transistors of FIG. 23 are increased as well.

Even though one of eight OSD rasters can be selected for each window in the above embodiments, the number of possible OSD rasters can be increased or decreased. When the number of the OSD rasters is reduced, the number of the OSD control signals can be reduced. When the number of possible OSD rasters is to be increased, the number of the OSD control signals are likewise increased. In particular, the number of possible OSD rasters can vary with respect to each window. For example, one of the eight OSD rasters can be selected with respect to the first window while one of four OSD rasters can be selected with respect to the second window.

The on-screen display systems of FIGS. 1 and 12 may further include an OSD interface circuit for adjusting the gains of the OSD signals so that the swing ranges of the OSD signals are equal to the swing ranges of the video signals. In such a case, the OSD signals of which swing ranges are adjusted by the OSD interface circuit are input to the mixing and amplifying circuit and the selection signal generating circuit.

In the embodiment of FIG. 18, the video/OSD switching unit 300 may be incorporated into the OSD half tone signal generating unit 330 instead of being provided as an additional block.

In the above embodiments, one video/OSD selection signal was commonly provided to the video signal selector and the OSD signal selector of FIG. 3. However, the video selection signal and the OSD selection signal may be separately provided to the video signal selector and the OSD signal selector.

The video information and the OSD background screen may be displayed in the half tone in some window of the plurality of OSD windows, while the OSD background screen can be displayed by only an OSD raster or a video signal of a perfect tone in the remaining window. Such a display can be easily realized by applying a combination of OSD control signals irrelevant to the OSD background screen and the colors of the OSD characters.

What is claimed is:

1. An on-screen display (OSD) system, comprising:
   a plurality of mixing and amplifying circuits, each corresponding to a channel representative of a color, each for receiving a video signal and an OSD signal of a respective channel, mixing the video signal and the OSD signal according to a video selection signal and an OSD selection signal to generate a mixed signal, amplifying the mixed signal to generate an amplified image signal, and outputting the amplified image signal to a display; and a selection signal generating circuit for receiving the OSD signals for each channel, and generating and outputting the OSD selection signal and the video selection signal based on a video/OSD switching signal, a fractional tone signal, OSD control signals, and the OSD signals;

wherein, when the video/OSD switching signal instructs an OSD output operation and the fractional tone signal instructs a fractional tone output operation, said selection signal generating circuit outputs the video selection signal and the OSD selection signal such that a fractional tone OSD background raster is displayed with a fractional tone video image in an OSD window.

2. The on-screen display system of claim 1, wherein said selection signal generating circuit comprises:

a fractional tone display signal generator for generating a fractional tone display signal when the video/OSD switching signal instructs an OSD output operation, the fractional tone signal instructs an fractional tone operation, and the OSD signals have a predetermined logic combination;

an attenuator for attenuating the fractional tone display signal to a fraction of its original magnitude; and an adder for adding the video mode signal to the output of the attenuator to output the addition result as the video selection signal and the OSD selection signal.

3. The on-screen display system of claim 2 further comprising an inverter for inverting the video/OSD switching signal to output a video mode signal when only video signals are to be output.

4. The on-screen display system of claim 2, wherein the OSD control signals includes a first control signal and a second control signal.

5. The on-screen display system of claim 4, wherein the channels are representative of red, green, and blue (R/G/B) colors, and wherein said fractional tone display signal generator comprises:

a first OSD determining circuit for outputting a first logic level when the first and second OSD control signals are at second logic levels and R_OSD, G_OSD, and B_OSD signals are at the second logic levels;

a second OSD determining circuit for outputting the first logic level when the first OSD control signal is at the second logic level, the second OSD control signal is at the first logic level, the R_OSD and B_OSD signals are at the second logic levels, and the G_OSD signal is at the first logic level;

a third OSD determining circuit for outputting the first logic level when the first OSD control signal is at the second logic level, the second OSD control signal is at the first level, the R_OSD and G_OSD signals are at the second logic levels, and the B_OSD signal is at the first logic level;

a fourth OSD determining circuit for outputting the first logic level when the first and second OSD control signals are at the first levels, the R_OSD is at the second level, and the G_OSD and B_OSD signals are at the first logic levels; and an OR gate for receiving the outputs of said first through fourth OSD determining circuits and for performing an OR operation.

6. The on-screen display system of claim 1, wherein the channels are representative of red, green, and blue (R/G/B) colors, and wherein said selection signal generating circuit comprises:

a video/OSD switching unit for receiving the video/OSD switching signal and generating at least one switching signal according to the video/OSD switching signal;

an OSD raster selector for adjusting swing ranges of the R/G/B OSD signals, determining whether each of the level-adjusted R/G/B OSD signals is at the first logic level or the second logic level, and outputting a raster selection signal when the R/G/B OSD signals correspond to a predetermined combination of logic levels determined according to the OSD control signals; and a fractional tone signal generator for receiving the switching signal and the raster selection signal from said video/OSD switching unit and said OSD raster selector, respectively, and generating the OSD selection signal and the video selection signal.

7. The on-screen display system of claim 6, wherein said video/OSD switching unit generates a reference voltage used when said mixing and amplifying circuits determine the logic levels of the video selection signal and the OSD selection signal.

8. The on-screen display system of claim 1, wherein the channels are representative of red, green, and blue (R/G/B) colors, and wherein said selection signal generating circuit comprises:

an OSD raster selector for adjusting the swing ranges of the R/G/B OSD signals, determining whether each of the level-adjusted R/G/B OSD signals is at the first logic level or the second logic level, and outputting a raster selection signal when the R/G/B OSD signals correspond to a predetermined combination of logic levels which is determined according to the OSD control signals; and a fractional tone signal generator for receiving the switching signal and the raster selection signal from said video/OSD switching unit and said OSD raster selector, respectively, and generating the OSD selection signal and the video selection signal.

9. The on-screen display system of claim 1, wherein the video selection signal and OSD selection signal are combined into a single video/OSD selection signal; and wherein each of said mixing and amplifying circuits amplifies only the video signal to output an amplified video signal when the video/OSD selection signal is at a first logic level;

wherein each of said mixing and amplifying circuits amplifies only the OSD signal to output an amplified OSD signal when the video/OSD selection signal is at a second logic level; and wherein each of said mixing and amplifying circuits mixes the video signal and the OSD signal to output an amplified and mixed signal when the video/OSD selection signal is at a medium logic level.

10. The on-screen system of claim 1 wherein the fractional tone output is half the original signal level.

11. An on-screen display system comprising:

a plurality of mixing and amplifying circuits, each corresponding to a channel representative of a color, each for receiving a video signal and an OSD signal of a respective channel, mixing the video signal and the OSD signal according to a video selection signal and an OSD selection signal to generate a mixed signal, amplifying the mixed signal to generate an amplified image signal, and outputting the amplified image signal to a display; and a selection signal generating circuit for receiving the OSD signals for each channel, and generating and outputting the OSD selection signal and the video selection signal based on a video/OSD switching signal, a fractional tone signal, and OSD control signals for the second predetermined number of OSD windows, wherein, when the video/OSD switching signal instructs the OSD output operation and the fractional tone signal instructs the fractional tone operation, said selection signal generating circuit outputs the video selection signal of medium level so that a fractional tone video image is displayed in an OSD window, and wherein, when the video/OSD switching signal instructs the OSD output operation and the fractional tone signal instructs a non-fractional tone operation, said selection signal generating circuit outputs a disabled video selection signal and an enabled OSD selection signal so that an OSD background raster of a predetermined color defined by the OSD control signals is displayed in the OSD window.

12. The on-screen display system of claim 11, wherein the video selection signal and the OSD selection signal are combined into a single video/OSD selection signal; and wherein each of said mixing and amplifying circuits amplifies only the video signal to output an amplified video signal when the video/OSD selection signal is at a first logic level;

wherein each of said mixing and amplifying circuits amplifies only the OSD signal to output an amplified OSD signal when the video/OSD selection signal is at a second logic level; and wherein each of said mixing and amplifying circuits mixes the video signal and the OSD signal to output an amplified and mixed signal when the video/OSD selection signal is at a medium logic level.

13. The on-screen display system of claim 11, wherein the selection signal generating circuit comprises:

a half tone displaying signal generating portion for generating and outputting a half tone displaying signal activated when the video/OSD switching signal instructs the output of OSD, the half tone signal instructs the output of a half tone video, and the OSD signals shows a predetermined logic combination;

an inverter for inverting the video/OSD switching signal activated when only a video signal is to be output;

a first OR gate for generating the OSD selection signal by performing an OR operation on the video mode signal and the half tone displaying signal;

an attenuator for attenuating the half tone displaying signal; and an adder for generating the video selection signal by adding the video mode signal to the output of the attenuator.

14. An on-screen display system for forming a first predetermined number of OSD windows in a displayed image and displaying OSD information and video information in a fractional tone in a second predetermined number of OSD windows among the first predetermined number of OSD windows, comprising:

a plurality of mixing and amplifying circuits, each corresponding to a channel representative of a color, each for receiving a video signal and an OSD signal of a respective channel, mixing the video signal and the OSD signal according to a video selection signal and an OSD selection signal to generate a mixed signal, amplifying the mixed signal to generate an amplified image signal, and outputting the amplified image signal to a display; and a selection signal generating circuit for receiving the OSD signals for each channel, and generating and outputting the OSD selection signal and the video selection signal based on a video/OSD switching signal, a fractional tone signal, and OSD control signals for the second predetermined number of OSD windows, wherein, when the video/OSD switching signal instructs an OSD output operation and the fractional tone signal instructs a fractional tone output operation, said video signal said selection signal generating circuit outputs the video selection signal and the OSD selection signal such that a fractional tone OSD background raster is displayed with a fractional tone video image in the second predetermined number of OSD windows.

15. The on-screen display system of claim 14, wherein the video selection signal and the OSD selection signal are combined into a single video/OSD selection signal; and wherein each of said mixing and amplifying circuits amplifies the video signal to output an amplified video signal when the video/OSD selection signal is at a first logic level;

wherein each of said mixing and amplifying circuits amplifies the OSD signal to output an amplified OSD signal when the video/OSD selection signal is at a second logic level; and wherein each of said mixing and amplifying circuits mixes the video signal and the OSD signal to output an amplified and mixed signal when the video/OSD selection signal is at a medium logic level.

16. The on-screen display system of claim 15, wherein the second predetermined number of OSD windows includes a first window and a second window.

17. The on-screen display system of claim 16, wherein the channels are representative of red, green, and blue (R/G/B) colors, ad wherein said selection signal generating circuit comprises:

a gating signal generating unit for generating a gating signal which is activated when the video/OSD switching signal instructs an OSD output operation and the fractional tone signal instructs an fractional tone operation;

a first OSD determining unit for receiving the gating signal, OSD signals for the R/G/B channels, and the OSD control signals for the first window, and generating a first window discriminating signal when the OSD signals have a first predetermined combination corresponding to the OSD control signals for the first window and the gating signal is activated;

a second OSD determining unit for receiving the gating signal, OSD signals for the R/G/B channels, and the OSD control signals for the second window, and generating a second window discriminating signal when the OSD signals have a second predetermined combination corresponding to the OSD control signals for the second window and the gating signal is activated;

an OR gate for performing an OR operation on the first window discriminating signal and the second window discriminating signal;

an attenuator for receiving an output of said OR gate and attenuating the output of the OR gate to a fractional;

an inverter for receiving and inverting the video/OSD switching signal and generating a video mode signal activated when only the video signal is to be output; and an adder for adding the output of the attenuator to the video mode signal and outputting the addition result as the video/OSD selection signal.

18. The on-screen display system of claim 17, wherein said selection signal generating circuit comprises:

a gating signal generating unit for generating a gating signal when the video/OSD switching signal instructs an OSD output operation and the fractional tone signal instructs an fractional tone operation;

a first OSD determining unit for receiving OSD signals for the R/G/B channels, and the OSD control signals for the first window, and generating a first window discriminating signal when the OSD signals has a first predetermined combination corresponding to the OSD control signals for the first window;

a second OSD determining unit for receiving OSD signals for the R/G/B channels, and the OSD control signals for the second window, and generating a second window discriminating signal when the OSD signals has a second predetermined combination corresponding to the OSD control signals for the second window;

an OR gate for performing an OR operation on the first window discriminating signal and the second window discriminating signal;

an AND gate for performing an AND operation on an output of said OR gate and the gating signal;

an attenuator for receiving the output of said AND gate and attenuating the output of the AND gate to a fractional;

an inverter for receiving and inverting the video/OSD switching signal and generating a video mode signal activated when only the video signal is to be output; and an adder for adding the output of the attenuator to the video mode signal and outputting the addition result as the video/OSD selection signal.

19. The on-screen display system of claim 16, wherein the channels are representative of red, green, and blue (R/G/B) colors, and wherein said selection signal generating circuit comprises:

an OSD raster selector for receiving the OSD signals for R/G/B channels, the OSD control signals for the first and second windows and generating at least one raster selection signal when the OSD signals have a logic combination corresponding the OSD control signals for the first window or the OSD control signals for the first window; and a fractional tone signal generator for receiving the raster selection signal, the video/OSD switching signal and the fractional tone signal and generating the video/OSD selection signal of the medium level when the video/OSD switching signal instructs the OSD output operation and the fractional tone signal instructs the fractional tone output operation and at least one of the raster selection signals is enabled.

20. The on-screen display system of claim 19, wherein said OSD raster selector comprises:

a first comparing circuit for generating a first raster selection signal which is enabled when the OSD signals have the logic combination corresponding the OSD control signals for the first window; and a second comparing circuit for generating a second raster selection signal which is enabled when the OSD signals have the logic combination corresponding the OSD control signals for the second window, wherein said fractional tone signal generator outputs the video/OSD selection signal of the medium level when the first raster selection signal or the second raster selection signal is enabled.

21. The on-screen display system of claim 19, wherein said selection signal generating circuit further comprises:

a video/OSD switching unit for receiving the video/OSD switching signal and generating at least one switching signal which switches in response to the video/OSD switching signal and has a phase opposite to a phase of the video/OSD switching signal, wherein the fractional tone signal generator receives the switching signal from said video/OSD switching unit.

22. The on-screen display system of claim 21, wherein said video/OSD switching unit generates a reference voltage which is used by said mixing and amplifying circuits for determining a level of the video/OSD selection signal.

23. The on-screen display system of claim 19, wherein said selection signal generating circuit further comprises an interface buffer for receiving and buffering the OSD control signals for the first and second windows and the fractional tone signal to enhance current driving capability of the OSD control signals and the fractional tone signal, wherein said OSD raster selector receives the OSD control signals and the fractional tone signal of which current driving capabilities are enhanced by said interface buffer.

* * * * *

UNITED STATES PATENT AND TRADEMARK OFFICE
CERTIFICATE OF CORRECTION

PATENT NO. : 6,369,858 B1
DATED : April 9, 2002
INVENTOR(S) : Jae-Hun Lee

It is certified that error appears in the above-identified patent and that said Letters Patent is hereby corrected as shown below:

Column 34,
Line 32, change "ad" to -- and --.

Column 35,
Line 43, change the second occurrence of "first" to -- second --.

Signed and Sealed this

Twenty-ninth Day of October, 2002

Attest:

Attesting Officer

JAMES E. ROGAN
Director of the United States Patent and Trademark Office